(12) United States Patent
Kinoshita et al.

(10) Patent No.: US 10,979,639 B2
(45) Date of Patent: *Apr. 13, 2021

(54) IMAGING CONTROL APPARATUS, IMAGING CONTROL METHOD, AND NON-TRANSITORY COMPUTER-READABLE MEDIUM

(71) Applicant: Sony Corporation, Tokyo (JP)

(72) Inventors: Masaya Kinoshita, Kanagawa (JP); Kentaro Matsukura, Saitama (JP); Akira Tokuse, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/781,487

(22) Filed: Feb. 4, 2020

(65) Prior Publication Data

US 2020/0186713 A1 Jun. 11, 2020

Related U.S. Application Data

(63) Continuation of application No. 15/758,768, filed as application No. PCT/JP2016/088686 on Dec. 26, 2016, now Pat. No. 10,587,804.

(30) Foreign Application Priority Data

Jan. 14, 2016 (JP) .............................. JP2016-005453

(51) Int. Cl.
*H04N 5/232* (2006.01)
*H04N 5/225* (2006.01)

(52) U.S. Cl.
CPC ....... *H04N 5/23245* (2013.01); *H04N 5/2254* (2013.01); *H04N 5/2258* (2013.01); *H04N 5/232* (2013.01); *H04N 5/23218* (2018.08)

(58) Field of Classification Search
CPC ............. H04N 5/23245; H04N 5/2258; H04N 5/23218; H04N 5/232
See application file for complete search history.

(56) References Cited

U.S. PATENT DOCUMENTS 8,520,139 B2 8/2013 Imaida
2008/0253695 A1 10/2008 Sano et al.
(Continued)

FOREIGN PATENT DOCUMENTS

CN 101237528 A 8/2008
CN 103227898 A 7/2013
(Continued)

OTHER PUBLICATIONS

Japanese Offcie Action dated Nov. 12, 2019 for corresponding Japanese Application No. 2016-005453.
(Continued)

*Primary Examiner* — Christopher K Peterson
(74) *Attorney, Agent, or Firm* — Michael Best & Friedrich LLP

(57) ABSTRACT

The present disclosure includes an imaging control apparatus, an imaging control method, and a non-transitory computer-readable medium. The imaging control apparatus including a controller having a state detection unit and a mode processing instruction unit. The state detection unit configured to receive a sensing signal from a sensor, detect an imaging environment of an imaging apparatus becoming a first state, and detect a transition of the imaging environment from the first state to a second state based at least in part on the sensing signal. The mode processing instruction unit configured to instruct a first imaging operation in a first mode on a basis of detection of the imaging environment of the imaging apparatus becoming the first state, and instruct a second imaging operation in a second mode on a basis of (Continued)

detection of the transition of the imaging environment from the first state to the second state.

21 Claims, 25 Drawing Sheets

(56) References Cited

U.S. PATENT DOCUMENTS

| | | | |
|---|---|---|---|
| 2008/0298795 A1* | 12/2008 | Kuberka | G03B 17/18 396/263 |
| 2013/0194215 A1 | 8/2013 | Toida et al. | |
| 2014/0204235 A1 | 7/2014 | Wexler et al. | |
| 2014/0320687 A1 | 10/2014 | Chau et al. | |
| 2015/0350536 A1* | 12/2015 | Yajima | H04N 5/23219 348/158 |
| 2015/0365575 A1 | 12/2015 | Jonsson et al. | |
| 2016/0345367 A1* | 11/2016 | Nakayama | H04W 8/20 |

FOREIGN PATENT DOCUMENTS

| | | |
|---|---|---|
| JP | 2004-056739 A | 2/2004 |
| JP | 2009-302772 A | 12/2009 |
| JP | 2011-139353 A | 7/2011 |
| JP | 4757173 B2 | 8/2011 |
| JP | 4998122 B2 | 8/2011 |
| JP | 2013-046259 A | 3/2013 |
| JP | 2014-075635 A | 4/2014 |
| JP | 2014-187481 A | 10/2014 |
| JP | 2015-082817 A | 4/2015 |
| JP | 2015-103832 A | 6/2015 |
| JP | 2015-128216 A | 7/2015 |

OTHER PUBLICATIONS

Chinese Office Action dated Mar. 23, 2020 for corresponding Chinese Application No. 201680078126.8.

* cited by examiner

[Fig. 1]
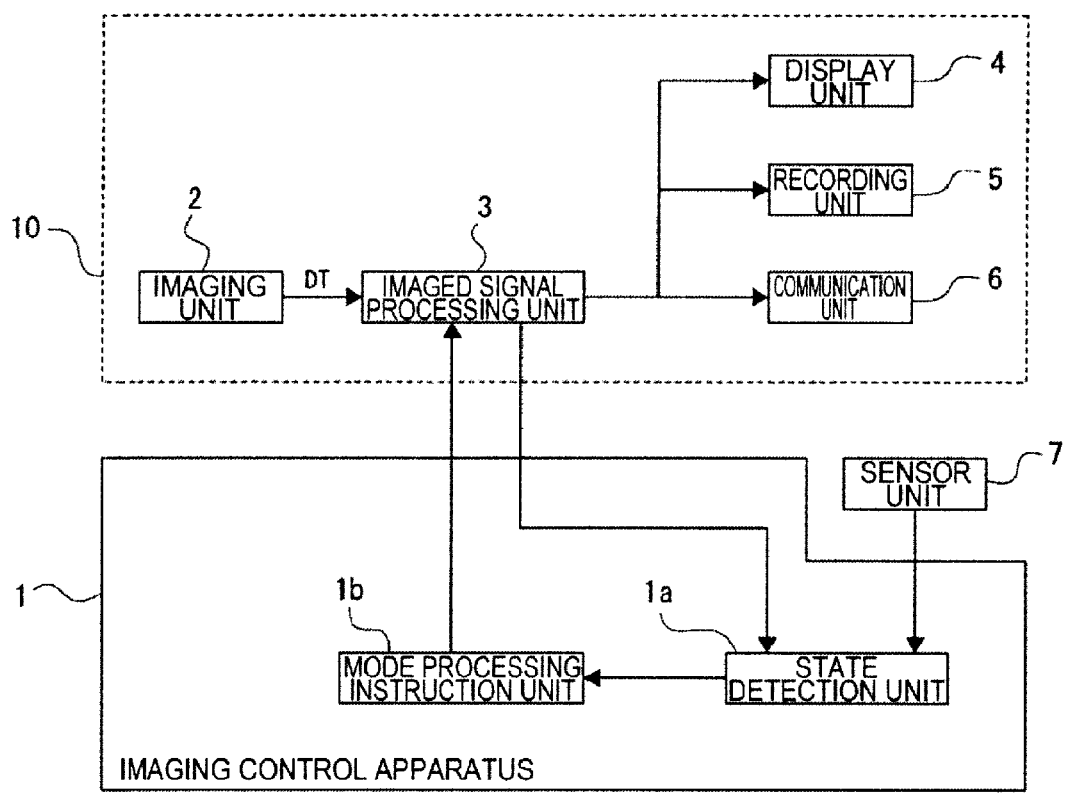

[Fig. 2]
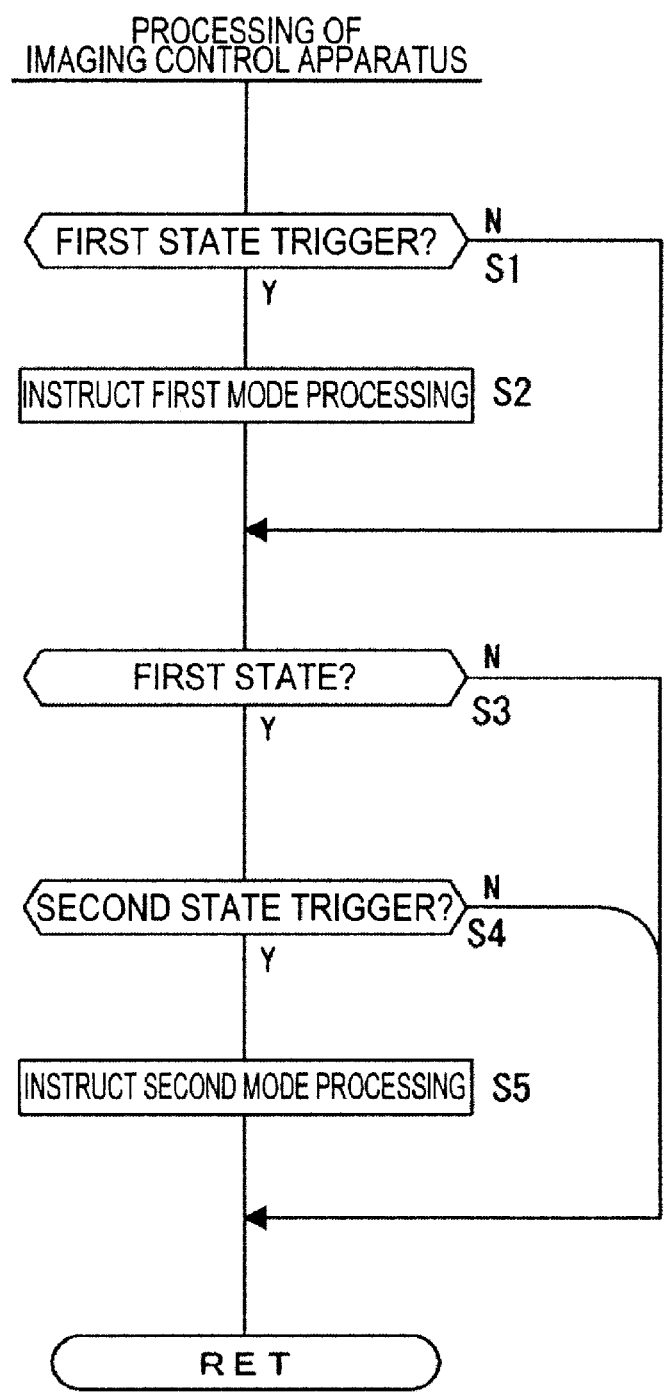

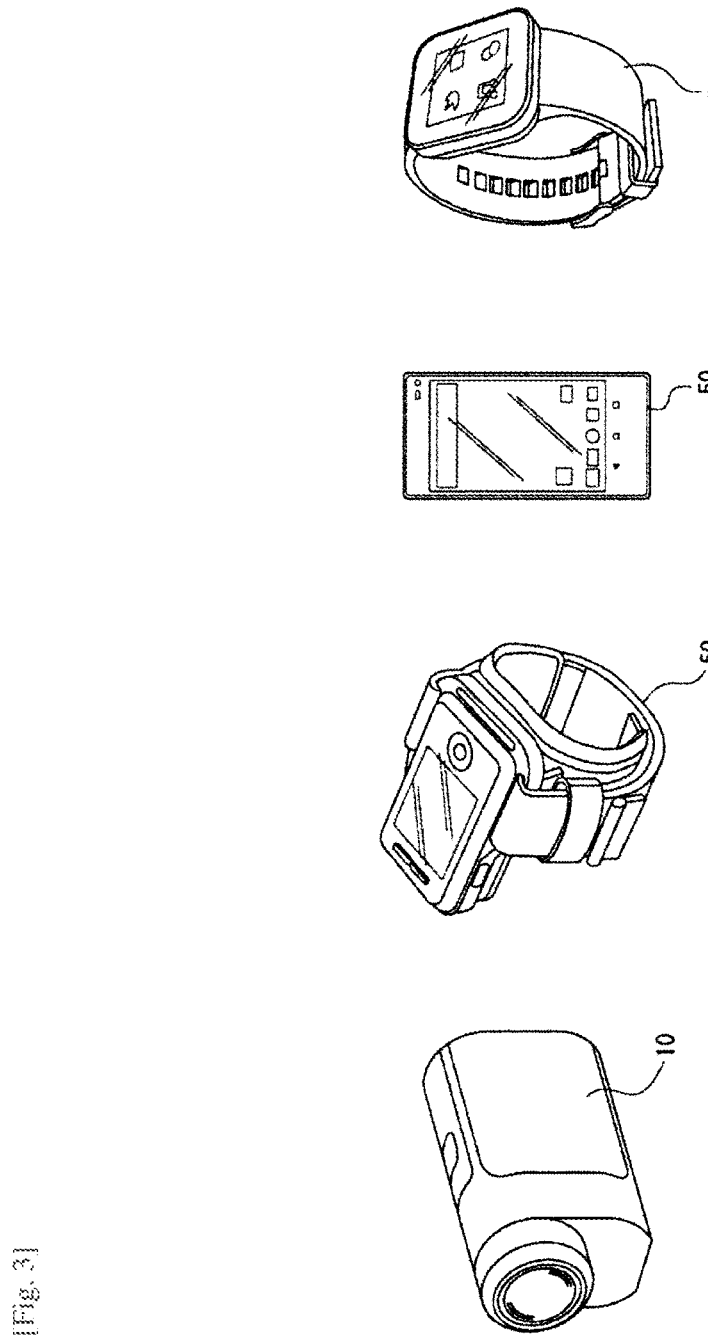
[Fig. 3]

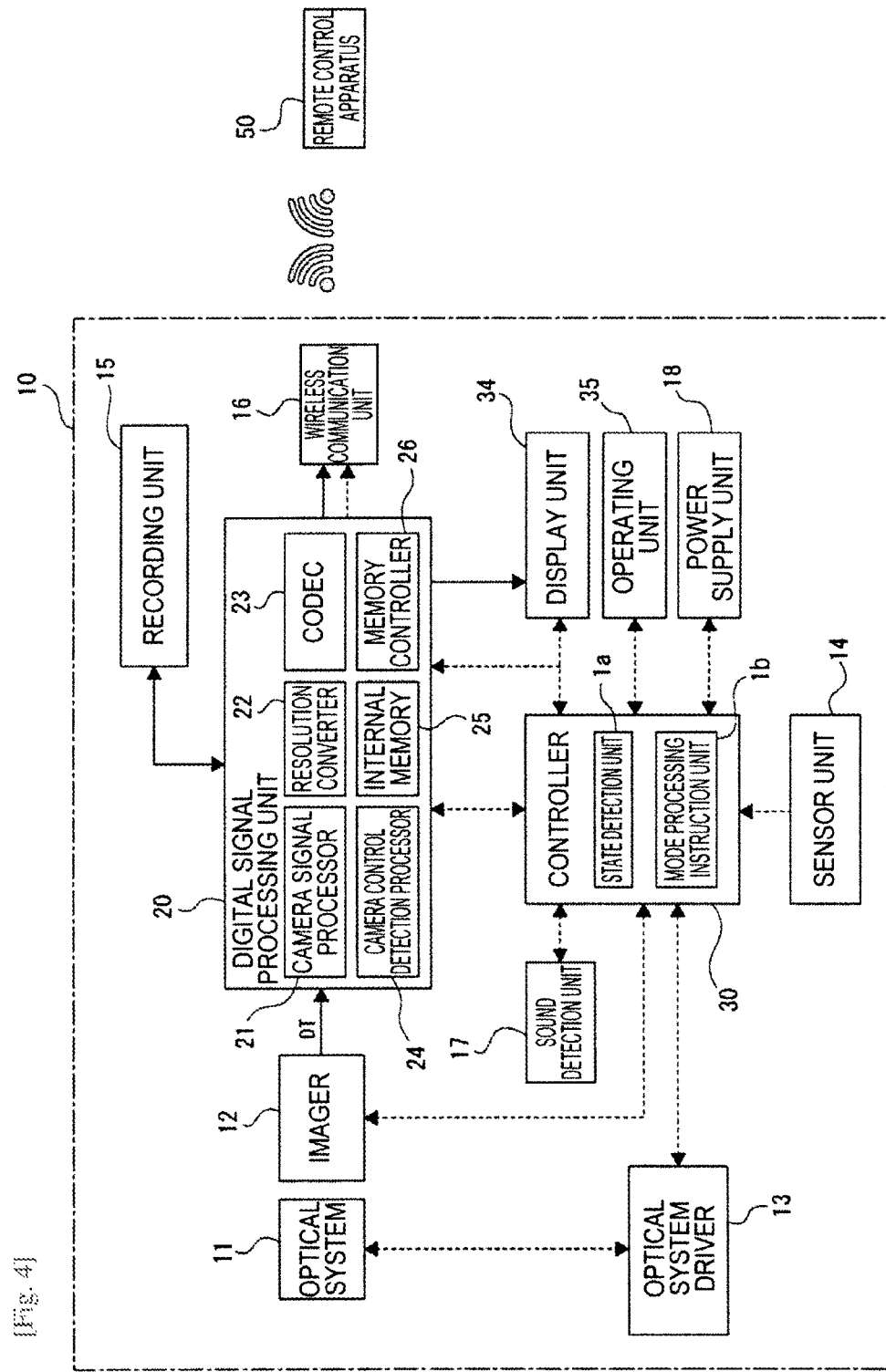

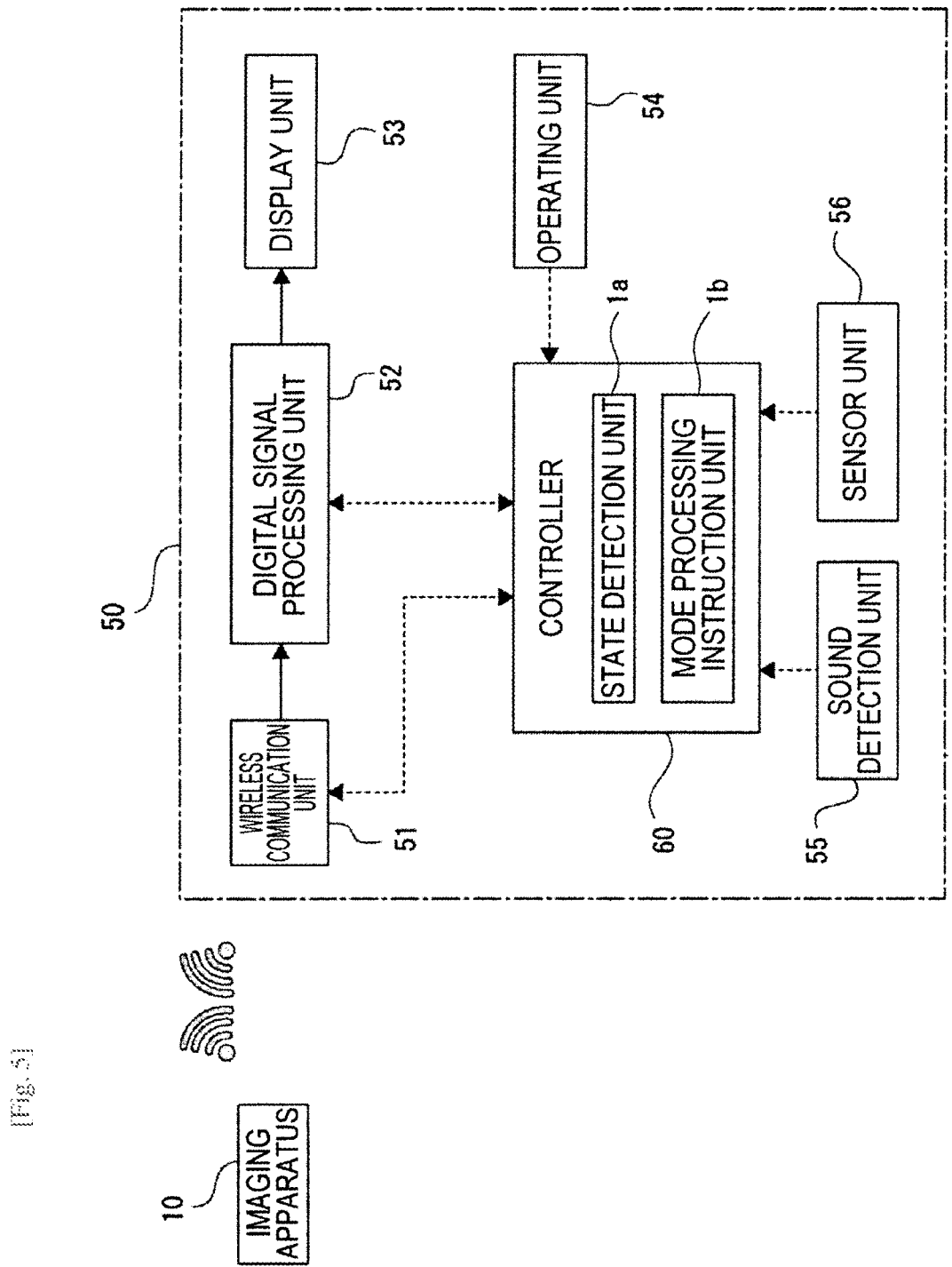

[Fig. 6]
A
B
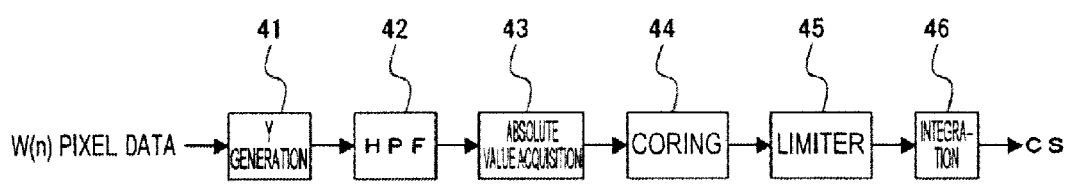

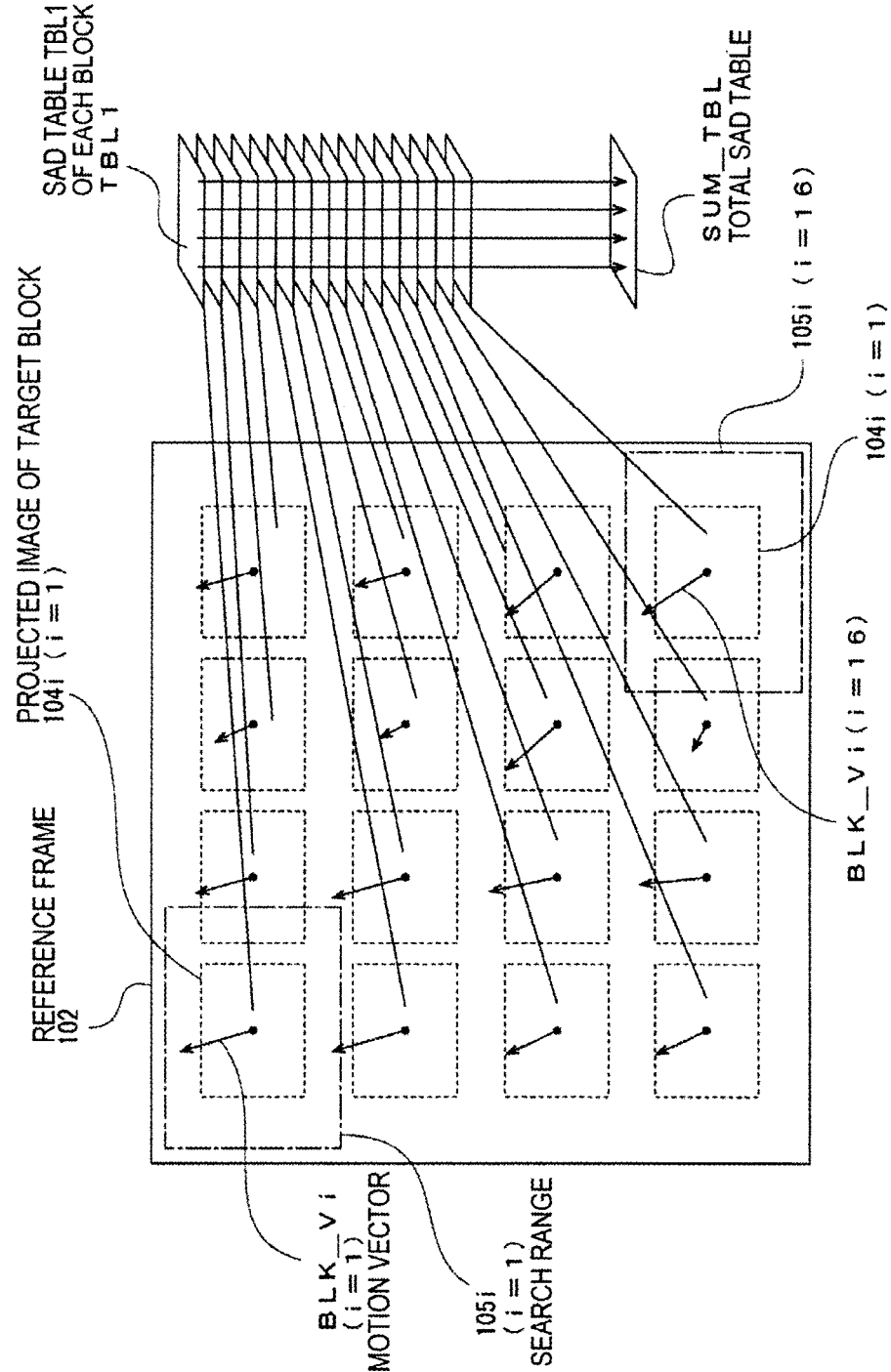
[Fig. 7]

[Fig. 8]
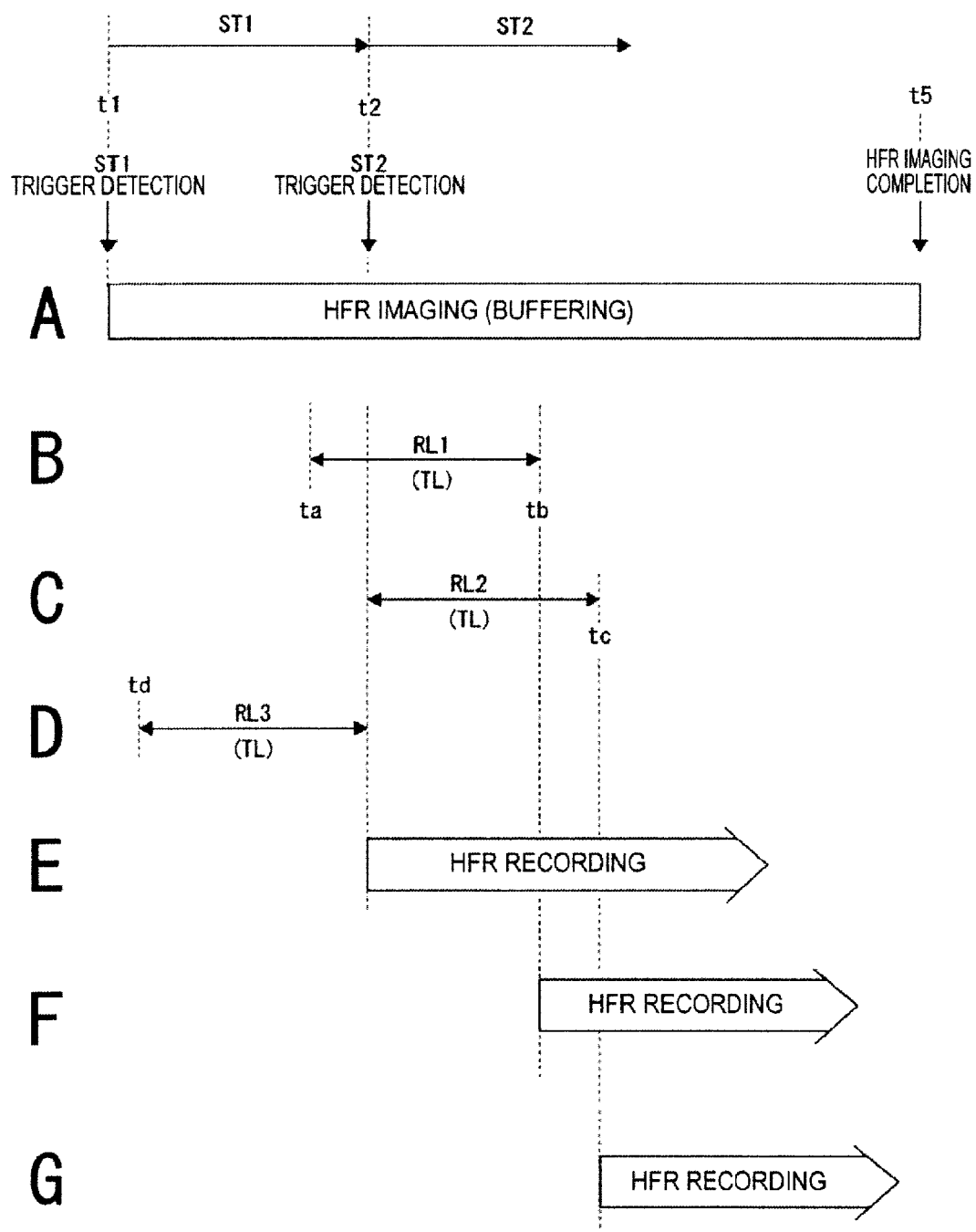

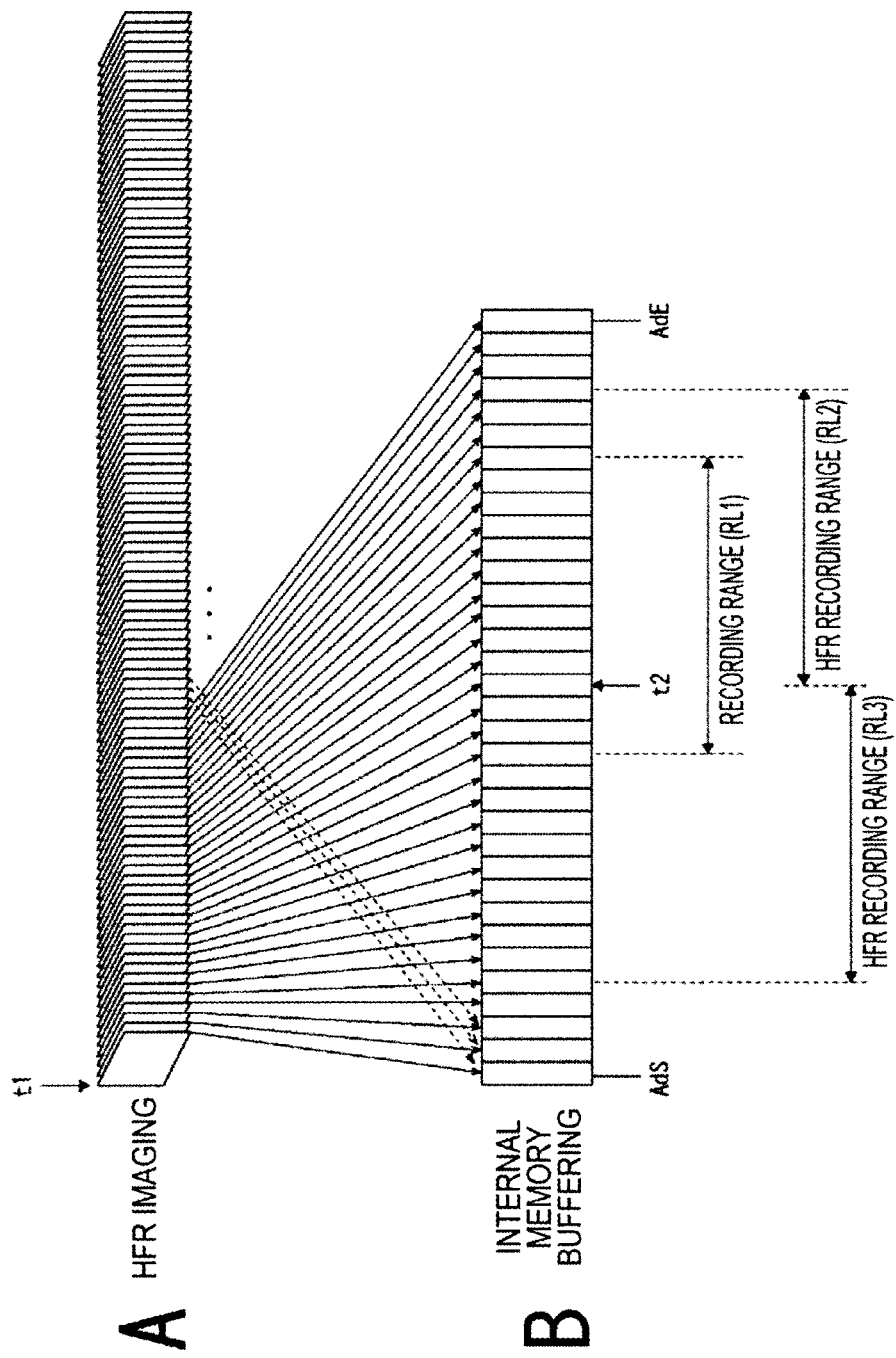

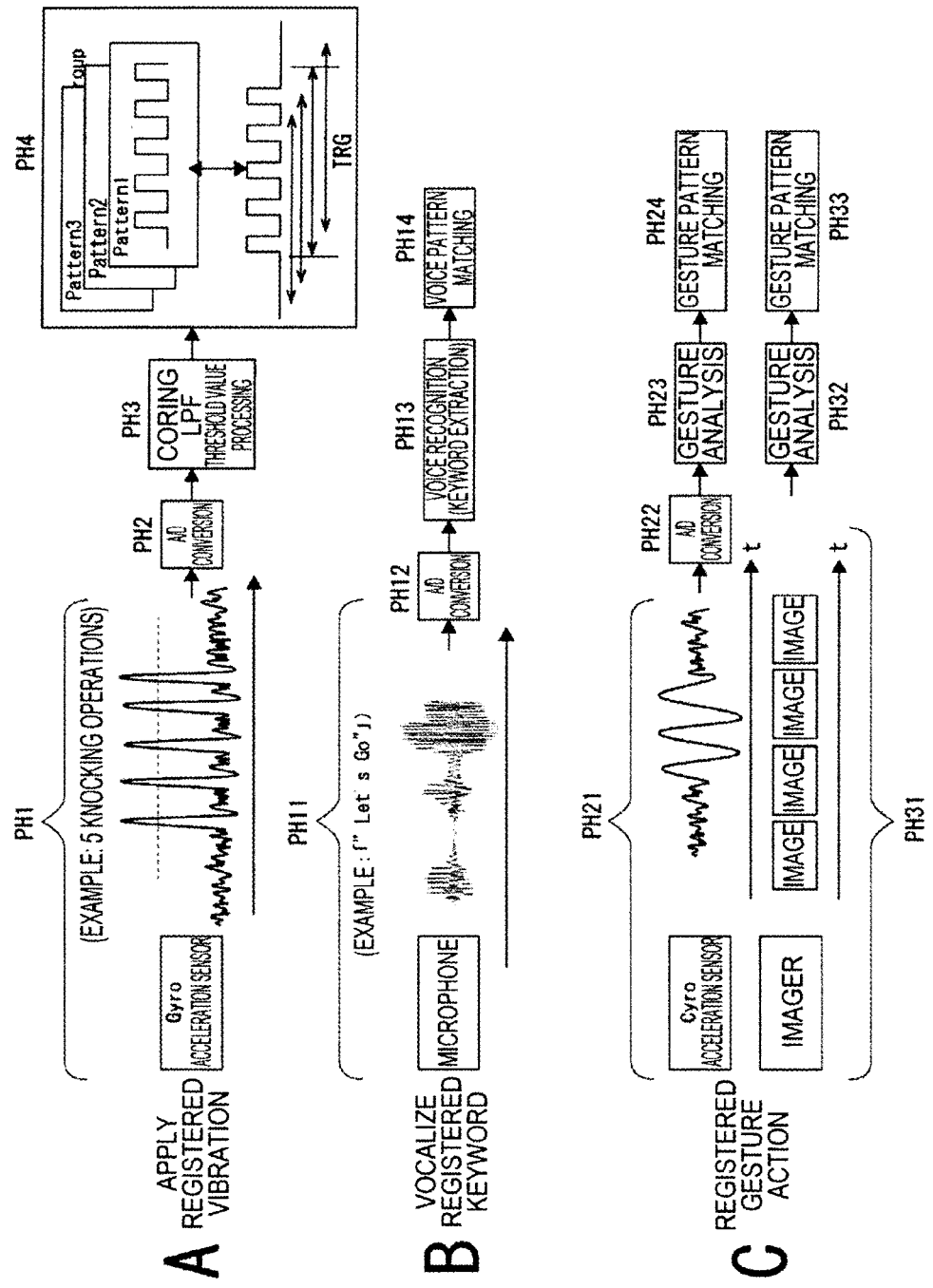

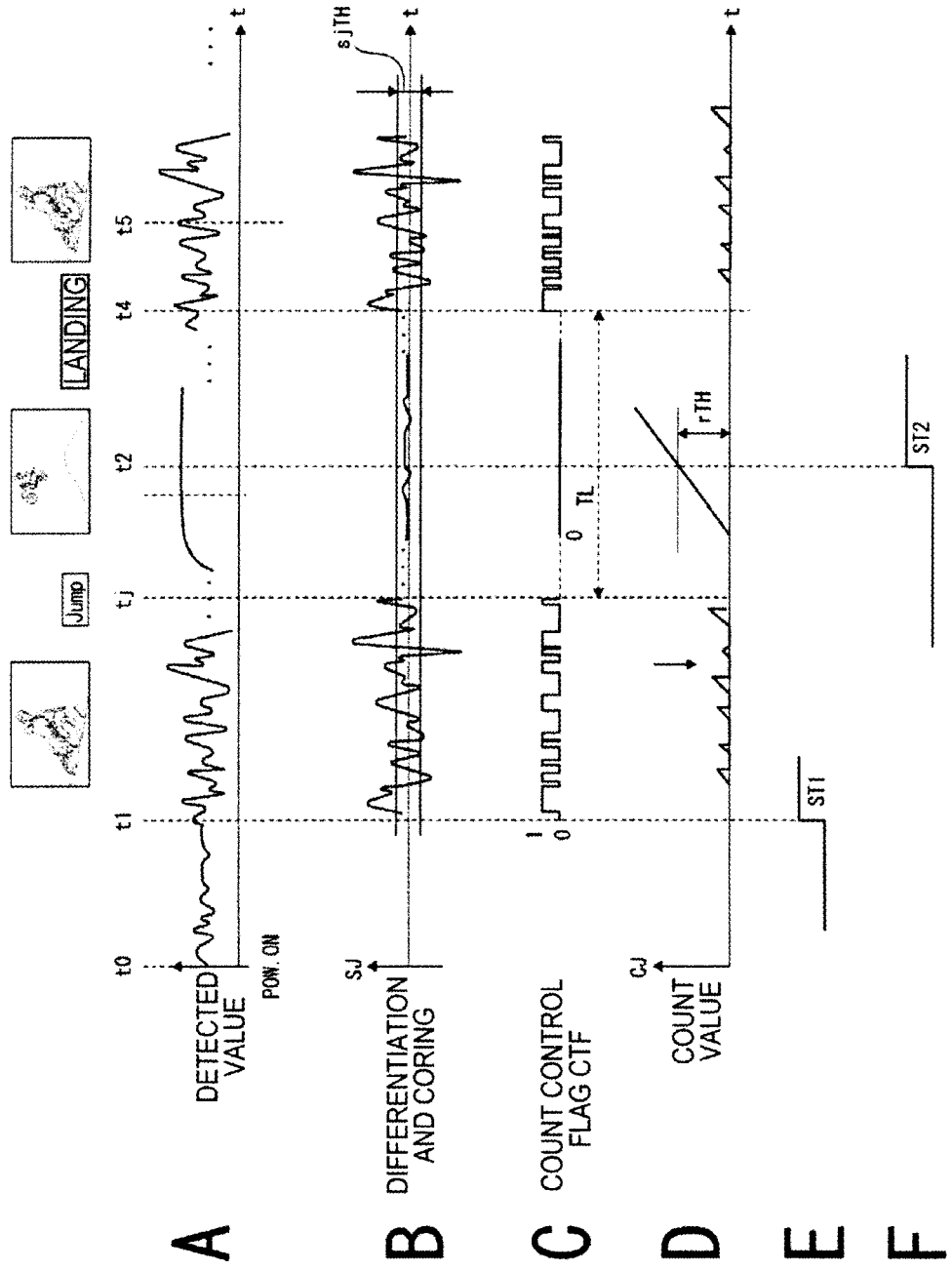
[Fig. 11]

[Fig. 12]
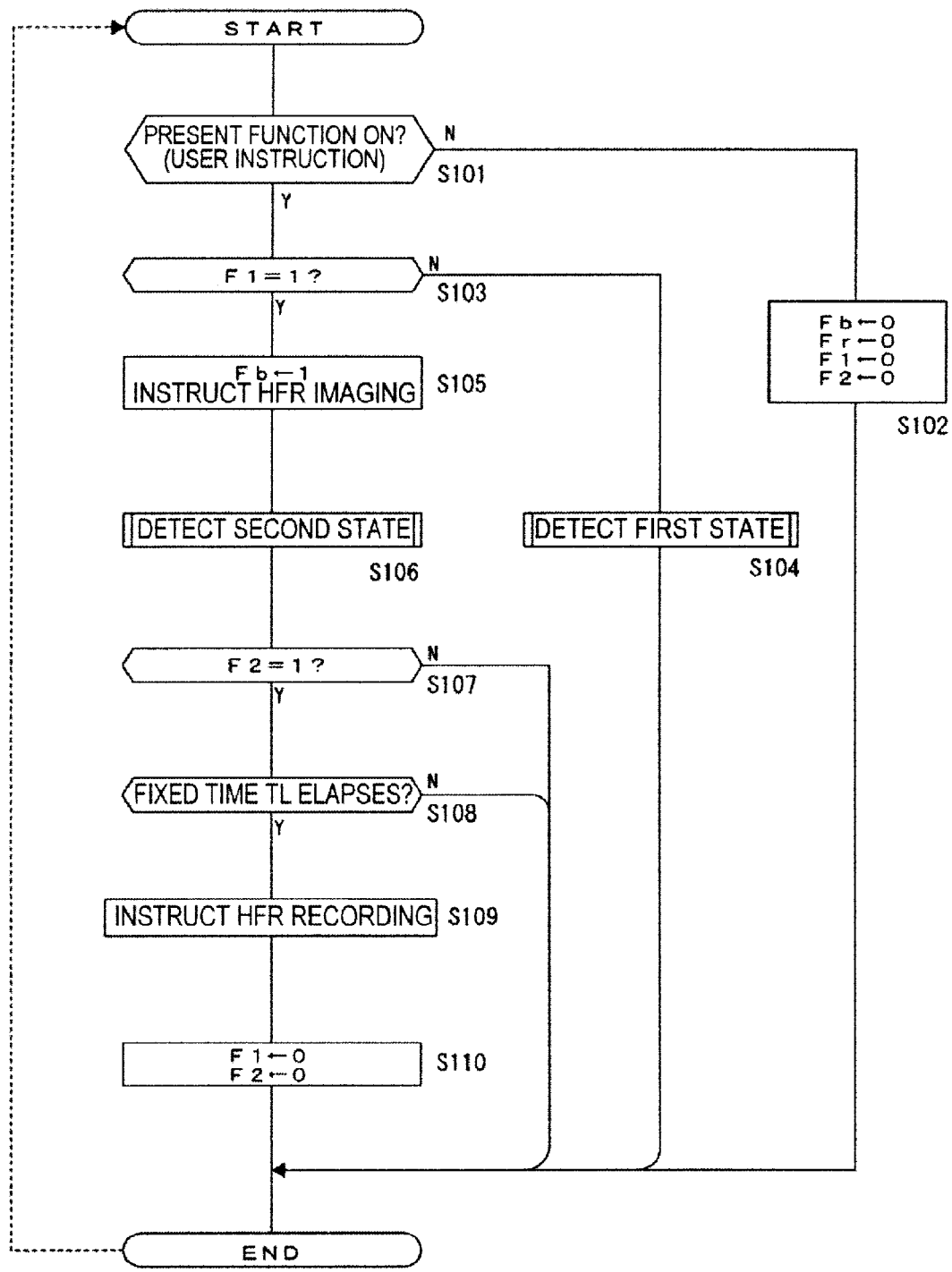

[Fig. 13]
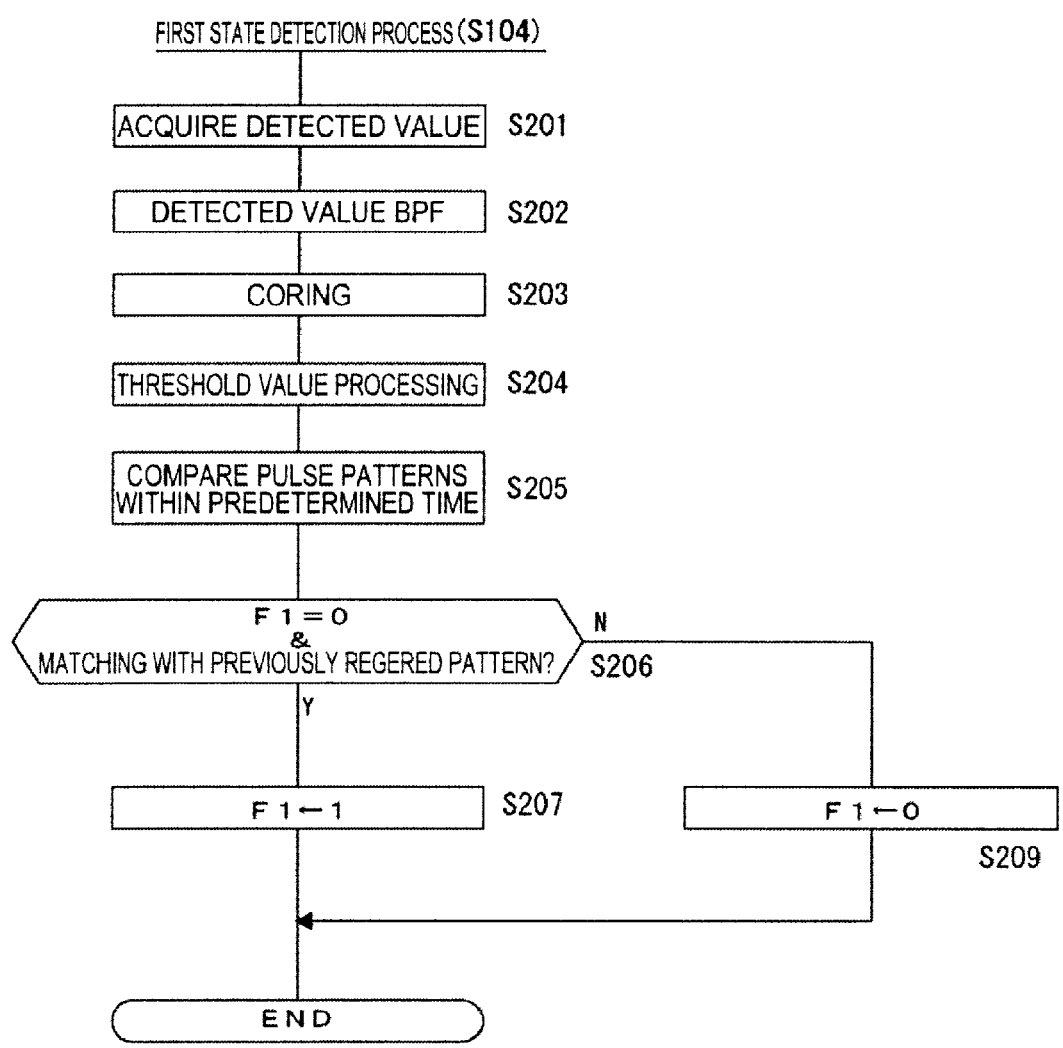

[Fig. 14]
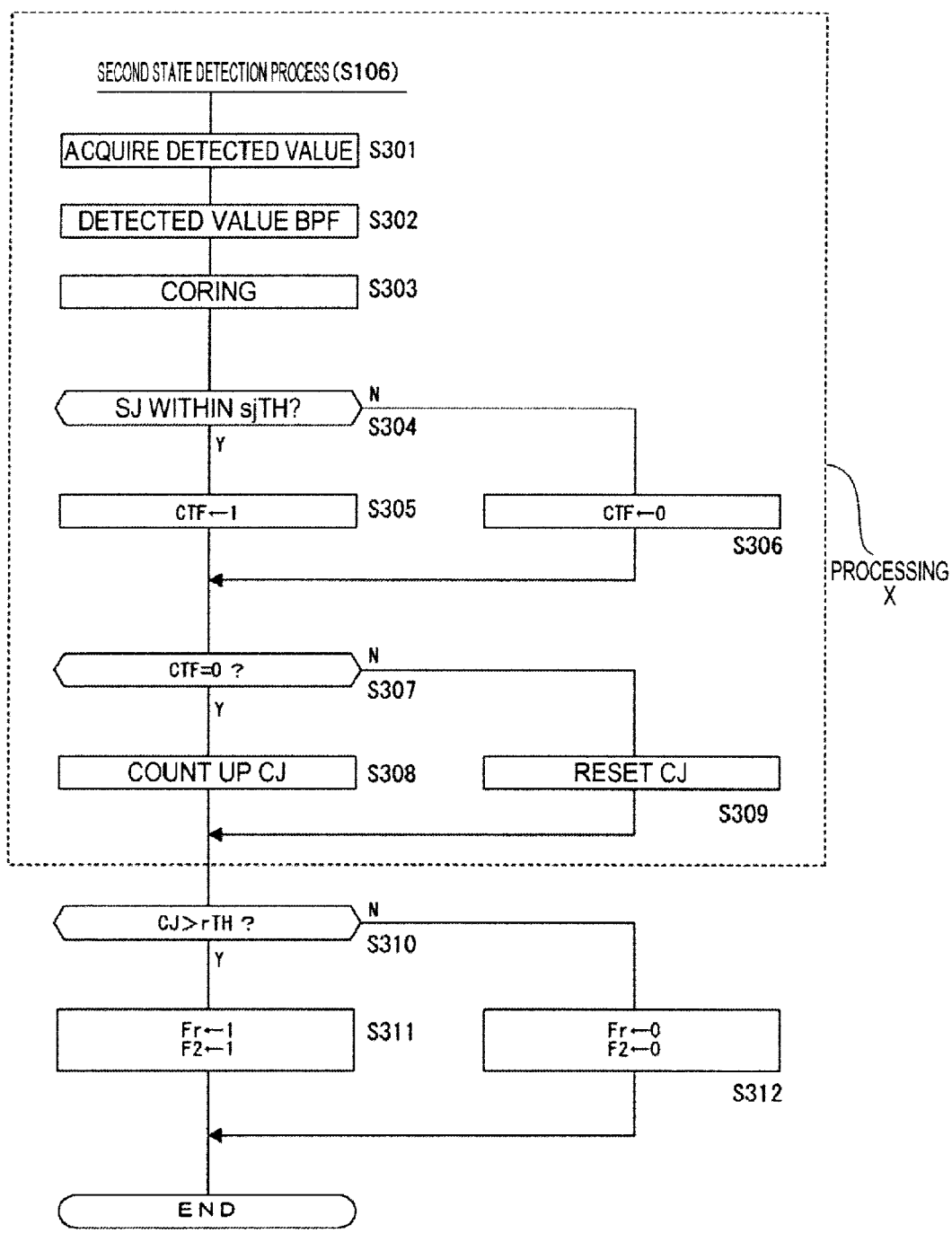

[Fig. 15]
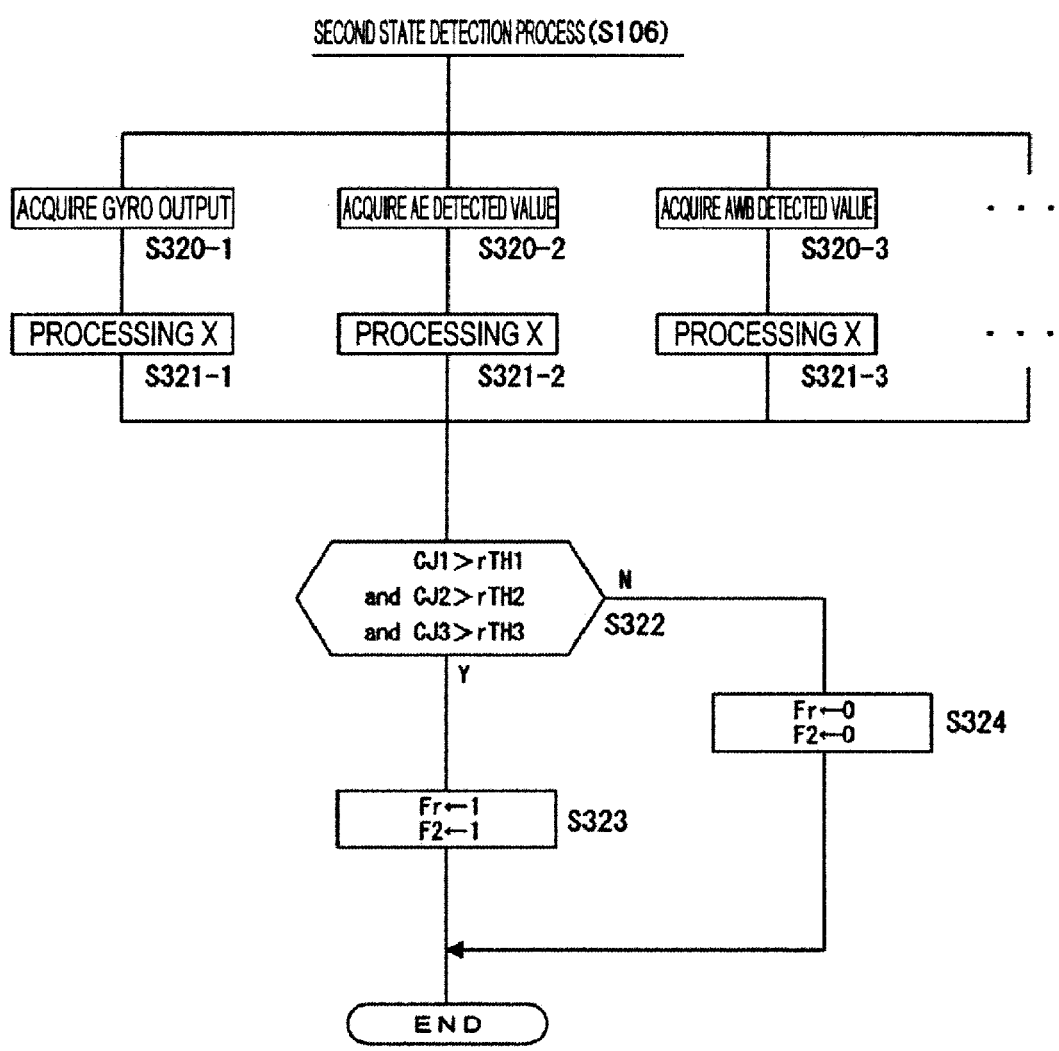

[Fig. 16]
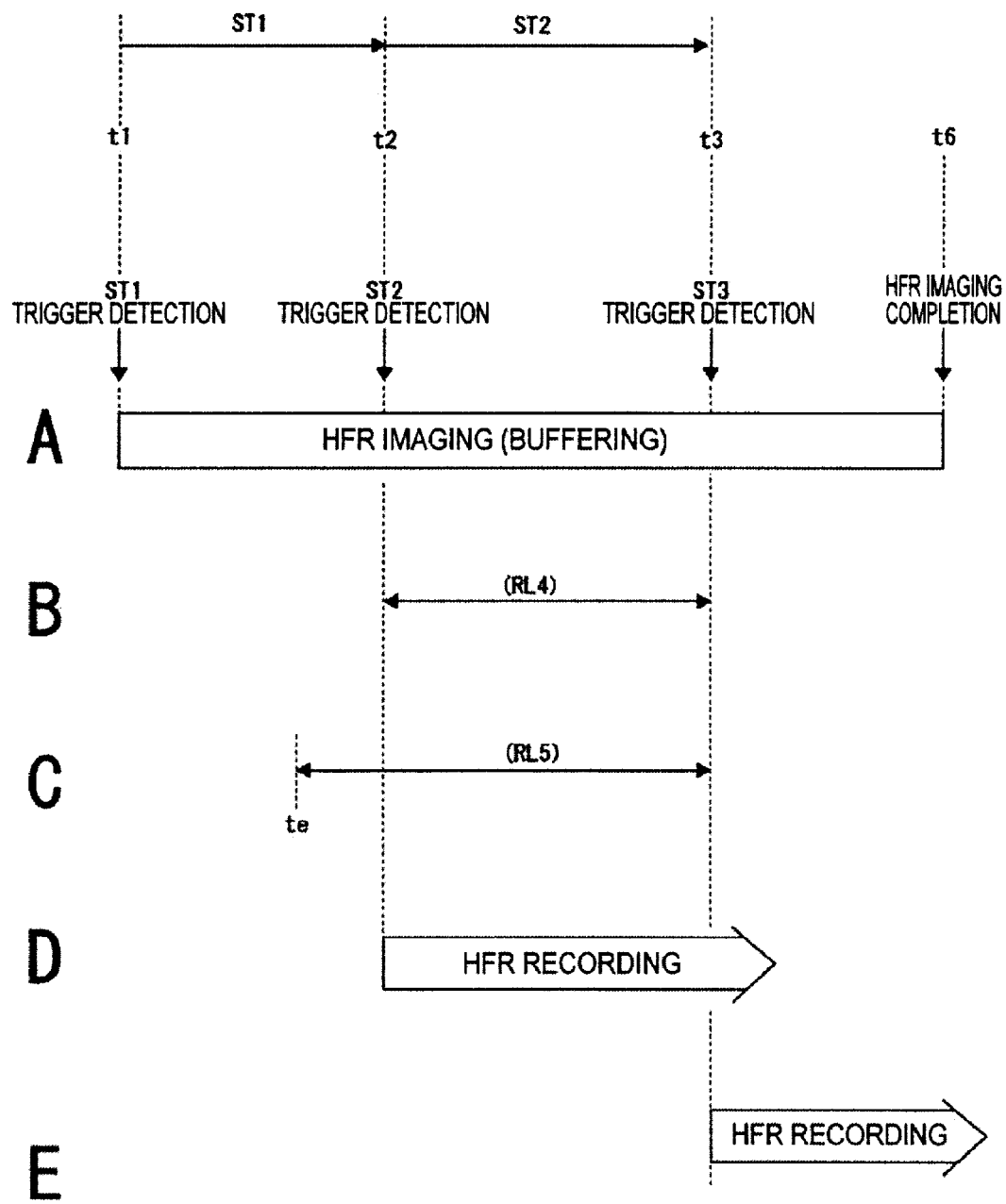

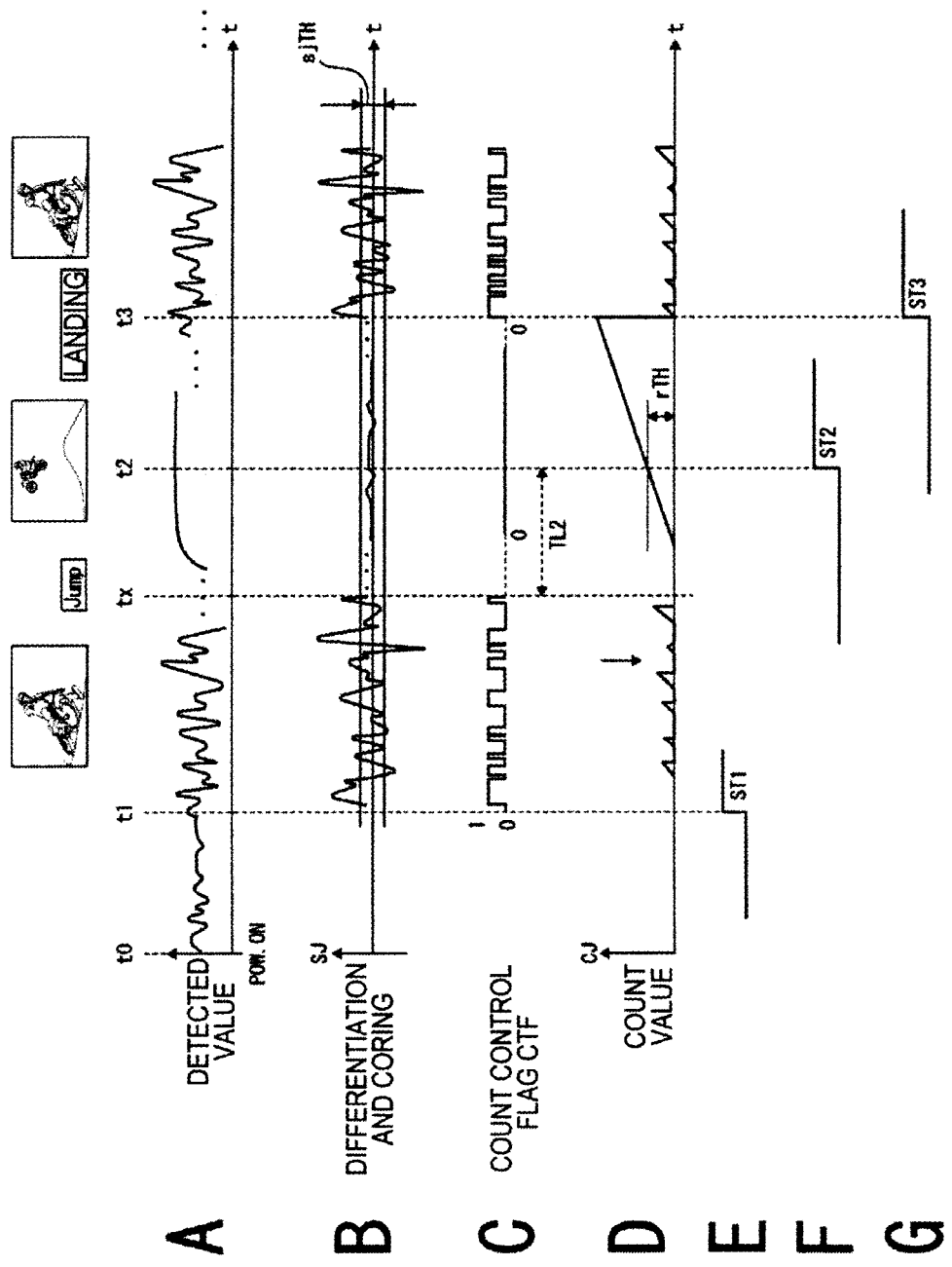

[Fig. 18]
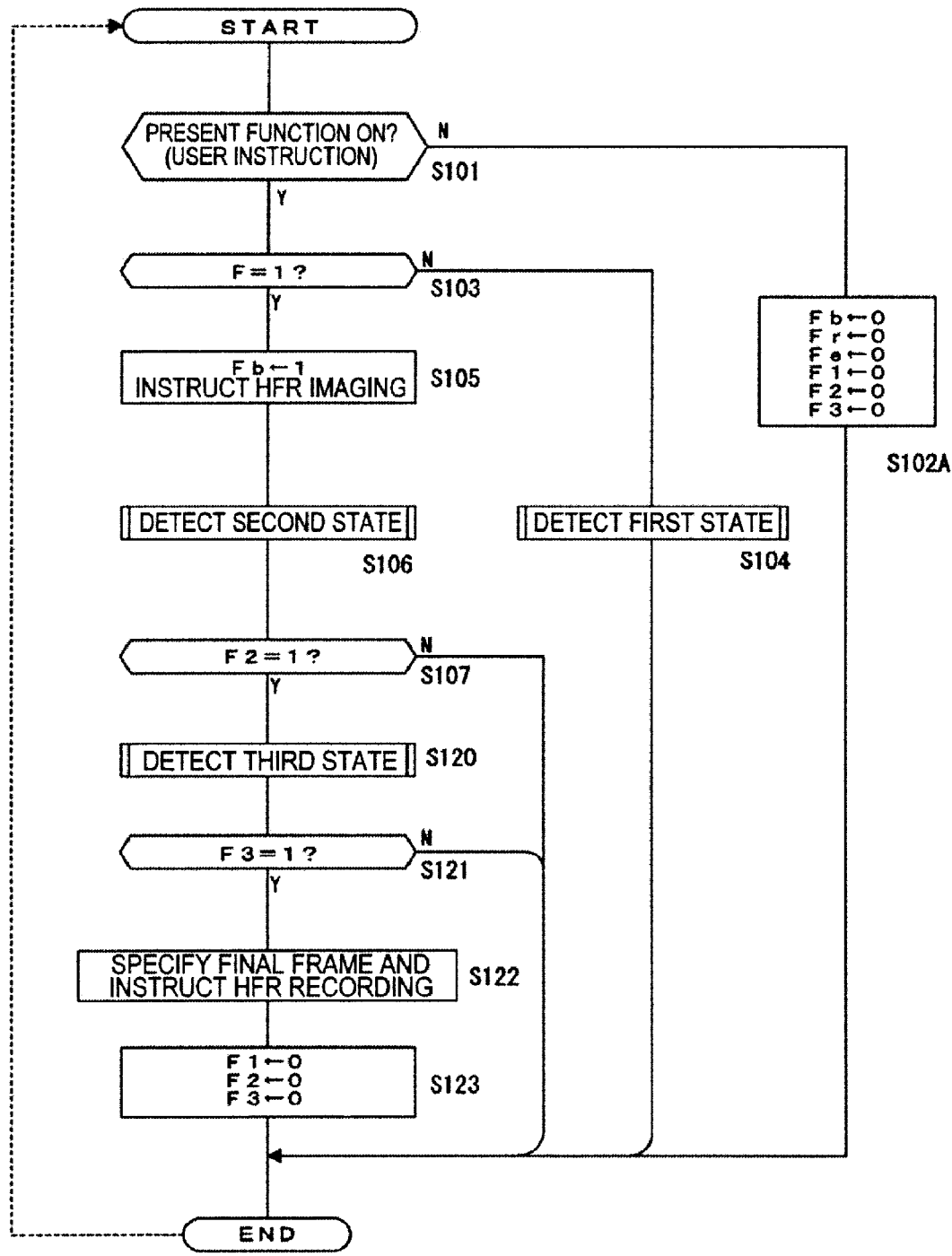

[Fig. 19]
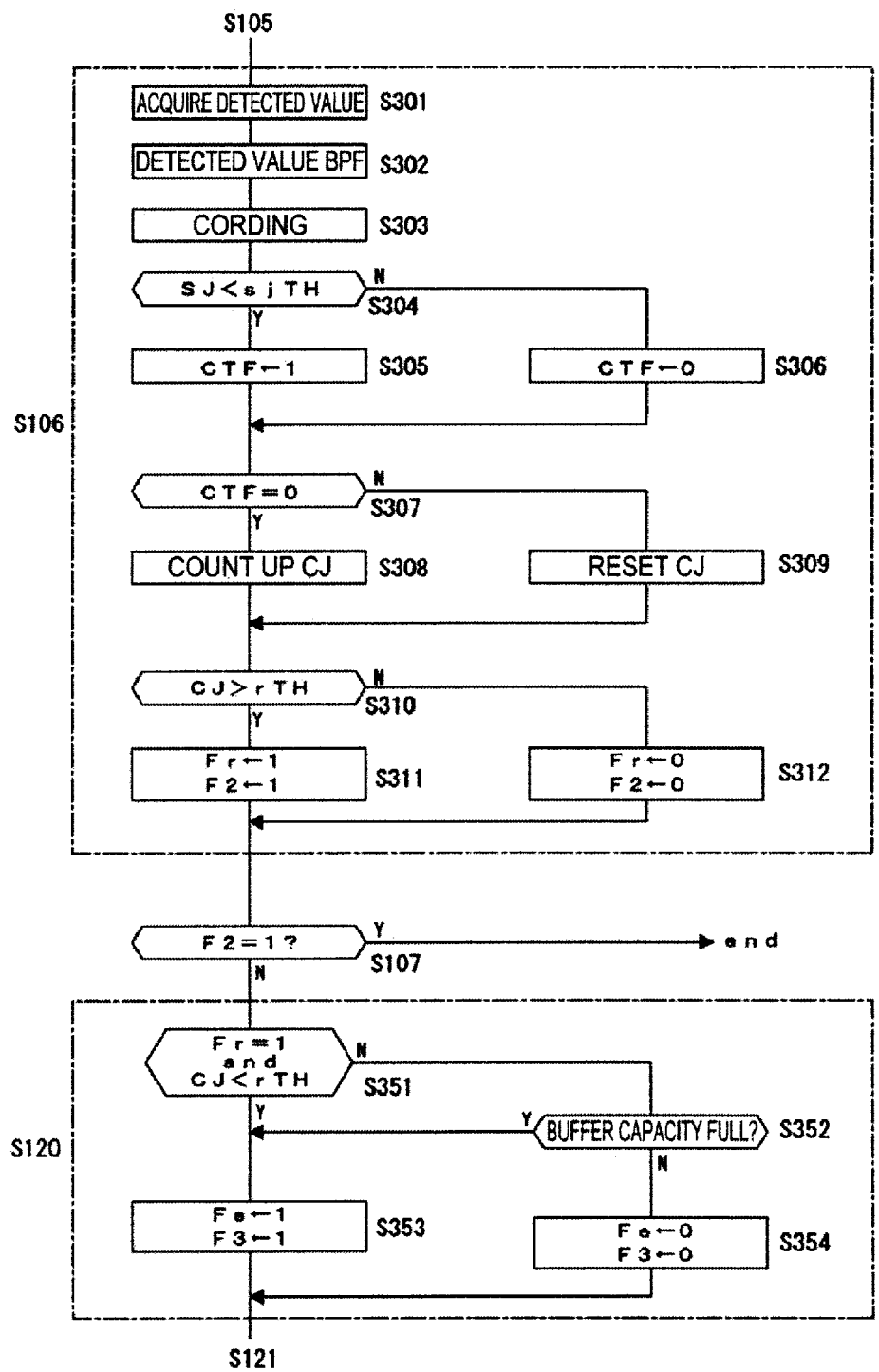

[Fig. 20]
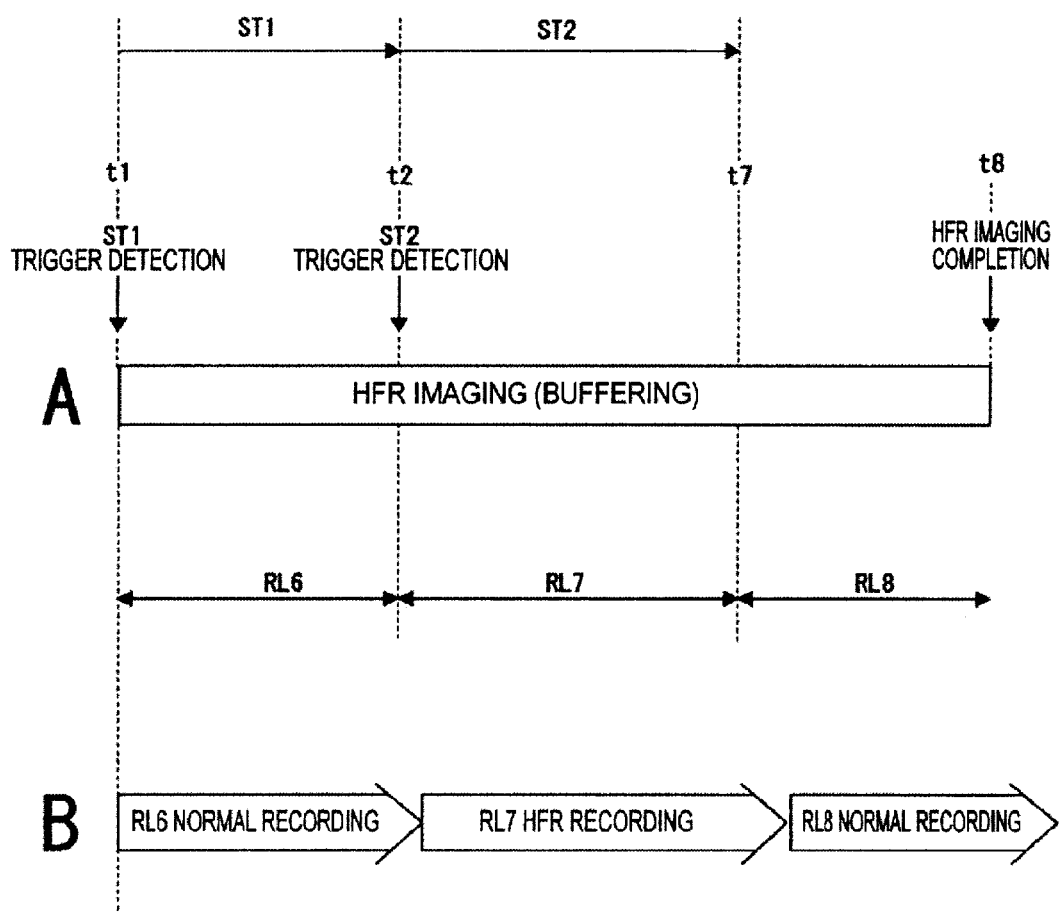

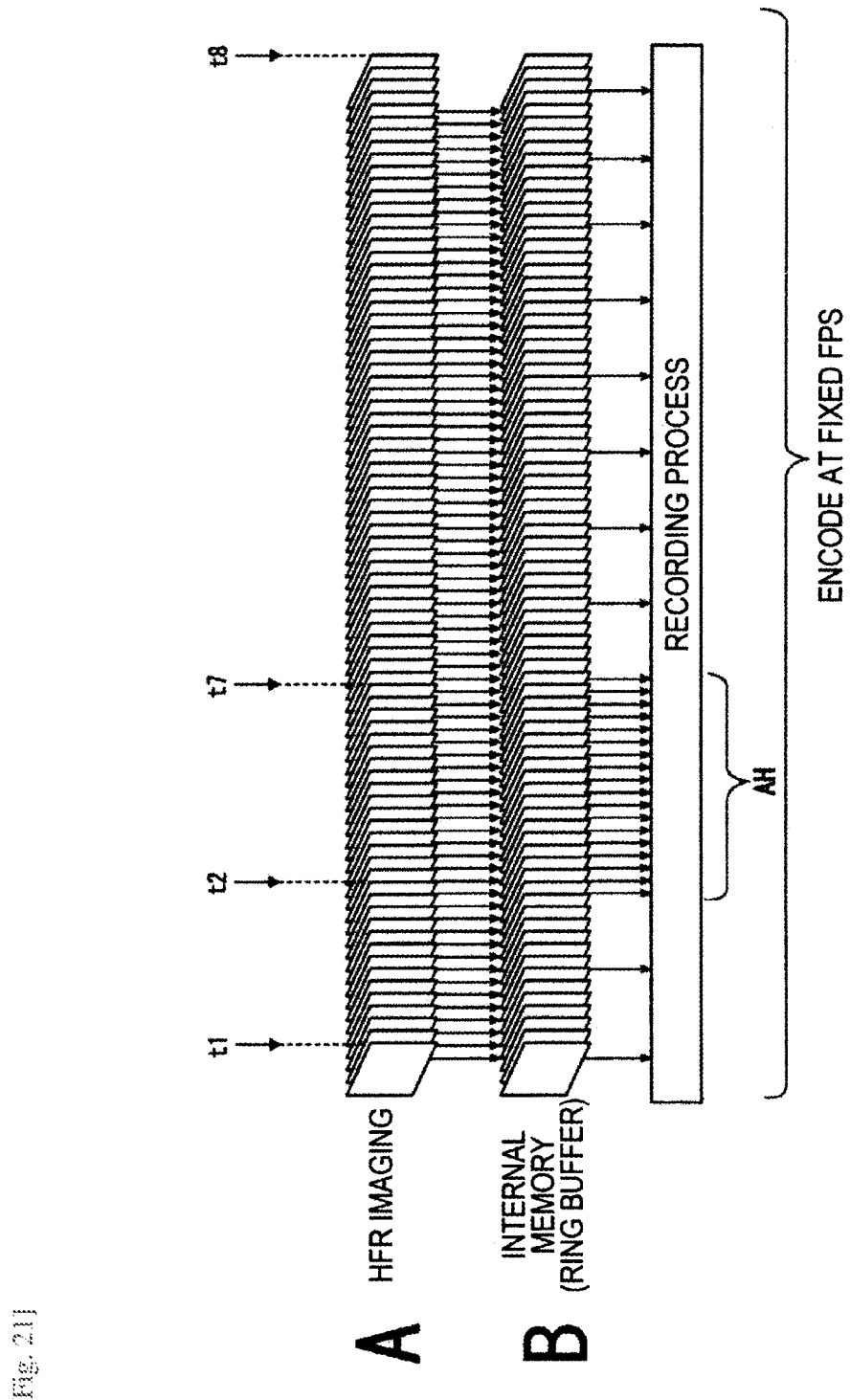

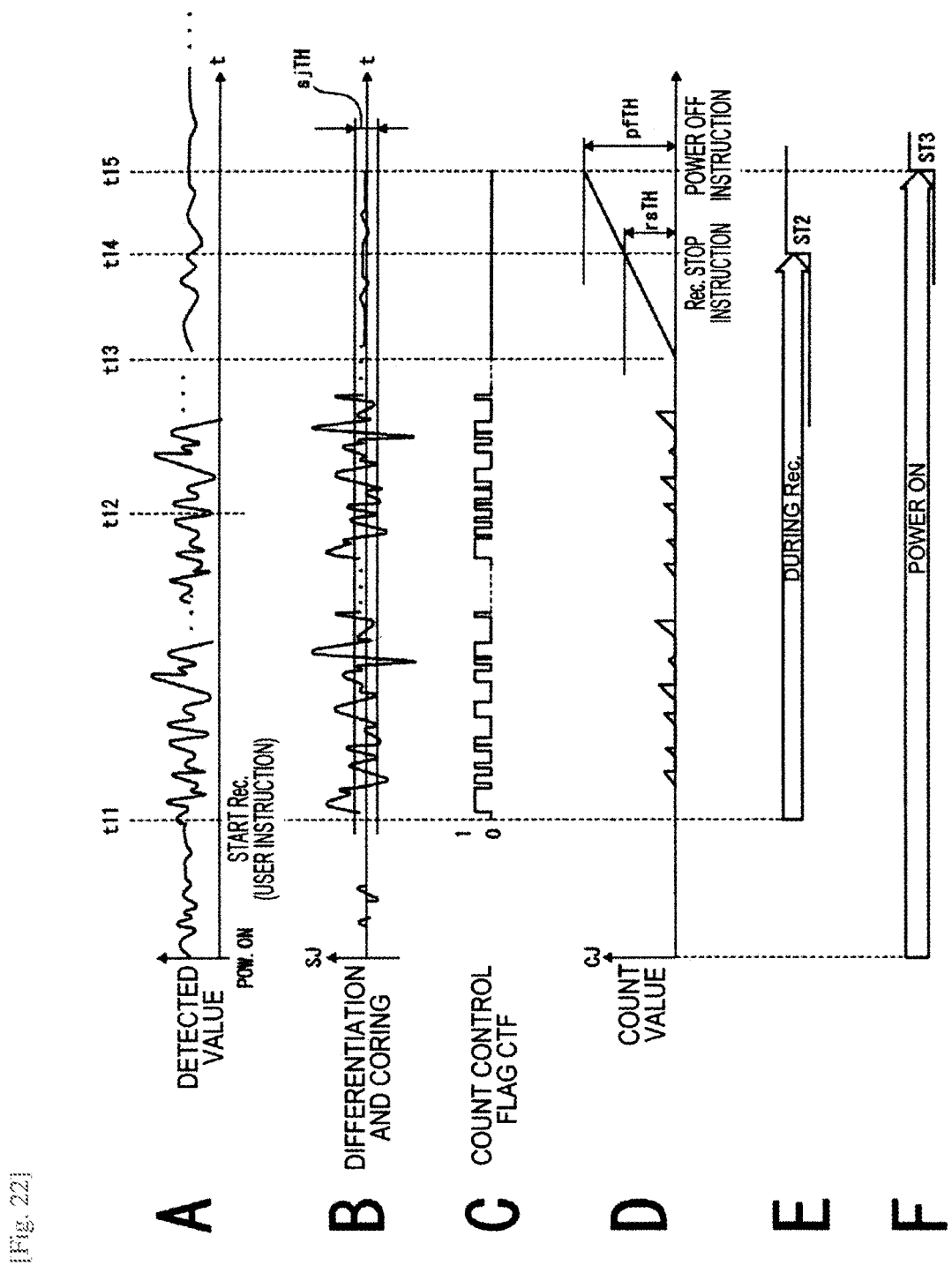

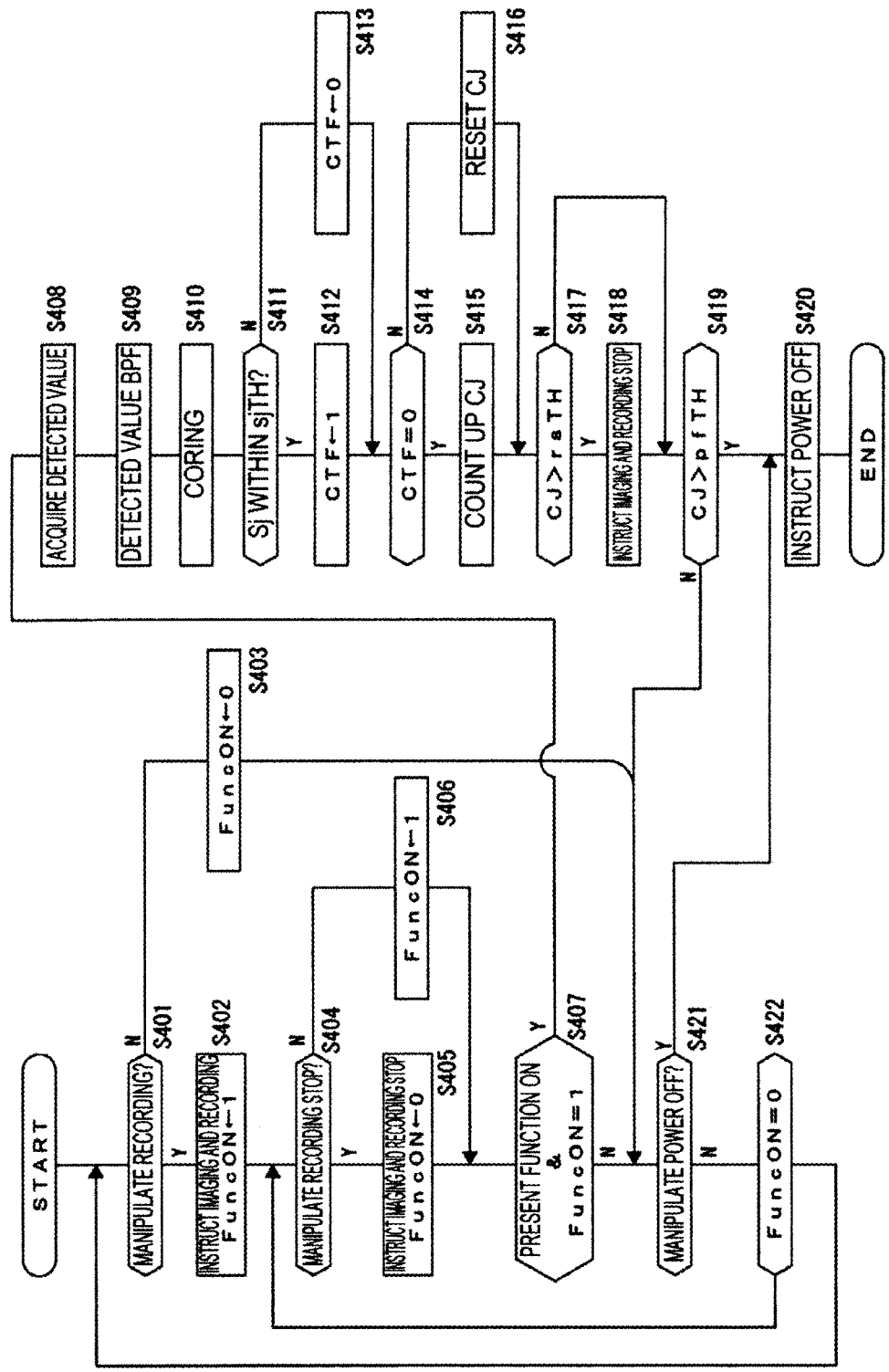
[Fig. 23]

[Fig. 24]
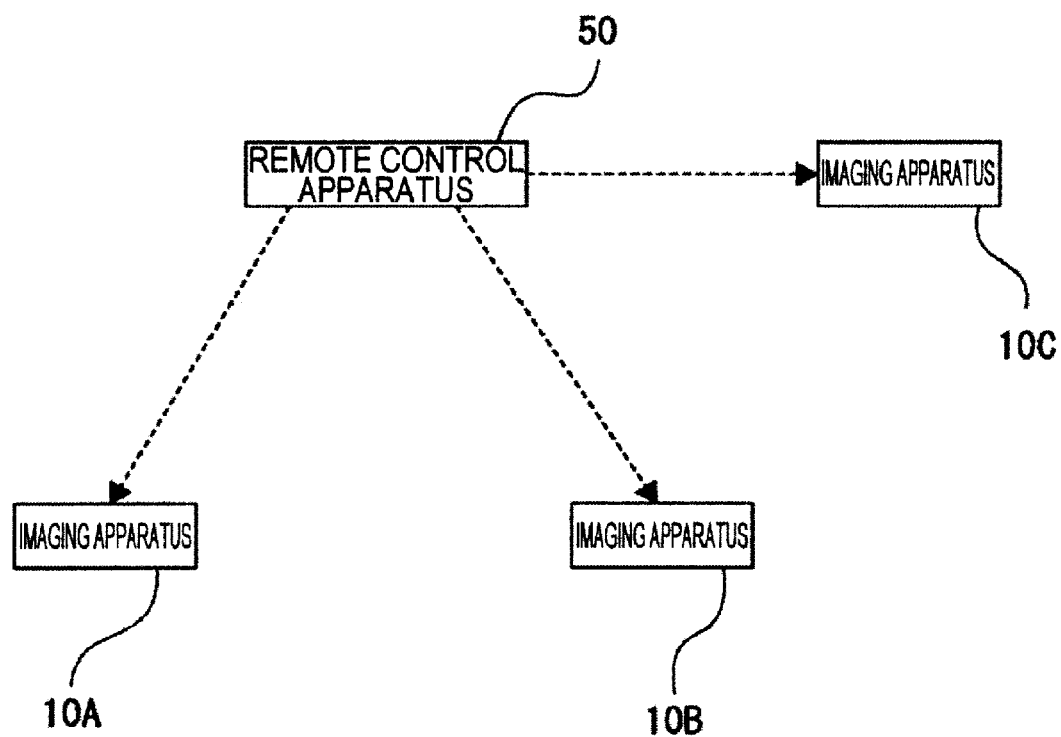

[Fig. 25]
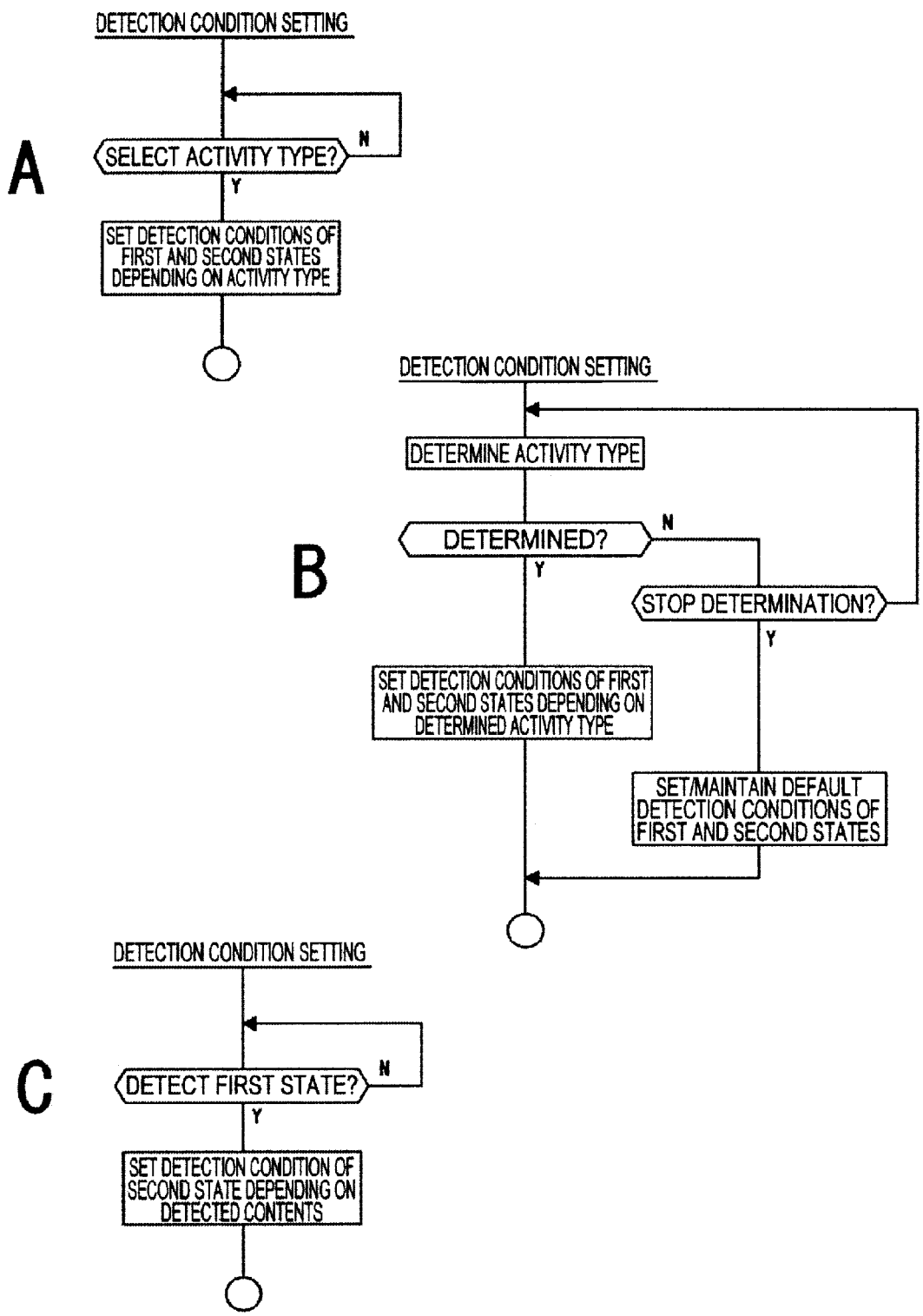

IMAGING CONTROL APPARATUS, IMAGING CONTROL METHOD, AND NON-TRANSITORY COMPUTER-READABLE MEDIUM

CROSS REFERENCE TO RELATED APPLICATIONS

This present application is a continuation application of application Ser. No. 15/758,768, filed Mar. 9, 2018 which is a US Nationalization of PCT/JP2016/088686 filed Dec. 26, 2016 and claims priority to Japanese Priority Patent Application JP 2016-005453 filed Jan. 14, 2016, the entire contents of which are incorporated herein by reference.

TECHNICAL FIELD

The present technology relates to an imaging control apparatus, an imaging control method and a program, and more particularly, to technology for performing an imaging operation in response to a situation or a state during the use of an imaging device or the like.

BACKGROUND ART

For example, technologies for causing an imaging device to automatically perform imaging according to a predetermined condition instead of user manipulation, as described in Patent Literatures 1, 2 and 3, are known.

CITATION LIST

Patent Literature

[PTL 1]
JP 4757173B
[PTL 2]
JP 4998122B
[PTL 3]
JP 2009-302772A

SUMMARY

Technical Problem

Incidentally, as the size of imaging devices has decreased and the performance thereof has improved recently, the use of digital video cameras in various imaging environments has been expanding.

As an example, cameras having shock resistance and water resistance in a genre called "action cameras" have appeared. Cameras in this genre are also called "wearable cameras" in light of their characteristics and are considered to be useful because they can be used while attached to the body using a mount to perform imaging at angles or in situations at which or in which general cameras may not perform imaging.

A characteristic of cameras in this genre is that they are used while attached to a member such as an accessory that is put on the body or gear for enjoying an activity (e.g., a snowboard, surf board, bike, helmet or the like) in many cases. In addition, user interface parts such as an operation switch and a display unit tend to be insufficient according to miniaturization. Accordingly, a user (a person who performs an activity) has difficulty performing recording start and stop operations.

Furthermore, imaging only a so-called important scene, switching only the important scene to a special mode and the like are difficult due to deterioration of operability. For example, even imaging a high-definition image or an image to which special effects have been added becomes easy according to recent performance improvement. However, it is hard to perform switching to such a mode during an activity. For example, when a snowboarder puts a camera on his or her body, it may not possible to switch modes at a moment at which he or she jumps. Accordingly, there are situations in which functions are not utilized and recording is performed for a long time in a mode which wastes recording capacity.

Accordingly, it is desirable to provide a method of enabling a user to perform a desired imaging operation with respect to a device having insufficient user interfaces, a device used in a state in which operation is difficult to perform during use or the like.

Solution to Problem

According to an embodiment of the present technology, there is provided an imaging control apparatus including: a controller having a state detection unit configured to receive a sensing signal from a sensor, detect an imaging environment of an imaging apparatus becoming a first state, and detect a transition of the imaging environment from the first state to a second state based at least in part on the sensing signal; and a mode processing instruction unit configured to instruct a first imaging operation in a first mode on a basis of detection of the imaging environment of the imaging apparatus becoming the first state, and instruct a second imaging operation in a second mode on a basis of detection of the transition of the imaging environment from the first state to the second state.

The imaging environment is a situation or a state of an object on which an imaging apparatus or a remote control apparatus that remotely controls the imaging apparatus is mounted or a subject of the imaging apparatus with respect to use of the imaging apparatus or the remote control apparatus. "Mode" represents a state of an operation as an imaging operation of the imaging apparatus.

The state detection unit detects the first state and the second state with respect to the imaging environment. A predetermined imaging operation is set for each of the first state and the second state, and the mode processing instruction unit performs control in response to a state detected by the state detection unit. That is, when the first state is detected, the mode processing instruction unit indicates the first mode at the detection time or a time after the detection time. When the second state is detected, the mode processing instruction unit indicates the second mode at the detection time or a predetermined time after the detection time.

In the imaging control apparatus according to an embodiment of the present technology, the state detection unit is further configured to detect the imaging environment as one of an object on which the imaging apparatus is mounted, a subject of the imaging apparatus, or a second object on which a device capable of communicating with the imaging apparatus is mounted.

That is, a situation or a state of a person using the imaging apparatus or the remote control apparatus, a person carrying the imaging apparatus or the remote control apparatus, an animal carrying the imaging apparatus or the remote control apparatus, an object on which the imaging apparatus or the remote control apparatus is mounted or a subject of the imaging apparatus is detected as the imaging environment.

For example, a state in which a person serving as an object on which the imaging apparatus or the remote control apparatus is mounted starts a certain game is considered as the first state, and a specific action during the game is considered as the second state.

In the imaging control apparatus according to an embodiment of the present technology, to detect the transition of the imaging environment from the first state to the second state based on the sensing signal, the state detection unit is further configured to detect a non-manipulated action of an object on which the imaging apparatus is mounted, detect a non-manipulated action of a subject of the imaging apparatus, or detect a non-manipulated action of a second object on which a device capable of communicating with the imaging apparatus is mounted, the non-manipulated action is an indirect interaction between the imaging apparatus and a user.

While the second detection performed in the first state includes detecting a motion of the object on which the imaging apparatus is mounted or the subject, the motion is not, particularly, a motion for manipulation relating to imaging and a specific motion is detected as the second state.

In the imaging control apparatus according to an embodiment of the present technology, to detect the imaging environment of the imaging apparatus becoming the first state, the state detection unit is further configured to detect a manipulation action of a person corresponding to the object on which the imaging apparatus is mounted, or detect the subject of the imaging apparatus, the manipulated action is a direct interaction between the imaging apparatus and the user.

Transition to the first state is determined by manipulation based on intention of a user of the imaging apparatus or the remote control apparatus. For example, when initiation of an action of sports, an activity or the like is set to the first state, the imaging operation in the first mode is started on the basis of a user intention by detecting initiation of the action through a user manipulation.

In the imaging control apparatus according to an embodiment of the present technology, the state detection unit is further configured to detect a second transition from the second state to a third state, and the mode processing instruction unit is further configured to instruct at least the second imaging operation performed in the second mode to end on a basis of detection of the second transition from the second state to the third state.

That is, the second mode in which execution is instructed in the second state is controlled to be ended by detecting the third state.

In the imaging control apparatus according to an embodiment of the present technology, to instruct the first imaging operation in the first mode, the mode processing instruction unit is further configured to buffer captured image data in a memory in a form of a ring memory, and to instruct the second imaging operation in the second mode, the mode processing instruction unit is further configured to set a range of the captured image data that has been buffered in the memory, and store the range of the captured image data as recorded images.

That is, buffering of captured image data is initiated in response to detection of the first state. Then, a range of images transmitted to a predetermined recording medium and stored therein as recorded images during or after buffering is set in response to detection of the second state.

In the imaging control apparatus according to the above embodiment of the present technology, the controller is further configured to control a capture of image data at one of a first frame rate or a second frame rate that is higher than the first frame rate to generate the captured image data, and the captured image data has been captured at the second frame rate.

In the imaging control apparatus according to an embodiment of the present technology, to instruct the first imaging operation in the first mode, the mode processing instruction unit is further configured to store captured image data of a first period corresponding to the first state as recorded images at a first frame rate, and to instruct the second imaging operation in the second mode, the mode processing instruction unit is further configured to store captured image data of a second period corresponding to the second state as recorded images at a second frame rate that is higher than the first frame rate.

That is, captured image data of a period corresponding to the first state is recorded at a first frame rate and captured image data of a period corresponding to the second state is recorded at a second frame rate (high frame rate).

In the imaging control apparatus according to the above embodiment of the present technology, to instruct the first imaging operation in the first mode, the mode processing instruction unit is further configured to buffer the captured image data of the first period at the second frame rate in a memory in a form of a ring memory.

In the imaging control apparatus according to an embodiment of the present technology, the state detection unit is further configured to detect a second transition from the second state to a third state, to instruct the first imaging operation in the first mode, the mode processing instruction unit is further configured to store captured image data as recorded images, to instruct the second imaging operation in the second mode, the mode processing instruction unit is further configured to stop recording of the captured image data, and the mode processing instruction unit is further configured to instruct power off of the imaging apparatus on a basis of detection of the second transition from the second state to the third state.

That is, captured image data of a period corresponding to the first state is recorded, and recording is ended in response to detection of the second state. Further, the imaging apparatus is powered off through detection of the third state.

In the imaging control apparatus according to an embodiment of the present technology, the state detection unit is further configured to receive the sensing signal of the sensor mounted in one of the imaging apparatus or a device capable of communicating with the imaging apparatus, and responsive to receiving the sensing signal, the state detection unit is further configured to detect at least one of the imaging environment of the imaging apparatus becoming the first state or the transition of the imaging environment from the first state to the second state.

As a sensor mounted in the imaging apparatus and a device (e.g., remote control apparatus) which can communicate with the imaging apparatus, for example, a vibration sensor, an acceleration sensor, an angular velocity sensor, a gravity sensor, a position sensor, a sound sensor (microphone), a sound pressure sensor, an illuminance sensor, an optical sensor, a temperature sensor or the like is considered. Imaging environments of the first state and the second state are detected through such a sensor.

In the imaging control apparatus according to an embodiment of the present technology, the state detection unit is further configured to capture image data acquired by the imaging apparatus, and responsive to capturing the image data, the state detection unit is further configured to detect at least one of the imaging environment of the imaging apparatus becoming the first state or the transition of the imaging environment from the first state to the second state.

Imaging environments (the first state and the second state) as various situations of a subject are detected through image analysis of captured image data. For example, a gesture of the subject may be detected from captured image data. Further, while control such as automatic focus (AF), automatic iris (AE) or automatic white balance (AWB) is performed based on captured image data, AF, AE or AWB is control depending on the situation of the subject, and thus a control value of AF, AE, AWB or the like is a value for detecting an imaging environment as the situation of the subject. In addition, a motion vector of the subject may be detected from an image to determine an imaging environment.

In the imaging control apparatus according to an embodiment of the present technology, the state detection unit is further configured to determine a communication state between the imaging apparatus and a device capable of communicating with the imaging apparatus, and responsive to determining the communication state, the state detection unit is further configured to detect at least one of the imaging environment of the imaging apparatus becoming the first state or the transition of the imaging environment from the first state to the second state.

For example, when communication between the imaging apparatus and an apparatus which can communicate with the imaging apparatus, such as the remote control apparatus, is ceased for a predetermined time, it may be determined that there is a variation in the imaging environment.

In the imaging control apparatus according to an embodiment of the present technology, to detect at least one of the imaging environment of the imaging apparatus becoming the first state or the transition of the imaging environment from the first state to the second state based on the sensing signal, the state detection unit is further configured to set a detection condition based on an activity type of an object on which the imaging apparatus is mounted.

For example, spots or activity type is determined and a trigger of the first state and a trigger of the second state are set depending on the determined type.

In the imaging control apparatus according to an embodiment of the present technology, to detect the imaging environment of the imaging apparatus becoming the first state, the state detection unit is further configured to set a plurality of detection conditions, and responsive to detecting the imaging environment of the imaging apparatus becoming the first state, to detect the transition of the imaging environment from the first state to the second state based on the sensing signal, the state detection unit is further configured to set a detection condition based on a type of a detection condition from the plurality of detection conditions.

When the first state is detected according to various detection conditions, the detection condition of the second state is selected depending on detection conditions when the first state is detected.

In the imaging control apparatus according to the above embodiment of the present technology, to detect the transition of the imaging environment from the first state to the second state based on the sensing signal, the state detection unit is further configured to consider two or more detection conditions from a second plurality of detection conditions.

In the imaging control apparatus according to the above embodiment of the present technology, the plurality of detection conditions are associated with one of a plurality of predetermined activities, the controller is further configured to receive an input that is indicative of a user selection of the one of the plurality of predetermined activities.

In the imaging control apparatus according to the above embodiment of the present technology, the controller is further configured to match the one of the plurality of predetermined activities to an activity of a user based on the sensing signal from the sensor, and wherein the sensor is mounted in one of the imaging apparatus or a device capable of communicating with the imaging apparatus.

According to an embodiment of the present technology, there is provided an imaging control method. The imaging control method including: receiving, with a state detection unit of a controller, a sensing signal from a sensor, detecting, with the state detection unit, an imaging environment of the imaging apparatus becoming a first state, instructing, with a mode processing instruction unit of the controller, a first imaging operation in a first mode on a basis of detection of the imaging environment of the imaging apparatus becoming the first state, detecting, with the state detection unit, a transition from the first state to a second state based at least in part on the sensing signal, and instructing, with the mode processing instruction unit, a second imaging operation in a second mode on a basis of detection of the transition of the imaging environment from the first state to the second state.

Operations of the imaging apparatus may be accurately controlled depending on the imaging environment according to the imaging control method.

A non-transitory computer-readable medium comprising a program according to an embodiment of the present technology causes an operation processing unit to execute the aforementioned procedures of the imaging control method. Apparatuses that perform the technology of the present disclosure may be realized in a wide range according to the program.

Advantageous Effects of Invention

According to an embodiment of the present technology, it may be possible to cause an imaging apparatus to perform a desirable imaging operation in response to a variation in an imaging environment such as a user situation with respect to a device used in a state in which operation during use is difficult to perform, or the like.

The effects described above are not necessarily limitative, and there may be achieved any one of the effects described in this specification.

BRIEF DESCRIPTION OF DRAWINGS

FIG. 1 is a block diagram of a configuration of an imaging control apparatus according to a first embodiment of the present technology.

FIG. 2 is a flowchart of a process of the imaging control apparatus according to the first embodiment of the present technology.

FIG. 3 is an explanatory diagram of the appearances of an imaging apparatus and a remote control apparatus according to an embodiment.

FIG. 4 is a block diagram of an imaging apparatus according to an embodiment.

FIG. 5 is a block diagram of a remote control apparatus according to an embodiment.

FIG. 6 is an explanatory diagram of focal area decision according to an embodiment.

FIG. 7 is an explanatory diagram of motion vector detection according to an embodiment.

FIG. 8 is an explanatory diagram of an example of an operation of an imaging apparatus according to a second embodiment.

FIG. 9 is an explanatory diagram of buffering of an imaging apparatus according to an embodiment.

FIG. 10 is an explanatory diagram of a state detection method of an imaging apparatus or a remote control apparatus according to an embodiment.

FIG. 11 is an explanatory diagram of an example of state detection according to the second embodiment.

FIG. 12 is a flowchart of overall processing of the second embodiment.

FIG. 13 is a flowchart of a first state detection process of the second embodiment.

FIG. 14 is a flowchart of a second state detection process of the second embodiment.

FIG. 15 is a flowchart of another example of the second state detection process of the second embodiment.

FIG. 16 is an explanatory diagram of an example of an operation of an imaging apparatus according to a third embodiment.

FIG. 17 is an explanatory diagram of an example of state detection of the third embodiment.

FIG. 18 is a flowchart of overall processing of the third embodiment.

FIG. 19 is a flowchart of a state detection process of the third embodiment.

FIG. 20 is an explanatory diagram of an example of an operation of an imaging apparatus according to a fourth embodiment.

FIG. 21 is an explanatory diagram of buffering and encoding operations according to the fourth embodiment.

FIG. 22 is an explanatory diagram of a state detection process of a fifth embodiment.

FIG. 23 is a flowchart of overall processing of the fifth embodiment.

FIG. 24 is an explanatory diagram of a sixth embodiment.

FIG. 25 is a flowchart of a process of setting state detection conditions according to a seventh embodiment.

DESCRIPTION OF EMBODIMENTS

Hereinafter, a description will be given in the following order.

<1. Imaging control apparatus of first embodiment>
<2. Imaging apparatus and remote control apparatus>
<3. Second embodiment>
<4. Third embodiment>
<5. Fourth embodiment>
<6. Fifth embodiment>
<7. Sixth embodiment>
<8. Seventh embodiment>
<9. Overview and modification examples>

1. Imaging Control Apparatus of First Embodiment

An imaging control apparatus 1 of a first embodiment and a configuration which is an object controlled by the imaging control apparatus 1 will be described with reference to FIG. 1.

FIG. 1 illustrates the imaging control apparatus 1 and an imaging apparatus 10.

The imaging control apparatus 1 may be configured as a single device or included in the imaging apparatus 10. Furthermore, the imaging control apparatus 1 may be included in a device which can communicate with the imaging apparatus 10. While there is a remote control apparatus (remote controller or the like), which will be described below, as an example of the device which can communicate with the imaging apparatus 10, image reproduction apparatuses, image recording apparatuses, image editing apparatuses, information processing apparatuses and other various devices are also considered as the device which can communicate with the imaging apparatus 10.

In the example of FIG. 1, the imaging apparatus 10 includes an imaging unit 2, an imaged signal processing unit 3, a display unit 4, a recording unit 5 and a communication unit 6.

The imaging unit 2 photoelectric-converts a subject light to obtain captured image data DT.

The imaged signal processing unit 3 performs various signal processes on the captured image data DT.

The display unit 4 is used to display characters or images for user interfaces, imaged pictures (through images), reproduced images and the like. An imaging apparatus such as an action camera, which will be described below, may not include the display unit 4.

The recording unit 5 records moving image data or still image data as imaged pictures.

The communication unit 6 transmits the moving image data, still image data or other accompanying information to an external device.

A sensor unit 7 is a part which may provide detected information to the imaging control apparatus 1. Particularly, the sensor unit 7 provides detected information for determining an imaging environment (state) to the imaging control apparatus 1.

The sensor unit 7 may be included in the imaging apparatus 10 or the imaging control apparatus 1 so long as the sensor unit 7 may transmit detected information to the imaging control apparatus 1.

The imaging control apparatus 1 according to an embodiment may be implemented by a microcomputer or the like included in the imaging apparatus 10 or another device, for example. Otherwise, the imaging control apparatus 1 is implemented as software (application program) in an information processing apparatus such as a personal computer or a portable terminal (e.g., a smart phone, a tablet terminal or the like).

In any case, the imaging control apparatus 1 has functions of a state detection unit 1a and a mode processing instruction unit 1b, as illustrated in the figure.

The state detection unit 1a performs first detection of detecting an imaging environment becoming a first state and second detection of detecting transition from the first state to a second state.

The mode processing instruction unit 1b instructs the imaging apparatus 10 to perform a first mode imaging operation on the basis of detection of the first state and instructs the imaging apparatus 10 to perform a second mode imaging operation on the basis of detection of the second state.

That is, predetermined imaging operations are respectively set for the first state and the second state, and the mode processing instruction unit 1b performs control in response to a state detected by the state detection unit 1a. Here, the second state is an imaging environment after transition to the first state.

When the first state is detected, the mode processing instruction unit 1b indicates a first mode, for example, to the imaged signal processing unit 3 at the detection time or a time after the detection time. When the second state is detected, the mode processing instruction unit 1b indicates a second mode to the imaged signal processing unit 3 at the detection time or a predetermined time after the detection time.

Here, "imaging environment" refers to a situation or a state (e.g., action state) of an object on which an imaging apparatus or a remote control apparatus for remotely controlling the imaging apparatus is mounted or a subject of the imaging apparatus. Specifically, "imaging environment" is a situation or a state of a person who uses the imaging apparatus or the remote control apparatus, a person on which the imaging apparatus or the remote control apparatus is mounted, an animal on which the imaging apparatus or the remote control apparatus is mounted or an object on which the imaging apparatus or the remote control apparatus is mounted. Furthermore, "imaging environment" also includes a situation or a state of a subject of the imaging apparatus.

A certain state with respect to such imaging environment, that is, a situation of a person on which the imaging apparatus or the remote control apparatus is mounted, an object on which the imaging apparatus or the remote control apparatus is mounted or a subject of the imaging apparatus is considered as "first state" or "second state".

However, "state" does not mean an operation state with respect to imaging operations in the imaging apparatus 10. The imaging operations are processes performed by the imaging unit 1 and the imaged signal processing unit 3, for example, processes of generating the captured image data DT, various signal processes for the captured image data DT, processes related to delivery, transmission and recording of the captured image data DT and the like.

Meanwhile, "mode" refers to a state in which the imaging processing operation in the imaging apparatus 10 as in the aforementioned example is different.

FIG. 2 illustrates an example of processing according to functions of the imaging control apparatus 1, that is, the state detection unit 1*a* and the mode processing instruction unit 1*b*.

In step S1, the imaging control apparatus 1 determines whether a trigger of determining that an imaging environment becomes the first state (a signal or a value which satisfies a predetermined detection condition as the first state) is acquired with respect to detected information of the sensor unit 7.

When the trigger of determining the first state is not detected, the processing proceeds to step S3. When the imaging environment does not currently become the first state, the processing of FIG. 2 is ended and returns to step S1.

When the trigger of determining the first state is acquired, the imaging control apparatus 1 instructs the imaging apparatus 10 to perform processing in the first mode upon determining that the imaging environment becomes the first state in step S2.

After determining that the imaging environment becomes the first state, the imaging control apparatus 1 proceeds to S4 from S3 and determines whether a trigger of determining that the imaging environment becomes the second state (a signal or a value which satisfies a predetermined detection condition as the second state). When the trigger of determining the second state is not acquired, the process is ended and returns to step S1. Accordingly, step S4 of determining the second state continues in the period of the first state.

When the trigger of determining the second state is acquired, the imaging control apparatus 1 determines transition from the first state to the second state and proceeds to step S5 from step 4 to instruct the imaging apparatus 10 to perform processing in the second mode.

As illustrated in FIG. 2, the imaging control apparatus 1 performs a first detection step (S1) of detecting that the imaging environment becomes the first state and a first instruction step (S2) of instructing an imaging operation in the first mode on the basis of detection of the first state. In addition, the imaging control apparatus 1 performs a second detection step (S3 and S4) of detecting transition from the first state to the second state and a second instruction step (S5) of instructing an imaging operation in the second mode on the basis of detection of the second state.

According to this configuration, an imaging operation is performed in response to variation in the imaging environment. That is, an imaging operation under the condition that the imaging environment becomes the first state and then transition from the first state to the second state occurs may be automatically performed. Accordingly, it may be possible to improve usability and operability with respect to imaging.

More detailed embodiments will be described below.

2. Imaging Apparatus and Remote Control Apparatus

Hereinafter, an embodiment as an example of using the imaging apparatus 10 alone or the imaging apparatus 10 and the remote control apparatus 50 will be described.

Recently, cameras having shock resistance and water resistance in the genre called "action camera" have appeared and been used to perform imaging at various angles and in various states by being mounted on a body by a mount, as described above.

FIG. 3 illustrates an example of the imaging apparatus 10 called action camera. The imaging apparatus 10 is compact and lightweight and may be attached to the body or clothing of a user using an attachment or the like for the mount or attached to a gear used for sports, activity of the like. Here, the gear is a snow board, a surf board, ski, a motorbike, a bicycle, a racket, a helmet, shoes, a goggle, a diving apparatus or the like, for example.

The user may record powerful images when performing various activities such as sports, activities and plays (generically called "activity" hereinafter) by attaching the imaging apparatus 10 to the body or a gear.

It may be difficult to operate the imaging apparatus 10 in a state in which the imaging apparatus 10 is attached to the body or a gear. Accordingly, the remote control apparatus 50 is prepared. As illustrated, the remote control apparatus 50 may be attached to an arm or a leg through a belt and mounted in a portable device such as a smartphone or provided as a watch type.

For example, the user who performs an activity may control the imaging apparatus 10 by manipulating the remote control apparatus 50 carried by the user or attached to a position at which the remote control apparatus 50 may be manipulated, such as an arm.

However, there are circumstances in which it is difficult to actually perform various operations in the field of such action camera.

Since most cameras in this genre have shock resistance, water resistance and the like and thus used on the premise that the cameras are compact and are housed or attached to the body of the user or an object for photographing, an apparatus for displaying photographed images is not included in the cameras from the beginning in many cases. For example, the imaging apparatus 10 illustrated in FIG. 3 does not have a display unit.

Even if an apparatus for displaying photographed images is included in such cameras, a display apparatus having a considerably low resolution, size and quality, compared to recording picture quality, is used for maintaining the overall size, and thus the display apparatus has only a function of checking what area is photographed.

In addition, even a recording button or the like is arranged such that it is difficult to manipulate, compared to general customer-use video cameras, in many cases.

That is, it is unavoidable that the function as a user interface is not faithful.

Furthermore, the aforementioned camera is used in a state in which the camera is attached to a member such as an accessory attached to the body, a gear for enjoying activities or the like in many cases, as described above, and it is difficult for the user who is performing activity to execute operations of starting and stopping recording for the aforementioned reason with respect to the user interface.

Moreover, the user often forgets camera manipulation during activities since the user concentrates on the activities.

The aforementioned operation circumstances are the same with respect to operations using the remote control apparatus 50 as well as the operation of the imaging apparatus 10.

In addition, the circumstances with respect to operability lead to a result that functions of the imaging apparatus 10 may not be effectively exerted.

In the past, there were imaging apparatuses, mainly for business use, including slow motion recording reproduction functions (HFR recording) which may achieve representation of impressive images with high picture quality by photographing images at a frame rate of a normal TV frame rate, for example, 60 frames per second (fps), or higher during imaging and recording operations and reproducing images at the TV frame rate during reproduction operation. Such imaging function has appeared in customer-use cameras with recent development of technology. The imaging function is realized even in a small camera referred to as the aforementioned "action camera". For example, imaging at 960 fps, 240 fps or the like as a high frame rate (referred to hereinafter as "HFR") may be possible.

In HFR imaging, many recording regions are necessary compared to normal imaging and recording start and stop timings are considered to be important in visibility and image representation.

However, it is very difficult to perform HFR imaging at an appropriate timing for the aforementioned reason of operability. Consequently, recording at a timing which does not correspond to a desired timing of the user is instructed to be started or stopped in many cases.

Although operations using the remote control apparatus 50 may be considered with respect to recording timing, there are many use cases in which it is difficult to even use the remote control apparatus 50 from the beginning according to activity type.

Furthermore, although the user intentionally performs a power on operation and a recording start operation in order to initiate imaging, there are many cases in which the user has difficulty in determining an imaging operation state during activity and the user easily forgets a recording stop operation and a power off operation while the user who has started imaging is absorbed in the activity even if a desired recording period is finished, resulting in unnecessary memory consumption and battery consumption. Accordingly, when the user intends to actually perform the next imaging operation, memory capacity or battery residual amount becomes insufficient frequently.

Therefore, in an embodiment, an imaging apparatus which automatically performs recording start and stop operations when predetermined conditions are detected without control of HFR recording timing by a user is provided to satisfactorily realize HFR recording in action cameras.

Otherwise, an imaging apparatus which automatically performs a recording stop operation and a power off operation when predetermined conditions are detected even when the user does not perform the recording stop operation and power off operation is provided to solve problems associated with unnecessary memory consumption, power consumption or power/recording system operability in action cameras.

An example of a configuration of the imaging apparatus 10 of the embodiment is illustrated in FIG. 4. An example of a configuration of the remote control apparatus 50 is illustrated in FIG. 5.

The embodiment of the imaging apparatus 10 and the remote control apparatus 50 exemplifies a case in which the components (state detection unit 1a and the mode processing instruction unit 1b) of the imaging control apparatus 1 illustrated in FIG. 1 are included in one or both of the imaging apparatus 10 and the remote control apparatus 50.

The imaging apparatus 10 of FIG. 4 is so-called digital video camera and an apparatus which photographs/records moving images and still images.

The imaging apparatus 10 includes an optical system 11, an imager 12, an optical system driver 13, a sensor unit 14, a recording unit 15, a wireless communication unit 16, a sound detection unit 17, a power supply unit 18, a digital signal processing unit 20, a controller 30, a display unit 34 and an operating unit 35.

The optical system 11 includes lenses such as a cover lens, a zoom lens, a focus lens and the like and a throttle mechanism. Light from a subject is condensed onto the imager 12 according to the optical system 11.

The imager 12 includes an imaging element of a complementary metal oxide semiconductor (CMOS) type, charge coupled device (CCD) type or the like, for example.

The imager 12 performs, for example, correlated double sampling (CDS), automatic gain control (AGC) and the like on electrical signals obtained through photoelectric conversion in the imaging element and further executes analog-to-digital conversion. Then, the imager 12 outputs an imaged signal (captured image data DT) as digital data to the following digital signal processing unit 20.

The optical system driver 13 drives the focus lens of the optical system 11 to perform a focus operation under the control of the controller 30. In addition, the optical system driver 13 drives the throttle mechanism to adjust exposure under the control of the controller 30. Furthermore, the optical system driver 13 drives the zoom lens of the optical system 11 to perform a zoom operation under the control of the controller 30.

The focus lens is driven to perform autofocusing for controlling the operation of the optical system driver 13 by the controller 30 in response to detection of a focusing state of an imaged picture and to perform manual focusing for controlling the operation of the optical system driver 13 by the controller 30 in response to manipulation of a focus operator by the user.

The digital signal processing unit 20 is configured as an image processor such as a digital signal processor (DSP). The digital signal processing unit 20 performs various signal processes on a digital signal (captured image data DT) from the imager 12.

For example, the digital signal processing unit 20 includes a camera signal processor 21, a resolution converter 22, a coding unit 23, a camera control detection processor 24, an internal memory 25, a memory controller 26, etc.

The camera signal processor 21 performs a clamping process for clamping black levels of R, G and B to predetermined levels for the captured image data DT from the imager 12, a correction process for color channels of R, G and B and the like. In addition, the camera signal processor 21 generates (separates) a luminance (Y) signal and a chrominance (C) signal from image data of R, G and B.

The resolution converter 22 performs resolution conversion for the image data on which various signal processes have been performed.

The coding unit 23 performs a coding process for recording or communication for the resolution-converted image data.

The camera control detection processor 24 performs a detection process for automatic focus control, automatic iris control and the like, image analysis for state determination and the like, which will be described below, and the like.

For automatic focus control, for example, the camera control detection processor 24 receives the captured image data DT, for example, the captured image data DT which has passed through a processing procedure or a process of the camera signal processor 21, discriminates a focused area from a nonfocused area in one frame of the captured image data DT and outputs focused area information indicating the focused area to the controller 30.

Specifically, the camera control detection processor 24 divides captured image data DT of one frame FR into a plurality of regions, as illustrated in A of FIG. 6. Although the illustrated example is an example for description, the regions are set as regions w1 to w36, for example. The number of actually divided regions may be appropriately set.

Then, it is determined whether each of the regions w1 to w36 is a focused area or a nonfocused area.

For example, a process as illustrated in B of FIG. 6 is performed on one region w(n). That is, processing through a Y generator 41 to an integrator 46 is performed on each piece of pixel data constituting the region w(n).

The Y generator 41 simply generates a Y signal. Then, a high pass filter (HPF) 42 extracts a high-frequency component from the generated Y signal and an absolute value obtaining unit 43 obtains an absolute value, that is, extracts the high-frequency component as an absolute value. Thereafter, a coring unit 44 removes high-frequency component noise, a limiter 45 performs a limiting process and the integrator 46 performs an integration process.

That is, with respect to each region w(n), high-frequency components of pixel data constituting the region w(n) are integrated to obtain an evaluation value CS as a result of integration. Edge components remarkably appear in a focused area and thus the evaluation value CS as an integrated value of high-frequency components increases therein. Accordingly, information for determining whether the region w(n) is a focused area or a nonfocused area is obtained by comparing the evaluation value CS with a predetermined focus area determination threshold value.

The camera control detection processor 24 determines whether each of the regions w1 to w36 is a focused area or a nonfocused area in this manner, for example, and outputs focused area information as a determination result to the controller 30.

Determination of a focused area may not be performed for each of the rectangular regions and may be performed for a circular region, a polygonal region or a region having an undefined form, for example.

Processing for focus control has been described. For exposure control, the camera control detection processor 24 calculates a value by integrating luminance with respect to each of the regions w1 to w36 illustrated in A of FIG. 6.

For white balance adjustment, the camera control detection processor 24 calculates values by integrating R, G and B signals with respect to each of the regions w1 to w36 shown in A of FIG. 6.

In addition, the camera control detection processor 24 detects a motion vector in an image.

For example, the camera control detection processor 24 detects a motion vector between two frames using block matching. In detection of the motion vector between the two frames, a plurality of target frames is set with respect to an original frame and block matching is performed for each of the plurality of target frames.

As an example, 16 target blocks TGi (i=1, 2, ..., 16), for example, are set for the original frame and 16 projected images 104$i$ (i=1, 2, ..., 16) corresponding to the 16 target blocks of the original frame are set for a reference frame 102, as illustrated in FIG. 7. Then, search ranges 105$i$ (i=1, 2, ..., 16) are set for the respective projected images, and SAD tables TBLi (i=1, 2, ..., 16) with respect to the target blocks corresponding thereto are respectively created with respect to the search ranges 105$i$ (i=1, 2, ..., 16).

When the created 16 SAD tables TBLi of the target blocks are arranged in the vertical direction such that the 16 SAD tables TBLi are superimposed, as illustrated in FIG. 7, SAD values of reference block positions corresponding to each other in a search range for obtaining each SAD table TBLi are summed to obtain a total sum of absolute values of differences (referred to as a total SAD value). Then, a total SAD table SUM_TBL with respect to a plurality of reference block positions in one search range is generated as a SAD table composed of such total SAD values.

Here, when the SAD value of the coordinates (x, y) of each SAD table TBLi, which corresponds to the coordinates (x, y) of the total SAD table SUM_TBL, is TBLi (x, y), a total SAD value SUM_TBL (x, y) of the coordinates (x, y) of the total SAD table SUM_TBL becomes $$\text{SUM\_TBL}(x,y) = \text{TBL1}(x,y) + \text{TBL2}(x,y) + \ldots + \text{TBL16}(x,y) = \Sigma \text{TBL}i(x,y)$$

Then, a motion vector (global motion vector: camera shake vector in an imaging apparatus) of a reference image with respect to the original image is detected from the total SAD table SUM_TBL.

As a method of calculating a global motion vector from the total SAD table SUM_TBL, a general method of detecting the position of a minimum value of total SAD values in the total SAD table SUM_TBL and detecting a reference vector corresponding to the detected position of the minimum value of the total SUM values as a global motion vector may be used.

However, since the method of using the minimum value of the total SAD values may obtain only a motion vector of precision of one pixel unit, a method of detecting a global motion vector by performing approximate curved surface interpolation using a total SAD value corresponding to the position of the minimum value of the total SAD values and a plurality of total SAD values around the total SAD value is considered, for example. That is, a global motion vector with a precision of a decimal point of 1 pixel unit or less is detected by generating an approximate high-order curved surface using the total SAD value corresponding to the position of the minimum value of the total SAD values and a plurality of total SAD values around the total SAD value and detecting the position of a minimum value of the approximate high-order curved surface.

Referring back to FIG. 4, the internal memory 25 in the digital signal processing unit 20 is, for example, a storage area in which frame data as captured image data DT processed by the camera signal processor 21 is buffered. The internal memory 25 is formed as a semiconductor memory such as a dynamic random access memory (D-RAM), a static random access memory (S-RAM) or a non-volatile RAM (NV-RAM). Buffering using the internal memory 25 will be described below.

The memory controller 26 controls writing/reading of data to/from the internal memory 25. For example, the memory controller 26 performs data transfer control, management of write/read addresses according to a write pointer and a read pointer and the like.

The controller 30 is configured by a microcomputer (operation processing unit) including a central processing unit (CPU), a read only memory (ROM), a random access memory (RAM), a flash memory and the like.

The CPU integrally controls the imaging apparatus 10 by executing programs stored in the ROM, the flash memory and the like.

The RAM is a work area when the CPU performs various data processes and is used to temporarily store data, programs and the like.

The ROM and the flash memory (non-volatile memory) are used to store an operating system (OS) for control of parts by the CPU, content files such as image files, application programs for various operations, firmware, etc. Particularly, in this example, a program for performing processes for state detection and mode control in response to state determination is also stored.

The controller 30 controls operations of parts necessary for instruction of various signal processes in the digital signal processing unit 20, imaging operation and recording operation in response to user manipulation, operation of reproducing recorded image files, camera operations such as zooming, focusing and exposure adjustment, user interface operation, etc.

In the present embodiment, the controller 30 has functions as the state detection unit 1a and the mode processing instruction unit 1b. That is, the controller 30 functions as the imaging control apparatus 1 described with respect to FIG. 1.

The display unit 34 performs display to a user (person who performs imaging or the like) and includes a display device such as a liquid crystal display (LCD) or an organic electroluminescence (EL) display provided on the housing of the imaging apparatus 10, for example. The display unit 34 may be configured in the form of so-called view finder using the LCD, organic EL display or the like.

The aforementioned imaging apparatus 10 as an action camera does not include the display unit 34 in many cases.

When the display unit 34 is provided to the imaging apparatus 10, the display unit 34 includes the aforementioned display device and a display driver which causes the display device to perform display. The display driver causes the display device to perform display on the basis of instruction of the controller 30. For example, the display driver causes the display device to reproduce and display steel images and moving images, which are imaged and recorded in a recording medium, or to display a through image as a moving image according to captured image data of each frame imaged during standby of recording or during recording on the screen in response to display data (e.g., resolution-converted captured image data) from the digital signal processing unit 20.

In addition, the display driver causes various operation menus, icons, messages and the like, that is, graphical user interfaces (GPUs) to be displayed on the screen on the basis of instruction of the controller 30.

The operating unit 35 has a function of inputting user manipulation and transmits a signal in response to the input manipulation to the controller 30.

For example, the operating unit 35 is implemented as various operators and a touch pad provided to the housing of the imaging apparatus 10, a touch panel provided to the display unit 34 or the like.

As the operators provided to the housing, a reproduction menu start button, a decision button, a cross-shaped key, a cancel button, a zoom key, a slide key, a shutter button (release button), a focus ring and the like may be considered.

Various operations may be performed by manipulating the touch panel using icons and menus displayed on the touch panel and the display unit 34.

Otherwise, touch operation of the user may be detected through the touch pad or the like.

In the case of the imaging apparatus 10 as the aforementioned action camera, however, it is difficult to arrange sufficient operation keys as the operating unit 35 and thus a few key and a touch pad are considered as the operating unit 35.

The recording unit 15 is configured as a non-volatile memory, for example, and functions as a storage area for storing image files (content files) such as still image data and moving image data and attribute information of the image files, thumbnail images and the like.

Image files are stored in the form of joint photographic experts group (JPEG), tagged image file format (TIFF), graphics interchange format (GIF) or the like.

The recording unit 15 is actually configured in various forms. For example, the recording unit 15 may be a flash memory included in the imaging apparatus 10 or may be configured as a memory card (e.g., a portable flash memory) attachable/detachable to/from the imaging apparatus 10 and a card recording/reproduction unit for performing recording/reproduction access for the memory card. Alternatively, the recording unit 15 is implemented as a hard disk drive (HDD) included in the imaging apparatus 10 or the like.

In the present example, a program for causing the controller 30 to perform processing of the imaging control apparatus 1 (the state detection unit 1a and the mode processing instruction unit 1b) may be stored in the recording unit 15.

The wireless communication unit 16 performs wireless communication with an external device. For example, the wireless communication unit 16 performs communication according to wireless communication standard such as wireless fidelity (WIFI), Bluetooth and the like. In the case of this example, communication with the remote control apparatus 50, for example, is performed.

In addition, a part (not shown) for performing data communication or network communication with an external device in a wired or wireless manner may be provided to the imaging apparatus 10.

For example, the part may perform transmission/reception of captured image data (still image files and moving image files) to/from an external display apparatus, recording apparatus, reproduction apparatus and the like or perform, as a network communication unit, communication through various networks, for example, the Internet, a home network, a local area network (LAN) and the like and transmit various types of data to a server, a terminal and the like through the network.

The sound detection unit 17 detects surrounding sound of the imaging apparatus 10. Particularly, the sound detection unit 17 detects surrounding sound for detecting a state by the state detection unit 1a as an imaging environment.

While the sound detection unit 17 may be configured as a microphone, more simply, the sound detection unit 17 may be a sound pressure sensing element having a narrow frequency band.

Although the imaging apparatus 10 may include a dedicated microphone or the like as the sound detection unit 17, a microphone for collecting sounds during recording of moving images is provided to the imaging apparatus 10, in general (not shown in FIG. 4). Accordingly, the microphone for collecting sounds during recording may also be used as the sound detection unit 17 for detecting surrounding sound for state determination.

The sensor unit 14 integrally represents various sensors. For example, the sensor unit 14 includes a gyro sensor (angular velocity sensor), an acceleration sensor and the like for sensing hand shaking or overall motion of the imaging apparatus 10, such as a posture and movement (panning, tilting or the like) of the imaging apparatus 10.

In addition, an illuminance sensor for sensing external illuminance for exposure adjustment and the like and a distance measurement sensor for measuring a distance to a subject may be provided to the sensor unit 14.

Furthermore, a zoom lens position sensor for sensing the position of the zoom lens in the optical system 11 and a focus lens position sensor for sensing the position of the focus lens may be provided as the sensor unit 14.

Moreover, a sensor for sensing an opening of a mechanical iris (throttle mechanism) may be provided as the sensor unit 14.

In addition, as the sensor unit 14, a position sensor of a global positioning system (GPS) receiver or the like may be considered.

Furthermore, a gravity sensor, an optical sensor, a temperature sensor and various other sensors may be considered as the sensor unit 14.

Various sensors of the sensor unit 14 send detected information to the controller 30. The controller 30 may perform various control operations using information detected by the sensor unit 14.

The state detection unit 1a of the controller 30 may use detected information from the sensor unit 14 to determine a state as an imaging environment.

FIG. 5 illustrates an example of a configuration of the remote control apparatus 50. The remote control apparatus 50 includes a wireless communication unit 51, a digital signal processing unit 52, a display unit 53, an operating unit 54, a sound detection unit 55, a sensor unit 56 and a controller 60.

The wireless communication unit 51 performs wireless communication with the wireless communication unit 16 of the imaging apparatus 10. Transmission of, for example, control data and captured image data is performed between the wireless communication units 51 and 16.

The digital signal processing unit 52 performs decoding of data received through wireless communication with the imaging apparatus 10, processing for display and the like. When captured image data and other information are transmitted from the imaging apparatus 10, for example, the digital signal processing unit 52 performs processing for display with respect to the captured image data and causes the display unit 53 to perform display.

The display unit 53 displays display data of an imaged image, processed in the digital signal processing unit 52, and various types of notification information. For example, the display unit 53 displays an operating state of the imaging apparatus 10 and the like.

The operating unit 54 represents various operators. Various aspects of operators are considered like the operating unit 35 of the aforementioned imaging apparatus 10.

The controller 60 controls various operations in the remote control apparatus 50. Mainly, the controller 60 transmits an instruction signal (control command or the like) in response to an operation in the operating unit 54 from the wireless communication unit 51 to the imaging apparatus 10. The controller 30 of the imaging apparatus 10 may perform a process in response to the operation according to the remote control apparatus 50 by receiving the instruction signal through the wireless communication unit 16.

In addition, the controller 60 also has the functions of the imaging control apparatus 1, described with reference to FIG. 1, that is, the functions of the state detection unit 1a and the mode processing instruction unit 1b.

The sound detection unit 55 detects surrounding sound of the remote control apparatus 50. Particularly, the state detection unit 1a detects surrounding sound for determination of a state as an imaging environment. The sound detection unit 55 may also be configured as a microphone or the like.

The sensor unit 56 integrally represents various sensors as described above with respect to the sensor unit 14 of the imaging apparatus 10. Information detected by the sensor unit 56 is used for the controller 60 to determine an imaging environment (state) through the function of the state detection unit 1a.

As the sensor unit 56, for example, a vibration sensor, a gyro sensor (angular velocity sensor), an acceleration sensor or the like for sensing impact applied to the remote control apparatus 50, a motion of a user carrying the remote control apparatus 50 and the like may be provided.

Furthermore, the sensor unit 56 may be configured as a bio-sensor (sensor for sensing pulse, perspiration, body temperature, blood pressure or the like) for sensing physical conditions of a user carrying the remote control apparatus 50.

3. Second Embodiment

Operation of a second embodiment will be described as a case using the aforementioned imaging apparatus 10 and remote control apparatus 50.

FIG. 8 is a schematic diagram illustrating operations performed by the imaging apparatus 10 in the second embodiment. This illustrates an example in which HFR imaging and recording are performed in a period of a second state ST2.

In the following description of embodiments, processing of the controller 30 of the imaging apparatus 10 is processing according to functions of the state detection unit 1a and the mode processing instruction unit 1b.

Although processing of the controller 30 is described hereinafter, the processing may be regarded as processing of the controller 60 of the remote control apparatus 50. In this case, the controller 60 transmits an instruction signal to the controller 30 of the imaging apparatus 10 through wireless communication and the controller 30 controls operations of the imager 12 and the digital signal processing unit 20 in response to the received instruction signal.

The controller 30 detects a trigger (a signal or a value which satisfies a predetermined detection condition) of a first state ST1 at time t1. In this case, the imaging apparatus 10 initiates frame uploading and buffering at HFR with respect to captured image data DT (A of FIG. 8).

After detection of the first state ST1, the controller 30 monitors a trigger (a signal or a value which satisfies a predetermined detection condition) of the second state ST2.

The controller 30 detects the trigger of the second state ST2 at time t2. In response to detection of the trigger, the controller 30 sets a recording range (timing of a head frame to a last frame to be recorded) of HFR imaging, and instructs the digital signal processing unit 20 to perform processing for recording captured image data of the recording range in the recording unit 15 at a possible time.

For example, the controller 30 sets frames in a range from time to a predetermined time in advance of the frame acquired at time t2 when the second state ST2 is detected to time tb after a fixed time TL to an HFR recording range (recording range RL2) of frames, as represented by B of FIG. 8.

Otherwise, the controller 30 sets frames in a range from time t2 when the second state ST2 is detected to time tc after the predetermined time TL to the HFR recording range (recording range RL2) of frames, as represented by C of FIG. 8.

Otherwise, the controller 30 sets an HFR recording range (recording range RL3) of frames such that the frame acquired at time t2 when the second state ST2 is detected becomes a final frame and a frame of a time td a predetermined time TL in advance of t2 becomes a head frame, as represented by D of FIG. 8.

Then, the controller 30 causes frame data within these recording ranges to be recorded at a predetermined time.

For example, when the controller 30 sets the recording range RL1 as represented by B of FIG. 8, the controller 30 may initiate a recording process from time t2, as represented by E of FIG. 8. The recording process reads buffered frame data, encodes the read frame data for recording, transmits the encoded frame data to the recording unit 15 and causes the frame data to be recorded in a recording medium. Otherwise, the recording process with respect to the recording range RL1 may be initiated from time tb at which buffering of the recording range RL1 is finished, as represented by F of FIG. 8.

For example, when the controller 30 sets the recording range RL2 as represented by C of FIG. 8, the controller 30 may initiate a recording process from time t2, as represented by E of FIG. 8. That is, the controller 30 instantaneously reads buffered frames from time t2 and provides the read frames for the recording process. Otherwise, the controller 30 may initiate a recording process from time tb at which buffering is performed half way of the recording range RL2, as represented by F of FIG. 8, or may initiate a recording process from time tc at which buffering of the recording range RL2 is finished, as represented by G of FIG. 8.

In addition, when the controller 30 sets the recording range RL3 as represented by D of FIG. 8, for example, the controller 30 may start a recording process from time t2, as represented by E of FIG. 8 since buffering of the recording range RL3 has already been completed at time t2.

FIG. 9 illustrates phases of buffering after time t1.

A of FIG. 9 illustrates frames imaged after time t1. For example, captured image data DT constituting each frame is acquired at HFR such as 960 bps.

The internal memory 25 is used in the form of a ring memory as described above. As illustrated in B of FIG. 9, an address AdS to an address AdE are set to a buffering area.

Imaged frames are sequentially stored in the range of the address AdS to AdE. When a certain frame is stored in the address AdE, the next frame is stored in the address AdS. That is, buffering is performed in such a manner that past frames are overwritten.

When frame data of time t2 at which the second state ST2 is detected is a frame stored in the address indicated by an arrow of B of FIG. 9, the aforementioned recording ranges RL1, RL2 and RL3 correspond to a frame range in which frames are buffered in the address range of the internal memory 25 (or buffered after the address range), as illustrated.

One of reasons why buffering is performed and only captured image data of a certain period is recorded during buffering in HFR recording, as described above, is that HFR real-time recording processing causes high processing load.

For example, when imaging is performed at 960 fps, encoding and recording of each frame in real time cause high processing load. Accordingly, load of the digital signal processing unit 20 is reduced by performing recording during buffering.

Buffering is initiated in response to detection of the first state ST1 and the HFR recording range is set in response to detection of the second state ST2 in order to enable HFR recording at the detection time of the second state ST2 including pass time (recording ranges RL1 and RL3) or to prevent the head frame from being clipped when the frame of time t2 is regarded as the head frame as in the recording range RL2.

Furthermore, buffering is performed using an area of a predetermined range in the internal memory 25 as a ring memory because there is little need to buffer a frame range corresponding to a considerably long time. As described above, HFR records become a slow motion image when reproduced at a normal rate. Accordingly, a user generally think that it is desirable to HFR record only a very important scene (scene suitable for slow motion) and, conversely, HFR records of a considerably long time are considered to become redundant during reproduction and thus are undesirable for the user.

In addition, memory capacity may be prevented from being oppressed according to buffering of HFR frame data by employing a ring memory form.

Naturally, the predetermined period TL as the recording ranges RL1 to RL3 becomes a period (the number of frames) determined by maximum buffer capacity by performing buffering in the range of the address AdS to the address AdE.

Although the predetermined time TL is used for HFR recording in the embodiment, it is not necessary, of course, to fix a duration recorded as the predetermined period TL.

In addition, the recording range RL (RL1, RL2, RL3 and the like) may be set by designating a frame number (designating a time code of a frame, or the like), for example, or may be designated in the address range of the internal memory 25 in which buffering is performed.

Alternatively, tags may be affixed to frames.

In the example of FIG. 8, buffering continues until time t5 at which the user finishes HFR imaging operation.

For example, since opportunity of being the second state ST2 may be generated multiple times, it is desirable to continue buffering even after the second state ST2 is detected first and then buffering up to the final frame in the recording range RL is completed. However, processing of finishing buffering at the time when buffering up to the final frame in the recording range RL is completed, of course, may be considered.

Various examples with respect to triggers of determination of the first state ST1 and the second state ST2 will be described.

The first state ST1 or the second state ST2 as an imaging environment is a situation of a user carrying, for example, the imaging apparatus 10 or the remote control apparatus 50. For example, a state in which the user starts a snow board or a motor bike is regarded as the first state ST1 and a state in which the user jumps at a certain point is regarded as the second state ST2.

At least during starting, the user may perform an operation with respect to imaging. For example, the user may perform a tapping operation immediately before starting and thus the tapping operation may be considered to be a trigger of the first state ST1. However, it is difficult to perform operation in the second state ST2 (state in which the user jumps). Accordingly, it is desirable that a trigger for detecting the second state ST2 be an operation which is not intentionally performed by the user. Of course, the starting state (first state ST1) may be detected through vibration or the like.

FIG. 10 illustrates examples of detecting the first state ST1 and the second state ST2. A of FIG. 10 illustrates an example in which detection of a previously registered vibration pattern is considered as a trigger.

The controller 30 detects a sensing signal of a gyro sensor or an acceleration sensor included in the sensor unit 14 (PH1). For example, when vibration patterns of knocking five times are registered, a waveform of five vibrations is obtained as a sensing signal. For the sensing signal, analog-to-digital conversion (PH2), coring (low pass filtering process), binary pulsation process according to threshold determination and the like (PH3) are performed. Then, the obtained binary pulse waveform is compared with various registered patterns and verified (PH4). For example, the number of pulse generations and a pulse interval within a predetermined time TRG are compared with the patterns to determine whether a similar pattern is present. And, presence of the similar pattern is considered to be a trigger of state detection.

For example, five tapping operations intentionally performed by the user may be determined to be a trigger of the detection of the first state ST1.

Otherwise, a specific vibration pattern when an activity is started may be considered to be a trigger of detection of the first state ST1 or a specific vibration pattern during the activity may be considered to be a trigger of detection of the second state ST2.

B of FIG. 10 illustrates an example in which detection of a previously registered voice pattern is considered to be a trigger.

The controller 30 receives a voice signal from a microphone as the sound detection unit 17 (PH1). Then, the controller 30 analog-to-digital converts the voice signal to digitalize the voice signal (PH12) and performs a voice recognition process (PH13). Thereafter, the controller 30 extracts a keyword through the voice recognition process and matches the extracted keyword with previously registered voice patterns to determine whether the extracted keyword is identical (or similar) to a previously registered voice pattern (PH14). Presence of the identical or similar voice pattern is considered as a trigger of state detection.

For example, a voice pattern when the user speaks, such as "Let's go", may be determined to be a trigger of the first state ST1.

Furthermore, a specific voice pattern when an activity is started may be considered to be a trigger of detection of the first state ST1 or a specific voice (shouting of the user, ambient voice, shout of joy and the like generated in a specific state such as jump) during the activity may be considered to be a trigger of detection of the second state ST2.

C of FIG. 10 illustrates an example in which detection of a previously registered gesture is considered to be a trigger.

For example, the controller 30 detects a sensing signal of the gyro sensor or the acceleration sensor included in the sensor unit 14 (PH21). The controller 30 performs AD conversion (PH22) for the sensing signal and performs gesture analysis for the digitalized signal (PH23). That is, the controller 30 analyzes a vibration pattern generated in response to a gesture. Then, the controller 30 matches the vibration pattern with previously registered vibration patterns according to various gestures to determine whether a pattern corresponding (or similar) to the vibration pattern is present (PH24). Presence of a pattern corresponding (or similar) to the vibration pattern is considered to be a trigger of state detection.

Furthermore, a gesture may be detected from an image. The controller 30 receives frame data imaged by the imager 12 and processed by the digital signal processing unit 20 (PH31). Then, the controller 30 analyzes a gesture of a subject from the frame data (PH32). The controller 30 matches the pattern of the analyzed gesture with previously registered various gesture patterns to determine whether a pattern corresponding (or similar) to the analyzed gesture pattern is present (PH33). Presence of a corresponding or similar pattern is considered to be a trigger of state detection.

For example, a specific hand or arm gesture or the like, performed by the user to be imaged as a subject of the imaging apparatus 10, may be considered to be a trigger of detection of the first state ST1. In addition, a specific gesture (e.g., start pose or the like) when an activity is started may be considered to be a trigger of detection of the first state ST1 or a specific gesture (jumping gesture or the like) during the activity may be considered to be a trigger of detection of the second state ST2.

The aforementioned description is an example. Other triggers for determination of the first state ST1 and the second state S2 may be considered. As various examples including the aforementioned examples, the following may be considered as triggers detectable as events applied to the imaging apparatus 10 or the remote control apparatus 50.

Detection of vibration in predetermined pattern
Detection of sound (voice) in predetermined pattern
Detection of gesture in predetermined pattern
Detection of entering predetermined area
Detection of disconnection of wireless connection such as WIFI with remote control apparatus 50

Entering a predetermined area means detecting that a user carrying the imaging apparatus 10 or the remote control apparatus 50 enters a certain area and performing detection of the first or second state. For example, it may be possible to consider running a specific place during skiing, racing or the like as the second state ST2.

Detection of disconnection of wireless connection such as WIFI with remote control apparatus 50 refers to detection of situation change due to disconnection of communication between the imaging apparatus 10 and the remote control apparatus 50. Disconnection of wireless communication represents a situation in which the imaging apparatus 10 and the remote control apparatus 50 are parted apart by a distance. This situation is regarded as a certain state.

In addition, the following is considered as a trigger according to a state of a scene (subject) imaged by the imaging apparatus 10.

Detection of variation in automatic iris control detection value in predetermined pattern Detection of variation in automatic white balance control detection value in predetermined pattern Detection of variation in intra-image motion vector (global vector) in predetermined pattern Detection of gesture in predetermined pattern A large variation in a subject may be detected through a variation in a control value for controlling an iris state or a white balance state. For example, a state in which a subject changes from a surrounding landscape to the sky according to jump during an activity is considered.

Furthermore, a variation in a global vector in an image represents the overall movement of a subject, and thus a large variation in the subject may be detected by monitoring the global vector.

FIG. 11 illustrates a detailed example of state determination.

A of FIG. 11 represents changes in a detected value based on a signal detected by the sensor unit 14. B of FIG. 11 represents a signal value SJ obtained by differentiating and coring the detected value, C of FIG. 11 represents a count control flag CTF based on the signal value SJ and D of FIG. 11 represents a count value CJ of a counter for state determination.

A threshold range sjTH is a threshold range for determination of stable/variable state with respect to the signal value SJ.

The count control flag CTF is "1" when the signal value SJ is within the threshold range sjTH, that is, a range in which the signal value SJ is stable and "0" when the signal value SJ exceeds the threshold range sjTH, that is, largely changes.

The count value CJ is a count value of the counter, which is counted up when the count control flag CTF is "0" and reset when the count control flag CTF is "1".

E of FIG. 11 represents first state determination timing. This timing is timing of starting HFR imaging and buffering.

F of FIG. 11 represents second state determination timing. This indicates timing at which a recording range may be set and a recording process may be performed for buffered frame data.

Here, an example in which a user who performs off-road running of a motor bike carries the imaging apparatus 10 or the remote control apparatus 50 and the controller 30 (or the controller 60) determines a state according to a vibration detection signal is described.

The imaging apparatus 10 (or remote control apparatus 50) is powered on at time t0. The controller 30 may receive a detected signal of the sensor unit 14 and monitor a detected value from time t0.

At time t1, a tapping operation pattern of the user is detected or a vibration pattern when the bike is started is detected. The controller 30 determines transition to the first state ST1 on the basis of such detection and causes HFR imaging and buffering to be started.

After time t1, the controller 60 determines whether transition to the second state ST2 occurs. This determination is performed under the condition that the count value CJ exceeds a count threshold value rTH (In other words, the second state ST2 is determined using a state of CJ>rTH as a trigger).

As a vibration detection value, a large variation in response to vibration during bike running is observed. Accordingly, the count value CJ is repeatedly reset and thus a state in which the count value CJ does not reach the threshold value rTH continues.

It is assumed that the bike jumps at a certain time tj. While the bike is floating in the air, a state in which the vibration detection value is fixed to a specific value is observed. And, the detected value is barely varied to cause the derivative thereof to slightly change, and thus the signal value SJ becomes stable. Accordingly, the count value CJ is not reset for a certain time and exceeds the threshold value rTH at time t2.

The controller 30 determines transition from the first state ST1 to the second state ST2 at time t2. Then, the controller 30 instructs processing in the second mode after the time. Specifically, the recording range RL1 for the predetermined time TL is set at time t2 as illustrated in in B of FIG. 8, for example. FIG. 11 illustrates an example in which the predetermined time TL from time tj to time t4 is set to a recording range. The controller 30 causes the digital signal processing unit 20 to initiate an HFR recording process at a predetermined time after the recording range. After time t4 when the bike is landed, the signal value SJ is considerably varied since large vibration is applied again and the count value CJ is repeatedly reset.

Processing examples in which the controller 30 performs state determination, for example, according to the aforementioned processes to control modes of the imaging process are described with reference to FIGS. 12, 13, 14 and 15.

FIG. 12 illustrates overall processing of the controller 30 according to functions (state detection unit 1a and the mode processing instruction unit 1b) as the imaging control apparatus 1.

The controller 30 repeats processing of FIG. 12 at intervals of frame timing.

The controller 30 checks whether the functions (functions as the imaging control apparatus 1) are turned on in step S101. On/off of the functions of the state detection unit 1a and the mode processing instruction unit 1b may be selected by the user, for example, through predetermined manipulation.

For a period in which the functions are turned off, the controller 30 constantly performs only the process of step S102 to finish the processing of FIG. 12 one time. In step S102, the controller 30 turns off an HFR imaging instruction flag Fb ("0"), an HFR recording instruction flag Fr ("0"), a first state detection flag F1 ("0") and a second state detection flag F2 ("0").

The HFR imaging instruction flag Fb indicates a state in which an imaging operation in the first mode in response to detection of the first state may be instructed (or should be instructed). The controller 30 controls instruction of the first mode operation, specifically, instructs HFR imaging and buffering when the HFR imaging instruction flag Fb is turned on ("1").

The HFR recording instruction flag Fr indicates a state in which an imaging operation in the second mode in response to detection of the second state may be instructed (or should be instructed). The controller 30 controls instruction of the second mode operation at predetermined timing, specifically, instructs setting of an HFR imaged data recording range and a recording process, when the HFR recording instruction flag Fr is set to "1".

The first state detection flag F1 indicates a detection state of the first state ST1 and is set to "1" in response to detection of the first state.

The second state detection flag F2 indicates a detection state of the second state ST2 and is set to "1" in response to detection of the second state.

When the functions as the imaging control apparatus 1 are turned on, the controller 30 checks whether the first state ST1 has been detected in step S103. That is, the controller 30 checks whether the first state detection flag F1 is 1.

When the first state detection flag is 0 and the first state is not detected, the controller 30 performs a process of detecting the first state in step S104. For example, the process of step S104 is performed for the time t0 to t1 in FIG. 11.

FIG. 13 illustrates an example of first state detection processing.

The controller 30 performs first state detection processing for a detected signal of the sensor unit 14, an input voice signal from the sound detection unit 17 or captured image data DT according to the imager 12. As an example, FIG. 13 illustrates an example using the detected signal of the sensor unit 14 as a target, described with respect to A of FIG. 10.

First of all, the controller 30 acquires a detected value in step S201. Then, the controller 30 performs filtering, for example, band extraction processing according to a band pass filter, on the detected value for DC component cutting and noise smoothing in step S202. Further, the controller 30 performs a coring process for small amplitude cutting in step S203 and performs determination using a threshold value in step S204. Then, the controller 30 compares pulse patterns (the number of pulse generations and pulse interval) within a predetermined time with respect to pulses obtained through the aforementioned processes with previously registered pulse patterns.

As a comparison result, the controller 30 maintains the state in which first state detection flag F1=0 in step S209 when the first state detection flag F1 is 0 and a condition that a pulse pattern matched with a previously registered pulse pattern is detected is not satisfied.

When the aforementioned condition is satisfied, the controller 30 proceeds to step S207 from step S206 to set the first state detection flag F1 to 1. That is, it is determined that a trigger with respect to the first state ST1 has been detected.

In the processing of FIG. 12 after the first state ST1 is detected according to the aforementioned first state detection processing and the first state detection flag F1 becomes 1, the controller 30 proceeds to step S105 from step S103.

In this case, the controller 30 sets the HFR imaging instruction flag Fb to 1. Accordingly, the controller 30 instructs the first mode, that is, instructs the imager 12 to initiate HFR imaging and instructs the digital signal processing unit 20 to initiate buffering. This state corresponds to the state after time t1 in FIG. 11.

In this period, the controller 30 performs second state detection processing in step S106.

An example of second state detection processing is illustrated in FIG. 14 as a processing example corresponding to the operation described with reference to FIG. 11.

First, the controller 30 acquires a detected value of a detected signal from the sensor unit 14 in step S301. The controller 30 performs filtering, for example, band extraction processing according to a band pass filter, on the detected value for DC component cutting and noise smoothing in step S302. Further, the controller 30 performs a coring process for small amplitude cutting in step S303. The signal value SJ described in FIG. 11 is acquired through the aforementioned processing.

The controller 30 checks the signal value SJ is within the threshold range sjTH in step S304. The controller 30 sets the count control flag CTF to 1 when the signal value SJ is within the threshold range sjTH in step S305 and sets the count control flag CTF to 0 when the signal value SJ is not within the threshold range sjTH in step S306.

Then, the controller 30 branches the processing in response to the count control flag CTF in step S307. When the count control flag CTF is 0, the controller 30 counts up the count value CJ in step S308. When the count control flag CTF is 1, the controller 30 resets the count value CJ in step S309.

In step S309, a processing example in which the count value CJ is counted down is also considered.

Next, the controller 30 compares the count value CJ with the threshold value rTH in step S310.

If CJ>rTH, the controller 30 maintains HFR recording instruction flag FR=0 and second state detection flag F2=0 in step S312.

In this case, processing from step S107 in FIG. 12 is finished once.

If CJ>rTH in step S310, the controller 30 sets the HFR recording instruction flag to 1 and sets the second state detection flag F2 to 1 in step S311.

The controller 30 instructs the second mode at a predetermined timing in response to HFR recording instruction flag Fr=1. At this timing, for example, the HFR recording range RL (any one of RL1, RL2 and RL3) is set as shown in B, C and D of FIG. 8.

In addition, the controller 30 controls the digital signal processing unit 20 to perform HFR recording processing with respect to buffered frames of the recording range, specifically, encoding processing for recording and transmission to the recording unit 15 at any one of timings of E, F and G of FIG. 8. (However, recording processing is instructed in step S109 after buffering of the recording range RL is completed in the processing example of FIG. 12.)

In the processing of FIG. 12 at frame timing after detection of the second state ST2 as described above, second state detection flag F2=1 and thus the controller 30 proceeds to step S108 from step S107.

In step S108, the controller 30 checks passage of predetermined time TL. This is a process of checking whether buffering of a head frame to a frame after the predetermined time TL, set as the recording range RL, is completed. That is, the checking process is a process of waiting for buffering of all frames as the recording range RL.

When buffering is not completed, the processing of FIG. 12 is ended.

When buffering of the recording range RL is completed at a certain time, the controller 30 proceeds to step S109 from step S108 and proceeds with the processing of FIG. 12 to instruct the digital signal processing unit 20 to perform HFR recording processing. That is, the controller 30 causes the digital signal processing unit 20 to perform encoding processing for recording and transmission to the recording unit 15 with respect to buffered frames of the recording range RL. Accordingly, HFR images in the predetermined period TL from the second state detection time are recorded.

After instruction, of course, the controller 30 sets the first state detection flag F1 to 0 and sets the second state detection flag F2 to 0 in step S110.

In this case, HFR imaging and buffering may be stopped in response to first state detection flag F1=0.

Otherwise, first state detection flag F1=1 is maintained and HFR imaging and buffering continue is also considered. In this case, detection of the second state is performed and HFR recording is executed in response to detection of the second state.

In the aforementioned processing example, the controller 30 instructs recording processing in step S109 after waiting for completion of buffering without instructing recording processing immediately after the HFR recording instruction flag Fr is set to 1. This corresponds to, for example, an example of performing recording processing at the timing of F of FIG. 8 when the recording range RL1 of B of FIG. 8 is set, an example of performing recording processing at the timing of G of FIG. 8 when the recording range RL2 of C of FIG. 8 is set or an example of performing recording processing at the timing of E of FIG. 8 when the recording range RL3 of D of FIG. 8 is set.

In addition, the recording range RL1 or RL2 may be set as in B or C of FIG. 8, for example, and recording processing may be immediately initiated at the timing of E of FIG. 8 (without waiting for completion of buffering). In this case, the controller 30 should immediately instruct the digital signal processing unit 20 to perform recording processing at the time when the HFR recording instruction flag Fr is set to 1 in step S311 of FIG. 14.

Although the example of FIG. 14 as the second state detection processing is illustrated as an example with respect to only determination according to vibration, detection of the second state may be performed in various detection states as described above. Accordingly, detection of the second state under a plurality of conditions may also be considered. FIG. 15 illustrates an example of detecting the second state through a plurality of factors.

For example, the controller 30 performs acquisition of output of the gyro sensor of the sensor unit 14 (S320-1), acquisition of an automatic iris detected value from the camera control detection processor 24 (S320-2), acquisition of an automatic white balance detected value from the camera control detection processor 24 (S320-3) and the like in parallel.

Then, the controller 30 performs processing X for the detected values. Processing X corresponds to the processes of steps S302 to S309 illustrated in FIG. 14 (or processes equivalent thereto).

For example, the controller 30 performs a process as the processing X (steps S302 to S309) for a detected value with respect to a detected signal of the gyro sensor to acquire a count value CJ1 (S321-1).

The controller 30 performs processes equivalent to the processing X for the automatic iris detected value and the automatic white balance detected value to acquire count values CJ2 and CJ3 (S321-2 and S321-3).

Then, the controller 30 respectively compares the count values CJ1, CJ2 and CJ3 with corresponding threshold values rTH1, rTH2 and rTH3 in step S322. The threshold values rTH1, rTH2 and rTH3 are values set depending on characteristics of the respective detected factors as the second state ST2.

The controller 30 determines the second state, for example, when conditions of CJ1>rTH1, CJ2>rTH2 and CJ3>rTH3 are all complete (AND condition) in step S322. Otherwise, the controller 30 may determine the second state ST2 when any one of the conditions is satisfied (OR condition).

Furthermore, the controller 30 may determine the second state ST2 if part of the conditions (e.g., two of the three conditions) is satisfied.

The controller 30 maintains HFR recording instruction flag Fr=0 and second state detection flag F2=0 in step S324 when the conditions of step S322 are not satisfied.

If the conditions of step S322 are satisfied, the controller 30 sets the HFR recording instruction flag Fr to 1 and sets the second state detection flag F2 to 1 in step S323.

It may be possible to perform second state detection in response to various situations by detecting the second state ST2 using a plurality of detected factors.

Although FIG. 15 illustrates three factors (vibration, exposure state and color state), the aforementioned other factors, for example, a sound, a position, a motion vector and the like may be added, of course. Accuracy and diversity of second state detection may be improved using a larger number of detected factors.

For example, accuracy of second state detection may be improved according to the AND condition.

Furthermore, it may be possible to adapt to various states and situations as the second state ST2 according to the OR condition and the condition of satisfying part of a plurality of conditions.

Moreover, the second state detection conditions may be modified depending on activity types or selection of desired states as the second state ST2. For example, different situations are desired as the second state depending on activity types and scene types, such as a jump scene of a bike, a snow board or the like, a rotating scene of figure skating, a stroking scene of a ball game such as baseball and tennis, and a shoot ball close scene of soccer from the viewpoint of a goal keeper. Accordingly, the second state detection conditions may be modified in accordance with scenes desired as the second state ST2.

With respect to detection of the first state ST1, not only a trigger depending on user manipulation but also a trigger corresponding to a factor (vibration pattern, sound or the like) specific to activity may be used, and determination may be performed according to a plurality of factors.

According to the second embodiment, in utilization of the imaging apparatus 10 and remote control apparatus 50 as action cameras, it is possible to provide the imaging apparatus 10 which automatically starts and stops HFR recording when previously determined conditions are detected only using a group of devices usually equipped even when the user does not press a button for triggering HFR recording, without additional hardware costs. Accordingly, user's dissatisfaction relating to recording operability (particularly, HFR imaging) with respect to an action camera may be solved and thus the user may acquire desired moving images.

4. Third Embodiment

Operations of a third embodiment will be described. FIG. 16 is a schematic diagram illustrating operations performed by the imaging apparatus 10 according to the third embodiment. While the operations are the same as the operations of FIG. 8 according to the second embodiment until HFR imaging and recording are performed in a period corresponding to the second state ST2, the third embodiment pertains to an example of finishing HFR recording (deciding the end point of the recording range RL) in response to detection of transmission to the third states ST3.

It is assumed that the controller 30 detects a trigger of the first state ST1 at time t1. In this case, the imaging apparatus 10 initiates HFR loading and buffering of frames as captured image data DT (A of FIG. 16). After detection of the first state ST1, the controller 30 monitors a trigger of the second state ST2.

It is assumed that the controller 30 detects a trigger of the second state ST2 at time t2. The controller 30 sets a head frame of a recording range RL of HFR imaging in response thereto. In this example, the final frame of the recording range RL is not set.

For example, the controller 30 sets a frame acquired at time t2 when the second state ST2 is detected as the head frame of a recording range RL4 in which HFR recording is performed, as represented by B of FIG. 16.

Otherwise, the controller 30 sets a frame, which is acquired a predetermined time in advance of the frame obtained at time t2 when the second state ST2 is detected, as the head frame of a recording range RL5 in which HFR recording is performed, as represented by C of FIG. 16.

After time t2, the controller 30 detects transition to the third state ST3.

If the controller 30 detects a trigger of the third state ST3 at time t3, the controller 30 sets a final frame of the recording range RL of HFR imaging in response thereto.

For example, the controller 30 sets a frame imaged at time t3 as the final frame of the recording range RL (RL4 or RL5).

The controller 30 instructs the digital signal processing unit 20 to perform processing for recording captured image data of the recording range RL in the recording unit 15 after time t2 at which the second state ST2 is detected.

For example, the controller 30 causes recording processing to be initiated from time t2 as represented by D of FIG. 16.

Otherwise, the controller 30 may cause recording processing to be initiated after time t3 at which the final frame is determined in response to detection of the third state ST3, as represented by E of FIG. 16.

In the example of FIG. 16, buffering continues until time t6 at which the user performs an operation of finishing HFR imaging.

Since the first state ST1 and the second state ST2 may be detected again after detection of the third state ST3, for example, buffering may be continuously performed even after the third state ST3 is detected and buffering until the final frame of the recording range RL is completed. However, a processing method of completing buffering at the third state detection time may be considered, of course.

Various triggers for determining the first state ST1 and the second state ST2 may be considered as in the first embodiment.

Although various triggers for detection of the third state ST3 may also be considered in the same manner, triggers for detection of the third state ST3 cause buffering capacity to become full.

This is because buffering is performed in the form of a ring memory as described with reference to FIG. 9 and thus the maximum recording range RL reaches the number of frames corresponding to ring memory capacity.

However, when an address region which may be overwritten, that is, a memory range in which recorded frames are buffered, is present, processing for determining that buffers are not full (a trigger of the third state ST3 is not detected) may be considered although HFR recording processing speed and an HFR value are also concerned.

FIG. 17 illustrates a detailed example of state determination.

A, B, C and D of FIG. 17 respectively show a detected value based on a detected signal of the sensor unit 14, a signal value SJ obtained by differentiating and coring the detected value, a count control flag CTF based on the signal value SJ and a count value CJ of a counter for state determination, like FIG. 8.

In addition, E of FIG. 17 illustrates first state determination timing, F of FIG. 17 illustrates second state determination timing, and G of FIG. 17 illustrates third state determination timing. In FIG. 17, a scene such as off-road running of a motor bike is assumed as in FIG. 11.

Time t0 to time t2 are identical to those in FIG. 11.

After time t1 at which the first state ST1 is detected, whether transition from the first state ST1 to the second state ST2 has occurred is determined. It is assumed that the count value CJ reaches the threshold value rTH at time t2.

The controller 30 determines that transition from the first state ST1 to the second state ST2 has occurred at time T2. Then, the controller 30 sets the recording range RL4 as represented by C of FIG. 16, for example. In FIG. 11, a frame of time tx a predetermined time TL2 in advance of time t2 is set as a start frame. Thereafter, the controller 30 causes the digital signal processing unit 20 to initiate HFR recording processing at a predetermined time after tx.

After time t3 when the bike is landed, the signal value SJ is remarkably varied since large variation is added, and thus the count value CJ is reset.

The controller 30 determines that transition from the second state to the third state ST3 has occurred using the fact that the count value CJ is reset to become lower than tTH (CJ<rTH) as a trigger. Then, the controller 30 sets the frame of time t3 as the final frame of the recording range RL.

For example, a processing example in which the controller 30 performs state determination through the aforementioned process and controls imaging operation processing modes will be described with reference to FIGS. 18 and 19.

FIG. 18 illustrates overall processing according to functions (state detection unit 1a and mode processing instruction unit 1b) of the controller 30 as the imaging control apparatus 1. The controller 30 repeats the processing of FIG. 18 at intervals of frame timing.

Processes identical to those of FIG. 12 are denoted by the same step numbers and detailed description thereof is omitted.

The controller 30 checks whether the functions (functions as the imaging control apparatus 1) are turned on in step S101. The controller 30 constantly performs only the process of step S102A in a period in which the functions are turned off to finish the processing of FIG. 12 once.

In step S102A, the controller 30 turns off the HFR imaging instruction flag Fb ("0"), the HFR recording instruction flag Fr ("0"), an HFR recording completion flag Fe ("0"), the first state detection flag F1 ("0"), the second state detection flag F2 ("0") and a third state detection flag F3 ("0").

The HFR recording completion flag Fe indicates timing of designating the end frame of the HFR recording range RL.

The third state detection flag F3 indicates a state of detection of the third state ST3 and becomes ON ("1") in the third state detection state.

When function ON of the imaging control apparatus 1 is selected, the controller 30 proceeds to step S103 and checks whether the first state ST1 is detected, that is, whether the first state detection flag F1 is 1. If the first state detection flag F1 is 0, the controller 30 proceeds to step S104 and performs detection of the first state (e.g., the processing of FIG. 13).

The first state ST1 is detected according to a first state detection process of step S104, and the controller 30 proceeds to step S105 from step S103 in the processing of FIG. 18 after the first state detection flag F1 becomes 1. Here, the controller 30 sets the HFR imaging instruction flag Fb to 1 and instructs the first mode, that is, instructs the imager 12 to initiate HFR imaging and instructs the digital signal processing unit 20 to initiate buffering.

Then, in this period, the controller 30 performs detection of the second state in step 106.

In a period in which the second state ST2 is not detected, the controller 30 completes the processing from step S107 once.

When the second state is detected in step S106, the second state detection flag F2 is set to 1. In this case, the controller 30 proceeds to step S120 from step S107 and performs detection of the third state.

Detailed processes of steps S106, S107 and S120 are illustrated in FIG. 19.

The second state detection process of step S106 is performed through steps S301 to S312 of FIG. 19. These processes are identical to those of FIG. 14. Accordingly, when a trigger of the second state ST2 is detected, the HFT recording flag Fr is set to 1 and the second state detection flag F2 is set to 1 in step S311.

After the second state ST2 is detected and the second state detection flag F2 is set to 1, the controller 30 proceeds to the third state detection process of step S120 from step S107.

In this case, the controller 30 checks whether HFR recording flag Fr=1 and count value CH<threshold value rTH in step S351, as illustrated in FIG. 19. That is, the controller 30 checks whether the count value CJ exceeding the threshold value rTH is reset to become lower than the threshold value rTH.

When this condition is not satisfied, the controller 30 checks whether buffering capacity becomes a full state in step S352. That is, the controller 30 checks whether the frame following the head frame of the recording range RL may not be buffered if the address at which the head frame of the recording range RL has been buffered is not overwritten.

If buffering capacity is not full, the controller 30 proceeds to step S354 and maintains HFR recording completion flag Fe=0 and third state detection flag F3=0.

In this case, the controller 30 finishes the processing of FIG. 18 from step S121 once since the third state detection flag F3 is 0.

When the count value CH does not exceed the threshold value rTH in step S351 or when buffering capacity is determined to be full in step S352, the controller 30 determines that a trigger of the third state ST3 is generated and proceeds to step S353. Then, the controller 30 sets the HFR recording completion flag Fe to 1 and sets the third state detection flag F3 to 1.

In this case, the processing of FIG. 18 proceeds to step S122 from step S121 according to third state detection flag F3=1.

In step S122, the controller 30 specifies the final frame of the recording range RL and instructs the digital signal processing unit 20 to perform HFR recording processing. That is, the controller 30 causes the digital signal processing unit 20 to perform encoding processing for recording and transmission to the recording unit 15 with respect to buffered frames of the recording range RL. Accordingly, HFR images corresponding to a period from the second state detection time to the third state detection time are recorded.

After the aforementioned instruction, the controller 30 sets the first state detection flag F1, the second state detection flag F2 and the third state detection flag F3 to 0 in step S123.

In this case, HFR imaging and buffering may be stopped in response to first state detection flag F1=0.

Otherwise, an example of maintaining first state detection flag F1=1 and continuing HFR imaging and buffering may be considered. In this case, detection of the second state is performed again and HFR recording of the frame corresponding to the second state detection time to the frame corresponding to the third state detection time is performed.

To instruct recording processing in step S122 after detection of the third state ST3 corresponds to an example of performing recording processing at the timing of E of FIG. 16, for example, with respect to the recording range RL4 or RL5 of B or C of FIG. 16, that is, an example in which recording processing is not immediately instructed at the time when the HFR recording instruction flag Fr is set to 1 in step S311 of FIG. 19.

In addition, recording processing may be initiated at the timing of D of FIG. 16 for the recording range RL4 or RL5, for example. That is, recording processing is initiated without waiting for designation of the final frame. In this case, the controller 30 immediately instructs the digital signal processing unit 20 to perform recording processing at the time when the HFR recording instruction flag Fr is set to 1 in step S311 of FIG. 19.

Even in the third embodiment, detection of the second state ST2 and the third state ST3 may be performed using a plurality of factors as described with reference to FIG. 15.

Further, third state detection conditions may be modified depending on activity type or selection of a state in which the user wants to finish the second state (HFR recording). For example, it may be possible to select a landing state in a jump scene of bike, snow board or the like, a pattern when a rotating scene of figure skating is ended, and the like.

In addition, for designating HFR recording completion timing, a trigger of detection of the third state ST3 may use wireless communication state between the imaging apparatus 10 and the remote control apparatus 50. That is, when the user attaches the imaging apparatus 10 to a bike or the like and wears the remote control apparatus 50 of a wrist watch type, short-range wireless communication such as WIFI is continuously performed. However, when the user leaves the bike, WIFI communication is ceased. This may allow the user to determine that the current state is not a state in which HFR recording is performed as the second state ST2. Accordingly, it may be possible to determine the third state ST3 through release of wireless communication.

Furthermore, detection of the first state ST1 may be determined according to various triggers or triggers acquired from a plurality of factors.

According to the third embodiment, in utilization of the imaging apparatus 10 or the remote control apparatus 50 as an action camera, a specific scene or the like may be HFR recorded without user manipulation in a period until the timing at which characteristic operation in the scene is finished.

HFR recording is performed for the predetermined time TL from initiation of the second state ST2 in the second embodiment. In this case, however, HFR recording may continue for a while after completion of a specific scene of activity. In the third embodiment, end timing is designated depending on action state, and thus recording for a time adapted to action may be performed.

5. Fourth Embodiment

Operations of the fourth embodiment will be described with reference to FIG. 20. The fourth embodiment is an example in which HFR recording is performed in the second state ST2 whereas normal recording is performed in the period of the first state ST1. Here, normal recording refers to a process of recording captured image data TD at a normal frame rate lower than HFR, for example, 60 fps.

As illustrated in A of FIG. 20, the controller 30 instructs HFR imaging from time t1 at which a trigger of the first state ST1 is detected as in the second and third embodiments. That is, the imager 12 and the digital signal processing unit 20 initiate loading and buffering of frames as captured image data DT at HFR. In the case of this example, however, the controller 30 causes the digital signal processing unit 20 to also start the normal recording process (encoding for recording and transmission to the recording unit 5) at time t1 (B of FIG. 20).

After detection of the first state ST1, the controller 30 monitors a trigger of the second state S2.

It is assumed that the controller 30 detects a trigger of the second state ST2 at time t2. The controller 30 instructs the recording operation to change to HFR recording processing in response thereto. The digital signal processing unit 20 performs HFR recording for frames following the frame acquired at time t2.

Frames until time t7 are HFR recorded.

The time t7 may be set to a time at which frames corresponding to the predetermined time TL are HFR recorded as in the second embodiment or may be set to the third state detection time as in the third embodiment.

The controller 30 controls the digital signal processing unit 20 to perform normal recording again at time t7. Thereafter, the controller 30 causes HFR recording to be ended at time t8. The normal recording process is ended at the time when recording of frames until time t8 is finished.

In this case, frames normally recorded in a recording range RL6 are frames extracted as 60 fps frames from frames which have been HFR recorded for a period from time t1 to time t2.

In addition, frames which are HFR recorded in a recording range RL7 are frames acquired through HFR imaging for a period from time t2 to time t7.

Furthermore, frames normally recorded in a recording range RL8 are frames extracted as 60 fps frames from frames obtained through HFR imaging for a period from time t7 to time t8.

FIG. 21 is a schematic diagram illustrating buffering and recording processes.

A of FIG. 21 illustrates frames imaged through the imager 12 and B of FIG. 21 illustrates frames buffered in the internal memory 25. C of FIG. 21 illustrates recording processing (necessary camera signal processing, encoding and the like). Recording processing is performed through encoding at a predetermined frame rate, for example, 60 fps.

Times t1, t2, t7 and t8 illustrated in FIG. 21 correspond to those of FIG. 20.

Although HFR imaging is initiated from time t1 at which the first state ST1 is detected, as described with reference to FIG. 20, all frames acquired at HFR such as 960 bps are buffered according to HFR imaging, as illustrated in FIG. 21.

While normal recording is performed for a period from time t1 to time t2, frames are extracted at a frame interval corresponding to 60 fps, for example, from frames buffered in the period and provided to recording processing. Accordingly, 60 fps moving image data is recorded.

With respect to frames imaged in the period from time t2 to time t7, all buffered frames are provided to recording processing. However, each 960 fps frame corresponds to one 60 fps frame in recording processing. Accordingly, recorded images corresponding to this period become slow motion images during normal reproduction.

Frames imaged and buffered in a period from time t7 to time t8 are targets of normal recording, and thus frames are extracted at a frame interval, for example, 60 fps, from the frames buffered in the period and provided to recording processing.

Through this processing, moving image data is recorded. Accordingly, moving image data corresponding to the period from time t1 to time t8 is recorded and processed into image content having a scene from time t1, which is reproduced at a normal rate, a scene with respect to the period from time t2 to time t7 corresponding to the second state, which is reproduced as a slow motion image, and the following scene which is reproduced at the normal rate until time t8, during normal reproduction.

That is, according to the fourth embodiment, the user may acquire image content having a most interesting scene of the second state in a certain activity, which is recorded as a slow motion image, and scenes before and after the scene, which are recorded as normal images, without performing difficult operations.

6. Fifth Embodiment

Operations of a fifth embodiment are described with reference to FIG. 22. The fifth embodiment pertains to a processing example in which captured image data of a period corresponding to the first state ST1 is recorded, recording of the captured image data is ended in response to detection of the second state, and the imaging apparatus is powered off when the third state is detected.

FIG. 22 illustrates operation examples depending on respective states by examples in which the controller 30 performs state determination on the basis of a detected value from the sensor unit 14.

A, B, C and D of FIG. 22 respectively illustrate a detected value based on a detected signal from the sensor unit 14, a signal value SJ obtained by differentiating and coring the detected value, a count control flag CTF based on the signal value SJ, and a count value CJ of a counter for state determination, like FIG. 11.

In addition, E of FIG. 22 illustrates second state determination timing and imaging and recording period and F of FIG. 22 illustrates third state determination timing and a power on period.

In this case, the first state ST1 is based on user manipulation. When the user performs operation of initiating imaging and recording at time t11, the controller 30 determines that this timing is timing of a desired imaging environment of the user and determines that transition to the first state has occurred. Determination of the first state, of course, may be performed depending on a detected value from the sensor unit 14.

When the user performs imaging and recording operation and the controller 30 determines the first state ST1 at time t11, the controller 30 controls initiation of imaging and recording processes. That is, the controller 30 controls the imager 12 to perform imaging, controls the digital signal processing unit 20 to perform a recording process and controls the recording unit 15 to perform a recording process. In the present embodiment, a frame rate is arbitrary. For example, imaging and recording may be continuously performed at a default frame rate such as 60 fps, for example, or frame rates set by the user, such as 24 fps, 30 fps, 96 fps and 240 fps.

After time t11 at which imaging and recording are initiated in the first state ST1, the controller 30 determines whether transition from the first state to the second state ST2 has occurred. The signal value SJ, the count control flag CTF and the count value CJ vary in response to states of the detected value, as illustrated.

In this case, the second state ST2 is detected when a state in which vibration hardly occurs continues for a certain time.

The controller 30 sets a threshold value rsTH to be compared with the count value CJ and determines transition to the second state ST2 at time t14 when the count value CJ exceeds the threshold value rsTH.

The controller 30 controls imaging and recording operation to be stopped at timing (time t14) when the second state ST2 is detected.

Thereafter, the controller 30 monitors whether the count value CJ exceeds a threshold value pfTH. The threshold value pfTH is greater than the threshold value rsTH. That is, the threshold value pfTH is a value for detecting a state in which vibration hardly occurs for a predetermined time. The controller 30 determines that transition to the third state ST3 has occurred at time t15 when the count value CJ exceeds the threshold value pfTH.

The controller 30 controls the power supply unit 18 to turn off the power of the imaging apparatus 10 at timing (time t15) when the third state ST3 has been detected.

The following operation is realized according to determination of the second and third states and control depending thereon.

For example, it is assumed that the user starts recording when initiating a certain activity. In this case, a situation in which the user intends to stop recording at time t12 during the activity or activity completion time t13 but forgets the recording stop operation is considered. For example, a situation in which the user forgets the recording stop operation and leaves the imaging apparatus 10 unattended in a certain place is considered.

In this situation, image content recorded for a long time becomes useless and wasteful consumption of capacity of the recording unit 15 and wasteful battery consumption occur.

Accordingly, the controller 30 regards the state in which the user leaves the imaging apparatus 10 unattended as the second state ST2 and controls the imaging and recording operation to be stopped when the second state ST2 is detected at time t14. Furthermore, the controller 30 regards a state in which the imaging apparatus 10 still remains unattended when the imaging and recording operation is stopped as the third state ST3, and performs power off control when the third state ST3 is detected at time t15.

A processing example in which the controller 30 performs state determination through, for example, the aforementioned process and controls imaging operation processing modes is described with reference to FIG. 23.

FIG. 23 illustrates overall processing of the controller 30 according to functions (state detection unit 1a and the mode processing instruction unit 1b) as the imaging control apparatus 1.

The controller 30 monitors recording operation (operation of initiating imaging and recording process) performed by the user using the operating unit 35 in step S401. In a period in which recording operation is not performed (prior to time t11 in FIG. 22), the controller 30 sets a flag FuncON to "0" in step S403. The flag FuncON indicates an execution state of the imaging and recording operation depending on manual operation of the user. However, the flag FuncON is not set to "0" when imaging and recording are automatically stopped by the controller 30, which will be described below.

Prior to initiation of imaging and recording, the controller 30 continuously monitors power off operation performed by the user using the operating unit 35 in step S421. When the power off operation is not detected, the controller 30 checks flag FuncON=0 in step S422 and returns to step S401.

When the power off operation is detected, the controller 30 proceeds to step S420 and instructs the power supply unit 18 to turn off power.

When the recording operation by the user is detected in step S401, the controller 30 controls initiation of imaging and recording and sets the flag FuncON to "1" in step S402.

Then, the controller 30 repeats processing after step S404 at intervals of frame timing after imaging and recording are started.

The controller 30 monitors a recording stop operation (operation of instructing completion of imaging and recording processing) performed by the user using the operating unit 35 in step S404. When the recording stop operation is not detected, the controller 30 maintains FuncON=1 in step S406.

The controller 30 checks whether the functions as the imaging control apparatus 1 (state detection unit 1a and the mode processing instruction unit 1b) are turned on in step S407. In a period in which the functions are turned off, the controller 30 does not perform mode control, particularly, depending on state detection.

In this example, since the controller 30 performs mode control depending on state detection during imaging and recording, the controller 30 proceeds to step S408 when the functions as the imaging control apparatus 1 are turned on and flag FuncON=1 in step S407. While the functions are turned off or imaging and recording are stopped, the controller 30 proceeds to step S421 from step S407.

When the recording stop operation is detected in step S404, the controller 30 controls imaging and recording to be stopped and sets the flag FuncOn to "0" in step S405. This corresponds to a process when the user normally performs the operation.

In this case, the controller 30 proceeds to step S421 from step S407 and monitors the power off operation performed by the user using the operating unit 35. When the power off operation is not detected, the controller 30 returns to step S401 since FuncON=0 in step S422.

When the functions as the imaging control apparatus 1 are turned on and imaging and recording are performed, the controller 30 progresses to processing for second state detection in step S408 and following steps from step S407 in the processing at intervals of frame timing.

In step S408, the controller 30 acquires a detected value of a detected signal from the sensor unit 14. Then, the controller 30 performs a filtering process, for example, a band extraction process according to a band pass filter, on the detected value for DC component cutting and noise smoothing in step S409. Thereafter, the controller 30 performs a coring process for small amplitude cutting in step S410. Through these processes, the signal value SJ described with reference to FIG. 22 is obtained.

The controller 30 checks whether the signal value SJ is within a threshold value range sjTH in step S411. If the signal value SJ is within the threshold value range sjTH, the controller 30 sets the count control flag CTF to "1" in step S412. When the signal value SJ does not belong to the threshold value range sjTH, the controller 30 sets the count control flag CTF to "0" in step S413.

Then, the controller 30 branches the processing depending on the count control flag CTF in step S414. When the count control flag CTF is "0", the controller 30 proceeds to step S415 and counts up the count value CJ. When the count control flag CTF is "1", the controller 30 proceeds to step S416 and reset the count value CJ.

Thereafter, the controller 30 compares the count value CJ with the threshold value rsTH in step S417. If the count value CJ does not exceed the threshold value rsTH, the controller 30 determines that the second state ST2 is not detected yet. In this case, the count value CJ does not exceed the threshold value pfTH in step S419 since rsTH<pfTH as described above. Accordingly, the controller 30 proceeds to step S421 and then returns to step S404 from step S422 since flag FuncON=1 to continue the processing at the next frame timing.

When count value CJ>threshold value rsTH in step S417, the controller 30 determines that the second state ST2 is detected and controls imaging and recording to be stopped in step S418. Accordingly, imaging and recording are stopped even when the user does not perform a stop operation.

In this case, processing is performed through step S419=>step S421=>step S422. At this time, the flag FuncON, which is turned off in step S405 in response to manual operation, remains as "1", and thus the controller 30 returns to step S404 from step S422 to continue processing at the next frame timing.

Then, the controller 30 continuously performs step S407 to step S408.

After the aforementioned automatic stop operation, the controller 30 monitors whether the count value CJ exceeds the threshold value pfTH in step S419.

At the time when the count value CJ exceeds the threshold value pfTH, the controller 30 proceeds to step S420 from step S419 and performs power off control.

When the user performs a power off operation before the count value CJ exceeds the threshold value pfTH, the controller 30 proceeds to step S420 from step S421 and performs power off control in response to user manipulation.

Meanwhile, the user may perform a recording operation in the power on state after imaging and recording are controlled to be stopped in step S418, which is not illustrated in the flowchart. In this case, the controller 30 returns to step S402.

The processing operations described with reference to FIG. 22 are performed according to the processing of FIG. 23.

7. Sixth Embodiment

A sixth embodiment is described with reference to FIG. 24.

This example is based on the assumption that the remote control apparatus 50 and a plurality of imaging apparatuses 10A, 10B and 10C are used.

For example, the remote control apparatus 50 has the configuration of FIG. 5 and the controller 60 has functions as the state detection unit 1a and the mode processing instruction unit 1b of the imaging control apparatus 1. A user who performs an activity has the remote control apparatus 50 mounted to the body.

Although the imaging apparatuses 10A, 10B and 10C have the configuration of FIG. 4, the controller 30 does not have the functions as the state detection unit 1a and the mode processing instruction unit 1b or turns off the functions as the state detection unit 1a and the mode processing instruction unit 1b.

While the imaging apparatuses 10A, 10B and 10C may be mounted to the user who performs the activity or a gear, an example in which the imaging apparatuses 10A, 10B and 10C are installed in a place is considered.

The remote control apparatus 50 transmits instruction of HFR imaging and buffering and instruction of HFR recording processing to the imaging apparatuses 10A, 10B and 10C as in the second embodiment, for example, in response to detection of the first state ST1 and the second state ST2. The imaging apparatuses 10A, 10B and 10C receive the instructions from the remote control apparatus 50 and perform HFR imaging and buffering and HFR recording processing.

That is, in this example, the imaging apparatuses 10A, 10B and 10C may perform HFR imaging at a common timing when the user performs imaging at various angles using the plurality of imaging apparatuses 10 during activity. Accordingly, it may be possible to take synchronized images of a specific scene during activity through HFR imaging at various angles.

Of course, it may also be possible to cause the imaging apparatuses 10A, 10B and 10C to perform the operations of the third, fourth and fifth embodiments.

Further, the imaging apparatus 10 mounted to the user, instead of the remote control apparatus 50, may be used as a master to instruct other imaging apparatuses 10 to perform operations.

8. Seventh Embodiment

Examples of setting detection conditions (trigger types) of the first state ST1 and the second state ST2 are described as a seventh embodiment.

First, an example of monitoring states triggered according to vibration, sound and gesture in predetermined patterns, detected values of image analysis, imaging control operation and the like is described. Although one or more of these conditions may be fixed to a state detection condition, the state detection condition may be set depending on activity.

A of FIG. 25 illustrates an example of a detection condition setting process of the controller 30. As described in the aforementioned embodiments, the controller 30 may be replaced by the controller 60 of the remote control apparatus 50 in processing of the controller 30 described below. In this case, the display unit 34 may be replaced by the display unit 53 and the operating unit 35 may be replaced by the operating unit 54.

The controller 30 monitors input of activity type selection operation in step S501.

For example, the user may input an activity type as the activity type selection operation. For example, the controller 30 causes the display unit 34 to display a selection menu such that the user may select a bike game, snow board, ski jump, figure skating, diving, surfing, tennis, baseball, soccer or the like.

When the user selects an activity type by manipulating the operating unit 35, the controller 30 sets detection conditions of the first and second states depending on the selected activity type in step S501.

For example, the first state detection condition (D1) and the second state detection condition (D2) are set as follows.

Bike game (D1) Detection of vibration pattern according to tapping operation of user (D2) Detection of vibration pattern during jumping Diving (D1) Detection of pattern during jumping by acceleration sensor (D2) Detection of variation in detected value of automatic white balance Tennis (D1) Detection of gesture in predetermined pattern (D2) Detection of vibration pattern according to impact during stroking The aforementioned detection conditions are exemplary, and a mounting position of the imaging apparatus 10 or the remote control apparatus 50 may be selected as well as the activity type such that a state detection condition may be set depending on a combination of the activity type and the mounting position. For example, arm, wrist, leg, waist, abdomen, a gear, gear type and the like may be selected. State detection suitable for the mounting position may be performed by setting a state detection condition depending on the selected mounting position.

B of FIG. 25 illustrates an example of automatically determining an activity type.

The controller 30 determines an activity type in step S510. This is a process of determining an activity type according to a detected signal of the sensor unit 7, a subject image analysis result, analysis of input voice through a sound detection unit 17 or the like. It may be possible to automatically determine the type of currently performed activity by storing characteristic vibration, sound, image pattern and the like of each activity and searching matched one.

When the activity type is determined, the controller 30 proceeds to step S512 from step S511 and sets the detection conditions of the first and second states depending on the determined activity type. That is, the controller 30 sets the detection conditions such as the aforementioned (D1) and (D2).

When a user operation is performed or a predetermined time elapses with activity type remaining unknown, this is regarded as time-over and determination is stopped. When determination is stopped, the controller 30 proceeds to step S514 from step S513 and sets default detection conditions of the first and second states.

According to the aforementioned processing, for example, state determination adapted to activity type may be performed and the imaging operation may be controlled depending thereon without user operation. Accordingly, imaging or HFR imaging of a characteristic scene depending on activity is performed more easily.

The processes of setting state detection conditions depending on activity type as described with reference to A and B of FIG. 25 may be applied to only one of the first state ST1 and the second state ST2 as well as both the first state ST1 and the second state ST2. In addition, when the third state ST3 is detected as in the aforementioned third embodiment, a detection condition of the third state ST3 may be set depending on activity type.

Furthermore, not only conditions but also OR condition and AND condition with respect to a plurality of conditions may be switched.

The controller 30 may set the second state detection condition depending on the detection condition when the first state ST1 is detected.

For example, it is assumed that a plurality of detection conditions such as a predetermined vibration pattern, gesture pattern, sound pattern and the like as detection conditions of the first state ST1 and the first state ST1 is determined when any one thereof is detected.

Then, the controller 30 performs processing illustrated in C of FIG. 25. That is, the controller 30 determines whether the first state ST1 has been detected in step S520 and proceeds to step S521 when the first state ST1 is detected. The controller 30 sets a detection condition of the second state ST2 depending on the detection condition of the first state ST1.

For example, a variation in a detected value of an acceleration sensor is used as a detection condition of the second state ST2 when the first state ST1 is detected through a vibration pattern of tapping operation, whereas a variation in a global vector is used as a detection condition of the second state ST2 when the first state ST1 is detected through a gesture pattern.

Accordingly, the second state ST2 may be detected according to the first state ST1.

Of course, a detection condition of the third state ST3 may be set depending on the detection condition of the first state ST1.

Furthermore, when a plurality of detection conditions is set for the second state ST2, a detection condition of the third state ST3 may be set depending on each of the detection conditions of the second state ST2.

9. Overview and Modification Examples

The following effects are obtained according to the imaging control apparatus 1 of the first embodiment and the imaging apparatus 10 and the remote control apparatus 50 of the second to fifth embodiments.

In the embodiments, the state detection unit 1a which performs the first detection of detecting an imaging environment being the first state ST1 and the second detection of detecting transition from the first state ST2 to the second state ST2 is provided. In addition, the mode processing instruction unit 1b which instructs an imaging operation in the first mode based on detection of the first state ST1 and instructs an imaging operation in the second mode based on detection of the second state ST2 is provided.

That is, the state detection unit 1a detects the first state ST1 and the second state ST2 with respect to the imaging environment, whereas the mode processing instruction unit 1b sets a predetermined imaging operation for each of the first state ST1 and the second state ST2 and performs control depending on a detected state. That is, when the first state ST1 is detected, the mode processing instruction unit 1b indicates the first mode at the detection time or a time after the detection time. When the second state ST2 is detected, the mode processing instruction unit 1b indicates the second mode at the detection time or a predetermined time after the detection time.

According to this configuration, an imaging operation in response to a variation in the imaging environment is performed. That is, it may be possible to perform an imaging operation under the condition that the imaging environment becomes the first state ST1 and then reaches the second state ST2. Accordingly, usability and operability with respect to images may be improved.

Particularly, with respect to an apparatus which is difficult to manipulate while being used, the imaging apparatus may perform a desired imaging operation in response to a variation in an imaging environment such as user situation.

In the embodiments, the state detection unit 1a detects that an object on which the imaging apparatus 10 is mounted or a subject of the imaging apparatus 10, or an object on which the remote control apparatus 50 which can communicate with the imaging apparatus 10 is mounted becomes the first state ST1 or the second state ST2 as an imaging environment.

That is, the state detection unit 1a detects a dynamic situation of a person on which the imaging apparatus 10 or the remote control apparatus 50 is mounted, a gear on which the imaging apparatus 10 or the remote control apparatus 50 is mounted, or a person as a subject of the imaging apparatus 10 or the remote control apparatus 50 as the imaging environment. For example, a state in which a person as an object on which the imaging apparatus 10 or the remote control apparatus 50 is mounted starts a certain game is regarded as the first state, and a specific operation state during the game is regarded as the second state.

Accordingly, the imaging operation may be controlled using an action of an object on which the imaging apparatus or the remote control apparatus is mounted or a subject of the imaging apparatus or the remote control apparatus as a trigger.

Further, various objects on which the imaging apparatus or the remote control apparatus is mounted are considered. For example, moving bodies, vehicles, trains, ships, flight vehicles such as an airplane, a balloon, a helicopter, a glider, a kite, an advertising balloon, a model flying body using a remote controller and a satellite, animal, structures, natural objects, etc. may be considered.

In the embodiments, the state detection unit 1a detects a non-manipulated action of an object on which the imaging apparatus 10 is mounted or a subject of the imaging apparatus 10, or an object on which the remote control apparatus 50 which can communicate with the imaging apparatus 10 is mounted as the second detection. That is, the non-manipulated action is not an action intended by the user but an action during activity. For example, jumping during a bike game may be exemplified.

The second detection performed in the first state ST1 detects an action of the object or the subject. The action is not an action for operation relating to imaging, and it is suitable that a specific action as the second state ST2 is detected through the second detection. Accordingly, the imaging operation may be controlled depending on a characteristic action of the object or the subject during activity as the second state. Furthermore, the user as the object may not be conscious of manipulation.

In the embodiments, the example in which the state detection unit 1a detects a manipulation action of a person as an object on which the imaging apparatus 10 is mounted or a subject of the imaging apparatus 10 as the first detection has been described. For example, the manipulation action is a tapping operation or the like.

It may be suitable that the first state ST1 is determined according to manipulation based on intention of the user of the imaging apparatus or the remote control apparatus. When initiation of an action such as sports or activity is regarded as the first state ST1, for example, the imaging operation in the first mode is initiated on the basis of intention of the user by detecting the initiation of the action according to manipulation of the user.

Accordingly, while the first mode imaging operation is securely executed according to intention of the user, the second state ST2 is a state of a characteristic action in sports, activity or the like initiated by the user and the second mode imaging operation may be performed depending on this state.

The user may record a desired moving image only by instructing the first mode imaging operation when starting the activity or the like.

In the third embodiment, the state detection unit 1a performs the third detection of detecting transition from the second state ST2 to the third state ST3 and the mode processing instruction unit 1b instructs at least the imaging operation performed in the second mode to be finished on the basis of detection of the third state ST3.

Accordingly, it may be possible to complete the second mode imaging operation, for example, HFR imaging and recording at appropriate timing (or in an imaged picture at the appropriate timing) without consciousness of the user.

In the second, third and fourth embodiments, the first mode imaging operation instructed by the mode processing instruction unit 1b includes a processing operation of buffering captured image data in the internal memory 25 in the form of a ring memory. In addition, the second mode imaging operation instructed by the mode processing instruction unit 1b includes a processing operation of setting a range of storing the captured image data buffered in the internal memory 25 as recorded images.

That is, buffering of captured image data is initiated in response to detection of the first state. Then, a range of images transmitted to the recording unit 15 and stored therein as recorded images from among captured image data which is being buffered or has been buffered, in response to detection of the second state.

For example, when a moving image is imaged and recorded at HFR higher than a normal frame rate, as described above, an imaged scene suitable for HFR imaging is set as the second state ST2. Although HFR depends on a relationship between the actual frame rate and the data transfer rate or processing capability of the imaging apparatus, capacity of a recording medium or the like, constant recording of HFR imaged pictures generates considerable load and is not necessary for the user in many cases. Furthermore, HFR images are reproduced as slow motion images when reproduced by a general reproduction apparatus.

Accordingly, buffering captured image data in the first state ST1, setting the recording range in the second state ST2 and recording HFR images corresponding to the range are very suitable processing because only important scenes that the user wants to view as slow motions are recorded as HFR images. From the viewpoint of the imaging apparatus, memory capacity is not unnecessarily oppressed and processing loads such as encoding or transmission for recording, writing into the recording medium and the like are prevented from increasing since captured image data is buffered in the form of a ring memory.

In addition, the user may not control HFR recording timing by performing the processes according to the embodiments for the aforementioned HFR imaging operation, and HFR recording may be satisfactorily realized in use modes as an action camera.

In the fourth embodiment, the first mode imaging operation instructed by the mode processing instruction unit 1b includes a processing operation for storing captured image data of a period corresponding to the first state ST1 as recorded images at a first frame rate. In addition, the second mode imaging operation instructed by the mode processing instruction unit 1b includes a processing operation for storing captured image data of a period corresponding to the second state ST2 as recorded images at a second frame rate (HFR) higher than the first frame rate.

That is, the captured image data of the period corresponding to the first state is recorded at the first frame rate and the captured image data of the period corresponding to the second state is recorded at the second frame rate (HFR).

Accordingly, moving image content having different frame rates depending on imaging environments may be generated. For example, content, which is obtained by recording imaged pictures at a normal frame rate such as 60 fps and recording imaged pictures corresponding to a period in which the second state is detected at a high frame rate such as 240 fps, 960 fps or the like, is created. In this case, the content includes a moving image of a specific action scene, which is reproduced as a slow motion image when reproduced through a general reproduction method. It may be possible to automatically generate content which usefully uses HFR imaging by setting an imaging environment in which an important scene in sports, activity or the like is set to the second state ST2.

In the fifth embodiment, the state detection unit 1a performs the third detection of detecting transition from the second state ST2 to the third state ST3. Then, the first mode imaging operation instructed by the mode processing instruction unit 1b includes a processing operation for storing captured image data as recorded images, and the second mode imaging operation includes a processing operation for stopping recording of captured image data. Furthermore, the mode processing instruction unit 1b instructs power off of the imaging apparatus 10 on the basis of detection of the third state ST3.

That is, captured image data of a period corresponding to the first state is recorded and recording is ended in response to detection of the second state. In addition, the imaging apparatus is powered off in response to detection of the third state.

Accordingly, imaging, stopping of imaging and recording and power off may be performed depending on imaging environments. For example, continuous imaging and recording of images unnecessary for the user are avoided and continuance of unnecessary imaging or power on state is prevented. Particularly, a user who is performing sports or the like may easily forget manipulation relating to the imaging apparatus such as stopping recording or turning off the imaging apparatus. This oppresses capacity of the recording medium and decreases battery capacity in many cases. These problems are solved according to the present configuration.

In each embodiment, the state detection unit 1a performs one or both of the first detection and the second detection on the basis of detected signals of sensors included in the imaging apparatus 10 or the remote control apparatus 50 which can communicate with the imaging apparatus 10. Here, the sensors refer to a vibration sensor, an acceleration sensor, an angular velocity sensor, a gravity sensor, a position sensor, an illuminance sensor, an optical sensor and a temperature sensor, for example, included in the sensor units 14 and 56, or a sound sensor (microphone) and a sound pressure sensor of the sound detection units 17 and 55.

According to these sensors, an action state of sports or the like may be detected through an action, sound, gesture or the like of an object on which the imaging apparatus is mounted, and an imaging environment suitable to control the imaging operation may be detected as the first state ST1 or the second state ST2.

In each embodiment, the state detection unit 1a performs one or both of the first detection and the second detection on the basis of captured image data acquired by the imaging apparatus 10.

Imaging environments are detected as various states of a subject through image analysis of captured image data. For example, a gesture of the subject is detected from the captured image data. Further, automatic focus (AF), automatic iris (AE), automatic white balance (AWB) and the like are controlled on the basis of the captured image data. Since AF, AE and AWB are controlled in response to the state of the subject, control values of AF, AE and AWB are values of detecting an imaging environment as the state of the subject. In addition, a motion vector of the subject may be detected from an image to determine an imaging environment.

Accordingly, an action state in sports or the like may be detected through a motion, gesture or the like of the subject, and an imaging environment suitable to control the imaging operation may be automatically detected as the first state or the second state.

In each embodiment, the state detection unit 1a performs one or both of the first detection and the second detection on the basis of communication state between the imaging apparatus 10 and the remote control apparatus 50 which may perform communication.

For example, when communication between the imaging apparatus and a device which may perform communication, such as the remote control apparatus, is ceased for a predetermined time, it may be determined that there is a variation in the imaging environment.

Accordingly, the imaging operation may be controlled in response to detection of a variation in the imaging environment.

In the seventh embodiment, an example of setting a detection condition with respect to one or both of the first detection and the second detection depending on activity type of an object on which the imaging apparatus is mounted is described (A and B of FIG. 25).

For example, sports or activity type is determined and a trigger of the first state and a trigger of the second state are set depending on the sports or activity type.

Accordingly, the first state ST1 and the second state ST2 may be appropriately detected depending on type of performed activity.

In addition, the seventh embodiment describes an example in which the state detection unit 1a sets a plurality of detection conditions with respect to the first detection, and a detection condition with respect to the second detection is set depending on a detection condition when the first state ST1 is detected through the first detection (C of FIG. 25).

When the first state ST1 is detected according to various detection conditions, the detection condition of the second detection may be set in association with a detection condition of the first state ST1 with respect to activity by selecting a detection condition of the second state ST2 depending on a detection condition when the first state ST1 is detected. Accordingly, it may be possible to increase the possibility that the second state ST2 is appropriately detected.

A program according to an embodiment is a program which causes an operation processing unit to execute a first detection process of detecting the first state ST1 as an imaging environment, a first instruction process of instructing an imaging process in the first mode on the basis of detection of the first state ST1, a second detection process of detecting transition from the first state ST1 to the second state ST2, and a second instruction process of instructing an imaging process in the second mode on the basis of detection of the second state ST2.

According to the program, an operation processing unit having functions of the imaging control apparatus 1 according to the embodiments, for example, the controllers 30 and 60 using a microcomputer or DSP may be realized. Furthermore, the imaging apparatus 10 and the remote control apparatus 50 having the functions of the imaging control apparatus 1 may be realized.

The aforementioned program may be stored in various recording media. Further, the program may be previously stored in an HDD as a recording medium embedded in a device such as a computer device, a ROM in a microcomputer including a CPU or the like. Otherwise, the program may be temporarily or permanently stored in a removable recording medium such as a semiconductor memory, a memory card, an optical disk, a magneto-optical disk or a magnetic disk. The removable recording medium may be provided as so-called package software.

In addition, the program may be not only installed in a personal computer or the like from a removable recording medium but also downloaded from a download site through a network such as a LAN or the Internet.

With respect to the present technology, various modifications and application examples may be considered in addition to the aforementioned examples.

Other triggers (detection conditions) for determination of the first state ST1 and the second state ST2 may be considered. This is the same with respect to the third state ST3.

The user may previously register "predetermined pattern" corresponding to a detection condition for the first state ST1 and the second state ST2. For example, the number and interval of tapping operations are registered.

In this case, the user may previously register imaging operations in the first mode and the second mode, which correspond to the first state ST1 and the second state ST2. For example, HFR imaging in the second state ST2, as described in the second embodiment, is performed when the first state ST1 is indicated through two tapping operations, whereas mixed normal imaging and HFR imaging, described in the fourth embodiment, are preformed when the first state ST1 is indicated through three tapping operations.

As an example of controlling imaging operations in modes depending on the first and second states, for example, addition of a tag indicating a frame range, addition of various messages and the like may be considered.

For example, while normal recording is performed from when the first state ST1 is detected and continues even when transition from the first state ST1 to the second state ST2 has occurred, a tag indicating a frame range corresponding to the second state ST2 is added. Otherwise, information such as the detection condition and detection time of the second state is added. Accordingly, a moving image may be easily searched for the period corresponding to the second state ST2 or the contents of the second state ST2 (the situation corresponding to the second state) may be detected during subsequent reproduction or edition of the moving image, and thus reproduction or edition is performed conveniently.

While moving image data records such as HFR records are transmitted to the recording unit 15 and recorded in a flash memory or the like in the embodiments, a buffered recording range may be transmitted to an external device and recorded therein or content recorded in the recording unit 15 may be automatically transmitted to a predetermined transmission destination.

For example, captured image data is transmitted to an external device such that a companion who is watching the corresponding activity at a distance may immediately check imaged pictures.

Further, it may be possible to provide a recording unit to the remote control apparatus 50 and transmit captured image data to the remote control apparatus 50 such that the captured image data is recorded in a recording medium of the recording unit.

The present technology may be applied to various apparatuses in addition to the imaging apparatus 10 used by the user during activity.

A vehicle, a flight vehicle or the like may be considered as an object on which the imaging apparatus is mounted, as described above.

For example, when the present technology is applied to an on-vehicle camera, slamming the brake may be detected as the first state ST1 and airbag working may be detected as the second state ST2.

Furthermore, the present technology is suitable for medical instrument, imaging apparatuses for operation and the like. In this case, state determination may be performed and an imaging operation mode may be controlled according to a motion of a doctor or a situation determined from an image.

Accordingly, the imaging control apparatus of the present technology may be widely applied to consumer equipment, broadcasting apparatus and business-use apparatuses. For example, the imaging control apparatus may be embedded in a camera device having a moving image imaging function, a portable terminal device, a cellular phone, a monitoring camera device, a fixed point camera device, an on-vehicle camera device such as a drive recorder, a camera device for driving environment determination, a medical apparatus, an electronic endoscope, etc. or may be integrated with these devices into a system.

It should be understood by those skilled in the art that various modifications, combinations, sub-combinations and alterations may occur depending on design requirements and other factors insofar as they are within the scope of the appended claims or the equivalents thereof.

The effects described in the specification are exemplary and are not limited, and there may be other effects.

Additionally, the present technology may also be configured as below.

(1)

An imaging control apparatus comprising:

a controller having a state detection unit configured to receive a sensing signal from a sensor, detect an imaging environment of an imaging apparatus becoming a first state, and detect a transition of the imaging environment from the first state to a second state based at least in part on the sensing signal; and a mode processing instruction unit configured to instruct a first imaging operation in a first mode on a basis of detection of the imaging environment of the imaging apparatus becoming the first state, and instruct a second imaging operation in a second mode on a basis of detection of the transition of the imaging environment from the first state to the second state.

(2)

The imaging control apparatus according to (1), wherein the state detection unit is further configured to detect the imaging environment as one of an object on which the imaging apparatus is mounted, a subject of the imaging apparatus, or a second object on which a device capable of communicating with the imaging apparatus is mounted.

(3)

The imaging control apparatus according to any one of (1) to (2), wherein, to detect the transition of the imaging environment from the first state to the second state based on the sensing signal, the state detection unit is further configured to detect a non-manipulated action of an object on which the imaging apparatus is mounted, detect a non-manipulated action of a subject of the imaging apparatus, or detect a non-manipulated action of a second object on which a device capable of communicating with the imaging apparatus is mounted, wherein the non-manipulated action is an indirect interaction between the imaging apparatus and a user.

(4)

The imaging control apparatus according to (3), wherein, to detect the imaging environment of the imaging apparatus becoming the first state, the state detection unit is further configured to detect a manipulation action of a person corresponding to the object on which the imaging apparatus is mounted, or detect the subject of the imaging apparatus, wherein the manipulated action is a direct interaction between the imaging apparatus and the user.

(5)

The imaging control apparatus according to claim any one of (1) to (4), wherein the state detection unit is further configured to detect a second transition from the second state to a third state, and wherein the mode processing instruction unit is further configured to instruct at least the second imaging operation performed in the second mode to end on a basis of detection of the second transition from the second state to the third state.

(6)

The imaging control apparatus according to any one of (1) to (5), wherein, to instruct the first imaging operation in the first mode, the mode processing instruction unit is further configured to buffer captured image data in a memory in a form of a ring memory, and wherein, to instruct the second imaging operation in the second mode, the mode processing instruction unit is further configured to set a range of the captured image data that has been buffered in the memory, and store the range of the captured image data as recorded images.

(7)

The imaging control apparatus according to (6), wherein the controller is further configured to control a capture of image data at one of a first frame rate or a second frame rate that is higher than the first frame rate to generate the captured image data, and wherein the captured image data has been captured at the second frame rate.

(8)

The imaging control apparatus according to any one of (1) to (7), wherein, to instruct the first imaging operation in the first mode, the mode processing instruction unit is further configured to store captured image data of a first period corresponding to the first state as recorded images at a first frame rate, and wherein, to instruct the second imaging operation in the second mode, the mode processing instruction unit is further configured to store captured image data of a second period corresponding to the second state as recorded images at a second frame rate that is higher than the first frame rate.

(9)

The imaging control apparatus according to (8), wherein, to instruct the first imaging operation in the first mode, the mode processing instruction unit is further configured to buffer the captured image data of the first period at the second frame rate in a memory in a form of a ring memory.

(10)

The imaging control apparatus according to any one of (1) to (9), wherein the state detection unit is further configured to detect a second transition from the second state to a third state, wherein, to instruct the first imaging operation in the first mode, the mode processing instruction unit is further configured to store captured image data as recorded images, wherein, to instruct the second imaging operation in the second mode, the mode processing instruction unit is further configured to stop recording of the captured image data, and wherein the mode processing instruction unit is further configured to instruct power off of the imaging apparatus on a basis of detection of the second transition from the second state to the third state.

(11)

The imaging control apparatus according to any one of (1) to (10), wherein the state detection unit is further configured to receive the sensing signal of the sensor mounted in one of the imaging apparatus or a device capable of communicating with the imaging apparatus, and responsive to receiving the sensing signal, the state detection unit is further configured to detect at least one of the imaging environment of the imaging apparatus becoming the first state or the transition of the imaging environment from the first state to the second state.

(12)

The imaging control apparatus according to any one of (1) to (11), wherein the state detection unit is further configured to capture image data acquired by the imaging apparatus, and responsive to capturing the image data, the state detection unit is further configured to detect at least one of the imaging environment of the imaging apparatus becoming the first state or the transition of the imaging environment from the first state to the second state.

(13)

The imaging control apparatus according to any one of (1) to (12), wherein the state detection unit is further configured to determine a communication state between the imaging apparatus and a device capable of communicating with the imaging apparatus, and responsive to determining the communication state, the state detection unit is further configured to detect at least one of the imaging environment of the imaging apparatus becoming the first state or the transition of the imaging environment from the first state to the second state.

(14)

The imaging control apparatus according to any one of (1) to (13), wherein, to detect at least one of the imaging environment of the imaging apparatus becoming the first state or the transition of the imaging environment from the first state to the second state based on the sensing signal, the state detection unit is further configured to set a detection condition based on an activity type of an object on which the imaging apparatus is mounted.

(15)

The imaging control apparatus according to any one of (1) to (14), wherein, to detect the imaging environment of the imaging apparatus becoming the first state, the state detection unit is further configured to set a plurality of detection conditions, and responsive to detecting the imaging environment of the imaging apparatus becoming the first state, to detect the transition of the imaging environment from the first state to the second state based on the sensing signal, the state detection unit is further configured to set a detection condition based on a type of a detection condition from the plurality of detection conditions.

(16)

The imaging control apparatus according to (15), wherein, to detect the transition of the imaging environment from the first state to the second state based on the sensing signal, the state detection unit is further configured to consider two or more detection conditions from a second plurality of detection conditions.

(17)

The imaging control apparatus according to claim 15), wherein the plurality of detection conditions are associated with one of a plurality of predetermined activities, wherein the controller is further configured to receive an input that is indicative of a user selection of the one of the plurality of predetermined activities.

(18)

The imaging control apparatus according to claim 17), wherein the controller is further configured to match the one of the plurality of predetermined activities to an activity of a user based on the sensing signal from the sensor, and wherein the sensor is mounted in one of the imaging apparatus or a device capable of communicating with the imaging apparatus.

(19)

An imaging control method for controlling an imaging apparatus, the method comprising:

receiving, with a state detection unit of a controller, a sensing signal from a sensor;

detecting, with the state detection unit, an imaging environment of the imaging apparatus becoming a first state;

instructing, with a mode processing instruction unit of the controller, a first imaging operation in a first mode on a basis of detection of the imaging environment of the imaging apparatus becoming the first state;

detecting, with the state detection unit, a transition from the first state to a second state based at least in part on the sensing signal; and instructing, with the mode processing instruction unit, a second imaging operation in a second mode on a basis of detection of the transition of the imaging environment from the first state to the second state.

(20)

A non-transitory computer-readable medium comprising a program that causes a controller to perform a set of operations, the set of operations comprising:

receiving a sensing signal from a sensor;

detecting an imaging environment of an imaging apparatus becoming a first state;

instructing a first imaging operation in a first mode on a basis of detection of the imaging environment of the imaging apparatus becoming the first state;

detecting a transition from the first state to a second state based at least in part on the sensing signal; and instructing a second imaging operation in a second mode on a basis of detection of the transition of the imaging environment from the first state to the second state.

REFERENCE SIGNS LIST 1 imaging control apparatus
1a state detection unit
1b mode processing instruction unit
2 imaging unit
3 imaged signal processing unit
4, 34, 53 display unit
5, 15 recording unit
6 communication unit
7, 14, 56 sensor unit
11 optical system
12 imager
16, 51 wireless communication unit
17, 55 sound detection unit
30, 60 controller

The invention claimed is:

1. An imaging control apparatus comprising:
a controller having an electronic processor and a memory, the memory storing program code executable by the electronic processor to perform a set of operations including
receiving a sensing signal from a sensor;
detecting an imaging environment becoming a first state, the imaging environment being an environment of an imaging apparatus;
detecting a transition of the imaging environment from the first state to a second state based at least in part on the sensing signal;
instructing the imaging apparatus to perform a first imaging operation in a first mode on a basis of detection of the imaging environment becoming the first state; and
instructing the imaging apparatus to perform a second imaging operation in a second mode on a basis of detection of the transition of the imaging environment from the first state to the second state.

2. The imaging control apparatus according to claim 1,
wherein detecting the imaging environment becoming the first state further includes setting a plurality of detection conditions, and
wherein detecting the transition of the imaging environment from the first state to the second state based on the sensing signal further includes setting a detection condition based on a type of the detection condition from the plurality of detection conditions in response to detecting the imaging environment becoming the first state.

3. The imaging control apparatus according to claim 2,
wherein detecting the transition of the imaging environment from the first state to the second state based on the sensing signal further includes considering two or more detection conditions from a second plurality of detection conditions.

4. The imaging control apparatus according to claim 2, wherein the plurality of detection conditions are associated with one of a plurality of predetermined activities.

5. The imaging control apparatus according to claim 4, wherein the one of the plurality of predetermined activities is sport activities.

6. The imaging control apparatus according to claim 5, wherein the sport activities include two or more from a group consisting of:
   snowboarding activity,
   surfing activity,
   skiing activity,
   motorbiking activity,
   bicycling activity,
   racket activity,
   diving activity,
   figure skating activity, and
   ball game activity.

7. The imaging control apparatus according to claim 4, wherein the set of operations further includes matching the one of the plurality of predetermined activities to an activity of a user based on the sensing signal from the sensor, and
wherein the sensor is mounted in one of the imaging apparatus or a device capable of communicating with the imaging apparatus.

8. The imaging control apparatus according to claim 1, wherein the set of operations further includes detecting the imaging environment as one of an object on which the imaging apparatus is mounted, a subject of the imaging apparatus, or a second object on which a device capable of communicating with the imaging apparatus is mounted.

9. The imaging control apparatus according to claim 1, wherein detecting the transition of the imaging environment from the first state to the second state based on the sensing signal further includes
   detecting a non-manipulated action of an object on which the imaging apparatus is mounted,
   detecting a non-manipulated action of a subject of the imaging apparatus, or
   detecting a non-manipulated action of a second object on which a device capable of communicating with the imaging apparatus is mounted,
wherein the non-manipulated action is an indirect interaction between the imaging apparatus and a user.

10. The imaging control apparatus according to claim 9, wherein detecting the imaging environment becoming the first state further includes detecting a manipulation action of a person corresponding to the object on which the imaging apparatus is mounted, or
   detecting the subject of the imaging apparatus,
wherein the manipulated action is a direct interaction between the imaging apparatus and the user.

11. The imaging control apparatus according to claim 1, wherein instructing the first imaging operation in the first mode further includes buffering captured image data in the memory in a form of a ring memory, and
wherein instructing the second imaging operation in the second mode further includes
   setting a range of the captured image data that has been buffered in the memory, and
   storing the range of the captured image data as recorded images.

12. The imaging control apparatus according to claim 11, wherein the set of operations further includes controlling a capture of image data at one of a first frame rate or a second frame rate that is higher than the first frame rate to generate the captured image data, and
wherein the captured image data has been captured at the second frame rate.

13. The imaging control apparatus according to claim 1, wherein instructing the first imaging operation in the first mode further includes storing captured image data of a first period corresponding to the first state as recorded images at a first frame rate, and
wherein instructing the second imaging operation in the second mode further includes storing captured image data of a second period corresponding to the second state as recorded images at a second frame rate that is higher than the first frame rate.

14. The imaging control apparatus according to claim 13, wherein instructing the first imaging operation in the first mode further includes buffering the captured image data of the first period at the second frame rate in the memory in a form of a ring memory.

15. The imaging control apparatus according to claim 1, wherein instructing the first imaging operation in the first mode further includes storing captured image data as recorded images,
wherein instructing the second imaging operation in the second mode further includes stopping the recording of the captured image data, and
wherein the set of operations further includes instructing power off of the imaging apparatus on a basis of detection of a second transition from the second state to a third state.

16. The imaging control apparatus according to claim 1, wherein the set of operations further includes receiving the sensing signal of the sensor mounted in one of the imaging apparatus or a device capable of communicating with the imaging apparatus, and
wherein the set of operations further includes detecting at least one of the imaging environment becoming the first state or the transition of the imaging environment from the first state to the second state in response to receiving the sensing signal.

17. The imaging control apparatus according to claim 1, wherein the set of operations further includes capturing image data acquired by the imaging apparatus, and
wherein the set of operations further includes detecting at least one of the imaging environment becoming the first state or the transition of the imaging environment from the first state to the second state in response to capturing the image data.

18. The imaging control apparatus according to claim 1, wherein the set of operations further includes determining a communication state between the imaging apparatus and a device capable of communicating with the imaging apparatus, and
wherein the set of operations further includes detecting at least one of the imaging environment becoming the first state or the transition of the imaging environment from the first state to the second state in response to determining the communication state.

19. The imaging control apparatus according to claim 1, wherein detecting at least one of the imaging environment becoming the first state or the transition of the imaging environment from the first state to the second state based on the sensing signal further includes setting a detection condition based on an activity type of an object on which the imaging apparatus is mounted.

20. An imaging control method for controlling an imaging apparatus, the method comprising:
receiving, with an electronic processor of a controller, a sensing signal from a sensor;
detecting, with the electronic processor, an imaging environment of the imaging apparatus becoming a first state;
detecting, with the electronic processor, a transition of the imaging environment from the first state to a second state based at least in part on the sensing signal;
instructing, with the electronic processor, a first imaging operation in a first mode on a basis of detection of the imaging environment becoming the first state, the imaging environment being an environment of the imaging apparatus; and
instructing, with the electronic processor, a second imaging operation in a second mode on a basis of detection of the transition of the imaging environment from the first state to the second state.

21. A non-transitory computer-readable medium comprising a program that causes a controller to perform a set of operations, the set of operations comprising:
receiving a sensing signal from a sensor;
detecting an imaging environment of an imaging apparatus becoming a first state;
detecting a transition of the imaging environment from the first state to a second state based at least in part on the sensing signal;
instructing a first imaging operation in a first mode on a basis of detection of the imaging environment becoming the first state, the imaging environment being an environment of the imaging apparatus; and
instructing a second imaging operation in a second mode on a basis of detection of the transition of the imaging environment from the first state to the second state.

* * * * *